(12) United States Patent
Tatematsu et al.

(10) Patent No.: US 11,854,278 B2
(45) Date of Patent: Dec. 26, 2023

(54) INFORMATION PROCESSING DEVICE AND METHOD

(71) Applicant: SONY GROUP CORPORATION, Tokyo (JP)

(72) Inventors: Shigeki Tatematsu, Tokyo (JP); Michiro Hirai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/767,189

(22) PCT Filed: Oct. 2, 2020

(86) PCT No.: PCT/JP2020/037528
§ 371 (c)(1),
(2) Date: Apr. 7, 2022

(87) PCT Pub. No.: WO2021/075277
PCT Pub. Date: Apr. 22, 2021

(65) Prior Publication Data
US 2022/0375235 A1    Nov. 24, 2022

(30) Foreign Application Priority Data
Oct. 16, 2019    (JP) .................................. 2019-189081

(51) Int. Cl.
*G06V 20/62* (2022.01)
*G06V 10/77* (2022.01)
*G06V 30/18* (2022.01)

(52) U.S. Cl.
CPC ........ *G06V 20/625* (2022.01); *G06V 10/7715* (2022.01); *G06V 30/18162* (2022.01); *G06V 2201/07* (2022.01)

(58) Field of Classification Search
CPC ............ G06V 20/625; G06V 10/7715; G06V 30/18162; G06V 2201/07
See application file for complete search history.

(56) References Cited

U.S. PATENT DOCUMENTS

2018/0268238 A1\*   9/2018   Khan ................... G06V 10/751

FOREIGN PATENT DOCUMENTS

| JP | 2004-206441 A | 7/2004 |
| JP | 2008-176472 A | 7/2008 |

(Continued)

OTHER PUBLICATIONS

International Search Report and Written Opinion of PCT Application No. PCT/JP2020/037528, dated Dec. 15, 2020, 09 pages of ISRWO.

*Primary Examiner* — David F Dunphy
(74) *Attorney, Agent, or Firm* — CHIP LAW GROUP

(57) ABSTRACT

The present disclosure relates to an information processing device and method, and a program that enable processing, related to management of a vehicle, to be performed even in a case where no vehicle registration number is recognizable. Feature information of a vehicle is extracted from a captured image on the basis of a detection result of a number plate of the vehicle in the captured image, and the feature information of the vehicle extracted by the feature extraction unit is registered in a predetermined database. The present disclosure can be applied to, for example, an information processing device, an image processing device, a communication device, an electronic device, an information processing method, a program, and the like.

18 Claims, 37 Drawing Sheets

(56) References Cited

FOREIGN PATENT DOCUMENTS

| | | |
|---|---|---|
| JP | 2012-003493 A | 1/2012 |
| JP | 4973341 B2 | 7/2012 |
| JP | 2013-182550 A | 9/2013 |

* cited by examiner

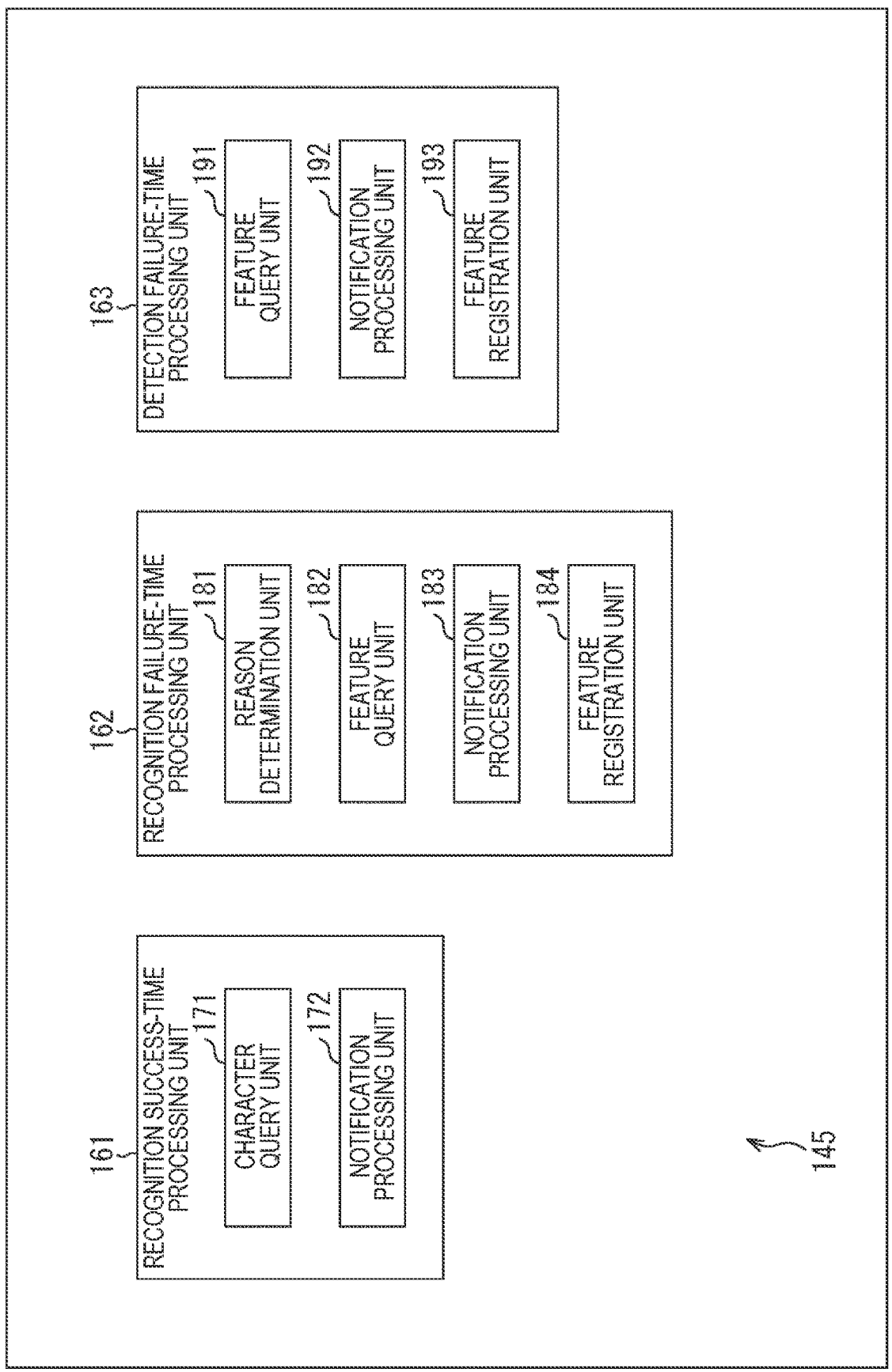

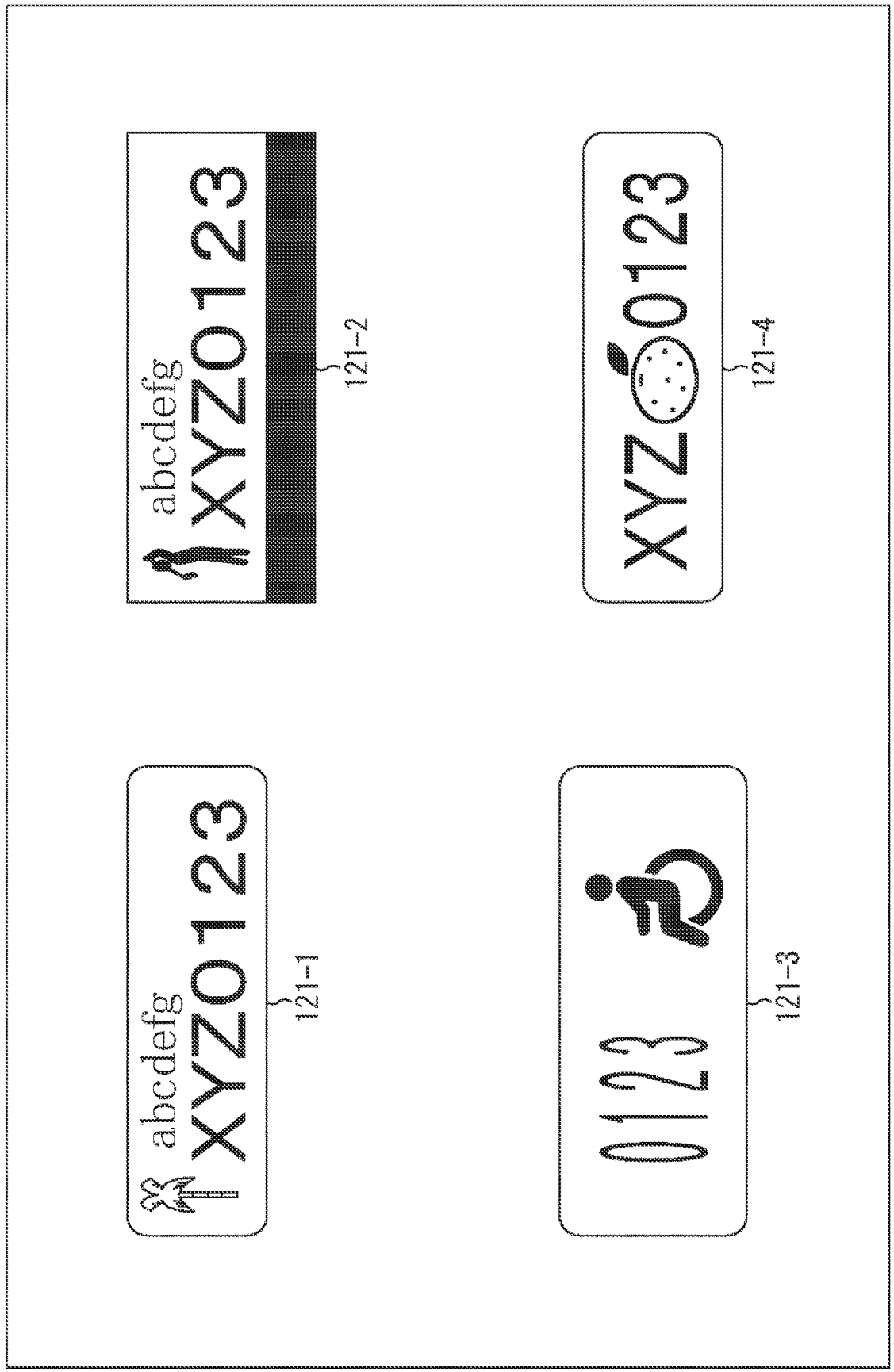

FIG. 8A

| VEHICLE REGISTRATION INFORMATION (VEHICLE REGISTRATION NUMBER, ETC.) | OWNER INFORMATION (NAME, ADDRESS, CONTACT NUMBER, ETC.) | REASON FOR ATTENTION (STOLEN, INCIDENT, ETC.) | VEHICLE FEATURE INFORMATION (DATE AND TIME, PLACE, VEHICLE NAME, VEHICLE TYPE, MODEL, VEHICLE COLOR, IMAGE, ETC.) |
|---|---|---|---|
| 211 | 212 | 213 | 214 |

| VEHICLE REGISTRATION INFORMATION (VEHICLE REGISTRATION NUMBER, ETC.) | OWNER INFORMATION (NAME, ADDRESS, CONTACT NUMBER, ETC.) | REASON FOR ATTENTION (STOLEN, INCIDENT, ETC.) |
|---|---|---|
| 211 | 212 | 213 |

221

| VEHICLE FEATURE INFORMATION (DATE AND TIME, PLACE, VEHICLE NAME, VEHICLE TYPE, MODEL, VEHICLE COLOR, IMAGE, ETC.) |
|---|
| 214 |

222

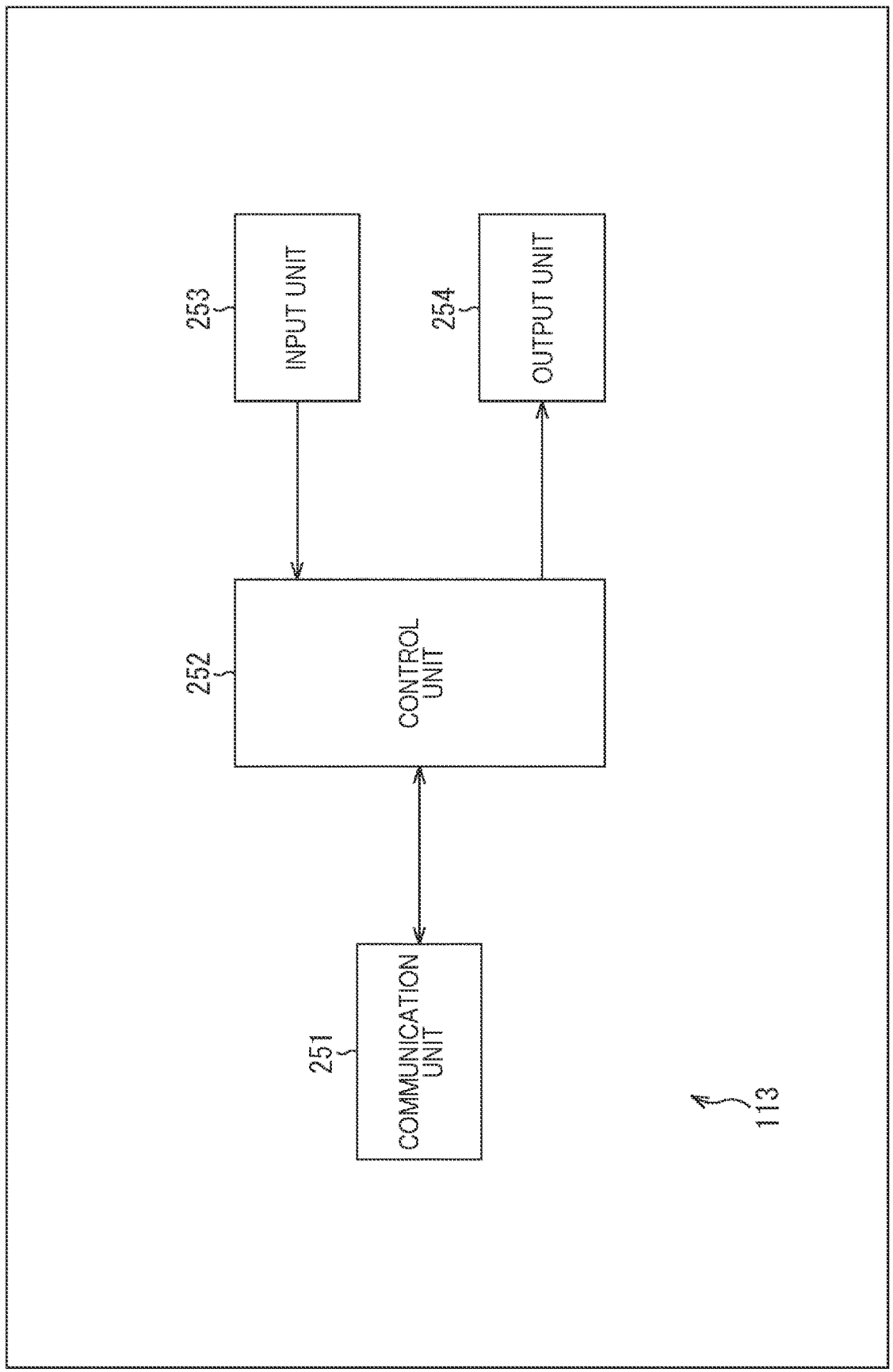

INFORMATION PROCESSING DEVICE AND METHOD

CROSS REFERENCE TO RELATED APPLICATIONS

This application is a U.S. National Phase of International Patent Application No. PCT/JP2020/037528 filed on Oct. 2, 2020, which claims priority benefit of Japanese Patent Application No. JP 2019-189081 filed in the Japan Patent Office on Oct. 16, 2019. Each of the above-referenced applications is hereby incorporated herein by reference in its entirety.

TECHNICAL FIELD

The present disclosure relates to an information processing device and method, and a program, and particularly to an information processing device and method, and a program that allow vehicle feature information to be registered in a database.

BACKGROUND ART

In recent years, methods for recognizing a vehicle registration number written on a number plate attached to a vehicle has been considered from a captured image of the vehicle have been devised (see, for example, Patent Document 1). Furthermore, vehicle management methods utilizing a recognition result of the vehicle registration number have been devised. For example, there is devised a method of recognizing a vehicle registration number and managing entry and exit of a vehicle using the recognized vehicle registration number in a parking lot and the like (see, for example, Patent Document 2).

CITATION LIST

Patent Document

Patent Document 1: Japanese Patent No. 4973341
Patent Document 2: Japanese Patent Application Laid-Open No. 2008-176472

SUMMARY OF THE INVENTION

Problems to be Solved by the Invention

However, Patent Document 1 and Patent Document 2 only describe that subsequent processes are performed using a vehicle registration number in a case where the vehicle registration number written on a number plate has been be recognized, and do not disclose processing coping with a case where a vehicle registration number has not been recognized.

The present disclosure has been made in view of such a situation, and makes it possible to perform processing related to vehicle management even in a case where no vehicle registration number is recognizable.

Solutions to Problems

An information processing device according to one aspect of the present technology is an information processing device including: a feature extraction unit that extracts feature information of a vehicle from a captured image on the basis of a detection result of a number plate of the vehicle in the captured image; and a feature registration unit that registers the feature information of the vehicle extracted by the feature extraction unit in a predetermined database.

An information processing method according to one aspect of the present technology is an information processing method including: extracting feature information of a vehicle from a captured image on the basis of a detection result of a number plate of the vehicle in the captured image; and registering the extracted feature information of the vehicle in a predetermined database.

A program according to one aspect of the present technology is a program that causes a computer to function as: a feature extraction unit that extracts feature information of a vehicle from a captured image on the basis of a detection result of a number plate of the vehicle in the captured image; and a feature registration unit that registers the feature information of the vehicle extracted by the feature extraction unit in a predetermined database.

In the information processing device and method and the program according to the aspects of the present technology, the feature information of the vehicle is extracted from the captured image on the basis of the detection result of the number plate of the vehicle in the captured image, and the extracted feature information of the vehicle is registered in the predetermined database.

BRIEF DESCRIPTION OF DRAWINGS

FIG. 4 is a block diagram illustrating a main configuration example of functional blocks of a corresponding processing unit.

FIG. 6 is a diagram illustrating an example of a number plate.

FIGS. 8A and 8B are diagrams illustrating a main configuration example of registration information in an attention-requiring vehicle database.

FIG. 9 is a block diagram illustrating a main configuration example of an input/output device.

MODE FOR CARRYING OUT THE INVENTION

Figure 1:
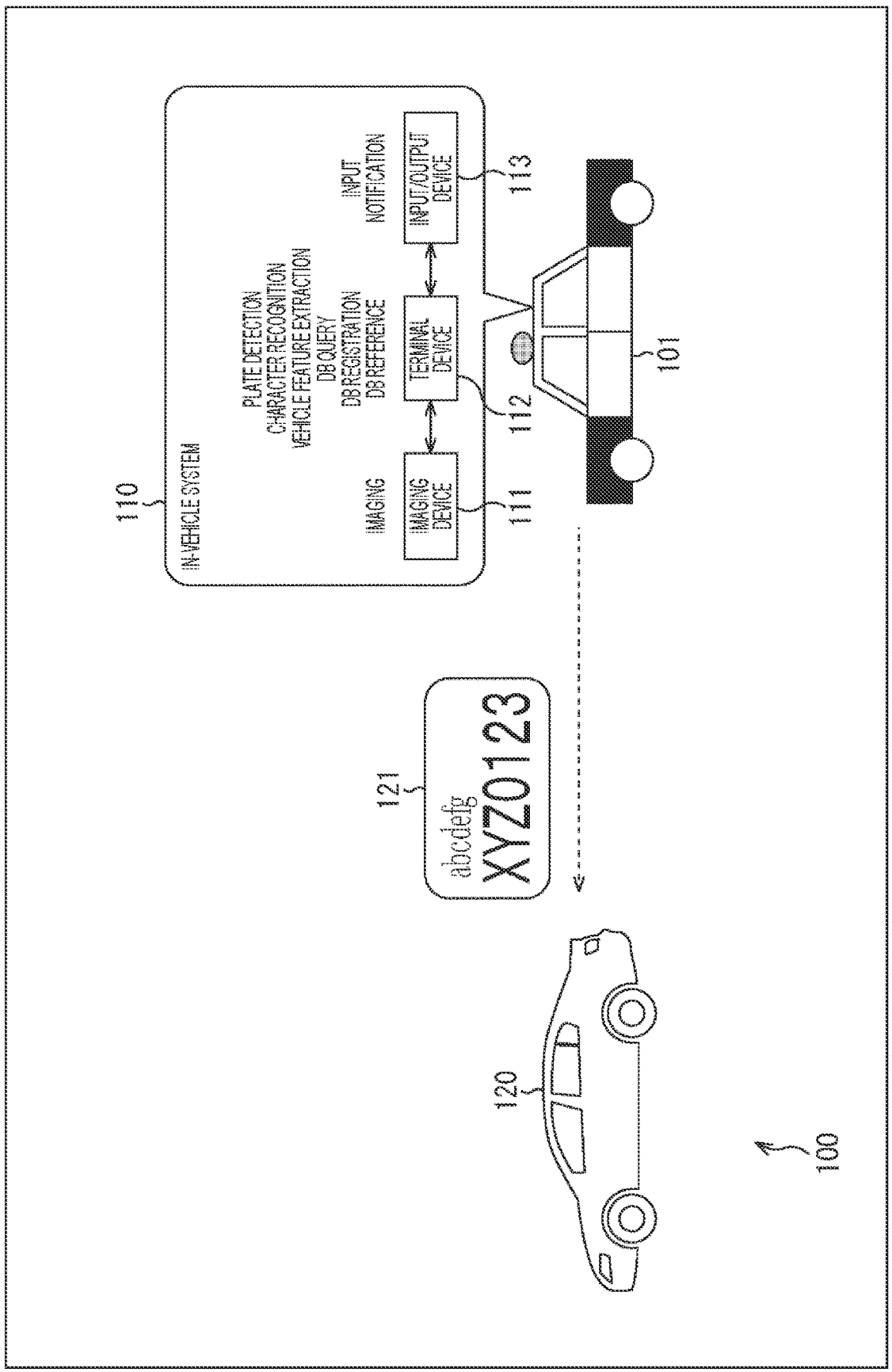
FIG. 1 is a diagram illustrating a main configuration example of a suspicious vehicle detection system.

Hereinafter, modes for carrying out the present disclosure (hereinafter referred to as embodiments) will be described. Note that a description will be given in the following order.

1. Character Recognition of Number Plate
2. First Embodiment (Suspicious Vehicle Detection System)
3. Second Embodiment (Suspicious Vehicle Detection System)
4. Third Embodiment (Suspicious Vehicle Detection System)
5. Fourth Embodiment (Suspicious Vehicle Detection System)
6. Appendix

1. Character Recognition of Number Plate

Recently, there is devised a method of recognizing a vehicle registration number written on a number plate attached to a vehicle has been considered from a captured image of the vehicle, for example, as described in Patent Document 1. Furthermore, there is devised a method of recognizing a vehicle registration number and managing entry and exit of a vehicle using the recognized vehicle registration number in a parking lot and the like as described in Patent Document 2.

However, Patent Document 1 and Patent Document 2 only describe that subsequent processes are performed using a vehicle registration number in a case where the vehicle registration number written on a number plate has been recognized. That is, these documents do not disclose processing coping to a case where a vehicle registration number has not been recognized.

For example, a system described in Patent Document 1 registers a recognized vehicle registration number in a database in a case where the vehicle registration number of a number plate included in a captured image has been recognized. On the other hand, the system only deletes the captured image in a case where a vehicle registration number has not been recognized. That is, in this case, the processing related to the registration in the database is not performed.

Furthermore, a system described in Patent Document 2 reads a vehicle registration number of a number plate and performs the management of entry and exit of a vehicle using the read vehicle registration number. For example, this system performs matching between the read vehicle registration number and a vehicle registration number read at the time of entry of the vehicle, and performs processing such as fee calculation processing and opening an exit gate in a case where the both match. On the other hand, Patent Document 2 does not describe processing in a case where no vehicle registration number has been read.

In this manner, "processing is not performed" is selected in these systems in the case where the vehicle registration number has not been recognized, and thus, it is difficult to perform processing related to vehicle management. For example, in the case of the method described in Patent Document 2, simply no processing is performed, and the exit gate is never opened if no vehicle registration number is recognizable. Therefore, the number of cases where the exit gate is not opened unnecessarily increases, and there is a possibility that the convenience as the system is reduced.

Therefore, even in a case where no vehicle registration number is recognizable, it has been required to perform some processing related to the vehicle management to cope with such a case.

Thus, feature information of a vehicle is extracted from a captured image on the basis of a detection result of a number plate of the vehicle in the captured image, and the extracted feature information of the vehicle is registered in a predetermined database.

For example, an information processing device is provided with: a feature extraction unit that extracts feature information of a vehicle from a captured image on the basis of a detection result of a number plate of the vehicle in the captured image; and a feature registration unit that registers the feature information of the vehicle extracted by the feature extraction unit in a predetermined database.

For example, a program causes a computer to function as: a feature extraction unit that extracts feature information of a vehicle from a captured image on the basis of a detection result of a number plate of the vehicle in the captured image; and a feature registration unit that registers the feature information of the vehicle extracted by the feature extraction unit in a predetermined database.

Accordingly, it is possible to perform the processing related to the vehicle management even in the case where no vehicle registration number is recognizable. For example, even in a case where a number plate of a vehicle is not detectable in a captured image, feature information of the vehicle can be extracted from the captured image and registered in the predetermined database. Therefore, it is possible to improve the performance of vehicle management (for example, suspicious vehicle detection to be described later) based on a recognition result of the number plate.

2. First Embodiment

<Suspicious Vehicle Detection System>
<System Configuration>

FIG. 1 is a block diagram illustrating an example of a main configuration of a suspicious vehicle detection system, which is one mode of an information processing system to which the present technology has been applied. A suspicious vehicle detection system 100 illustrated in FIG. 1 is a system that performs suspicious vehicle detection. The suspicious vehicle detection system 100 includes a patrol car 101 and an in-vehicle system 110 mounted on the patrol car 101.

The patrol car 101 patrols a city. The in-vehicle system 110 performs processing related to the suspicious vehicle detection. For example, the in-vehicle system 110 performs imaging on a road, a parking lot, and the like during the patrol of the patrol car 101, thereby obtaining information such as a vehicle registration number (in a case of the example of FIG. 1, "abcdefg" and "XYZ0123") described in a number plate 121 of a vehicle 120 that is moving, stopped, or parked. The in-vehicle system 110 determines whether or not the vehicle 120 is a suspicious vehicle on the basis of the information, and notifies a passenger (for example, a police officer) of the patrol car 101.

Note that the suspicious vehicle in the present specification is a vehicle to which attention needs to be paid by the police officer who is the passenger of the patrol car 101, and includes, for example, an inspection target vehicle, such as a so-called stolen vehicle or a wanted vehicle, a vehicle on which a number plate or the like is not correctly installed (a vehicle to which attention needs to be paid), and the like. Note that the vehicle to which attention needs to be paid is a vehicle for which the passenger (police officer) of the patrol car 101 needs to confirm (alternatively, is recommended to confirm) whether or not there is a problem, and includes, for example, a vehicle that is likely to be necessarily set as an inspection target, a vehicle that is likely to have poor maintenance, and the like.

Furthermore, the number plate in the present specification is a plate indicating an identification number for management of a vehicle registered in a national government or a local government. The number plate includes, for example, a car registration number plate for displaying a car registration number in Japan, a vehicle number plate for displaying a vehicle number, a sign, and the like. Furthermore, the number plate includes license plates in the United States and the like.

Note that the vehicle registration number in the present specification represents an identification number and the like indicated on the number plate. That is, the vehicle registration number includes the above-described car registration number, vehicle number, sign, and the like.

Note that not only a number but also a character, a symbol, and the like may be written on the number plate in practice. Hereinafter, the number, character, symbol, and the like written on the license plate will be described as "characters" without being distinguished from one another unless otherwise specified. Furthermore, the above-described vehicle registration number (car registration number, vehicle number, sign, and the like) may include not only a number but also a character, a symbol, and the like.

The in-vehicle system 110 includes an imaging device 111, a terminal device 112, and an input/output device 113. The terminal device 112 is connected to the imaging device 111 and the input/output device 113 to be capable of performing communication.

The imaging device 111 captures an image of the periphery (for example, the front) of the patrol car 101 and generates a captured image. The imaging device 111 supplies the generated captured image to the terminal device 112.

For example, the imaging device 111 is installed on the front, a side surface, or a roof outside the vehicle or in the vicinity of a windshield inside the vehicle (in a passenger compartment) of the patrol car 101 and captures an image of the front of the patrol car 101.

A timing of such imaging is arbitrary. For example, the imaging device 111 may perform imaging at all times during the patrol. Furthermore, for example, the imaging device 111 may perform imaging in a case where an instruction for imaging has been given by an application or the passenger (for example, police officer) of the patrol car 101. Furthermore, for example, the imaging device 111 may take images (generate a taken image (through image) that is not used for the suspicious vehicle detection) at all times during the patrol. Then, in a case where the vehicle 120 has been detected within an angle of view, that is, in a case where the vehicle 120 has been detected in the taken image (through image), the imaging device 111 may generate a captured image (an image that is used for the suspicious vehicle detection) and output the captured image to the terminal device 112.

Note that the captured image to be output may be a moving image or a still image. Furthermore, an imaging direction (the angle of view) of the imaging device 111 may be variable. For example, the imaging device 111 may be capable of zooming in, zooming out, panning, tilting, and the like.

The terminal device 112 performs processing related to the suspicious vehicle detection using the captured image. For example, the terminal device 112 performs processes such as detection of the number plate 121 of the vehicle 120 included in the captured image (plate detection), recognition of the vehicle registration number and the like written on the number plate (character recognition), and extraction of a vehicle feature included in the captured image (vehicle feature extraction).

Furthermore, for example, the terminal device 112 performs processes such as querying a database for the vehicle registration number, the vehicle feature, and the like (DB query), registration of an unregistered vehicle feature and the like into the database (DB registration), and reference to information in the database (DB registration).

Information regarding a suspicious vehicle is registered in the database. For example, information (for example, the vehicle registration number and the like) regarding vehicles set as inspection targets by the police and the like (for example, stolen vehicles, vehicles on a wanted list as vehicles involved in incidents or accidents, and the like) is registered in the database. Furthermore, for example, it is also possible to register, in the database, information regarding a feature of a vehicle (vehicle to which attention needs to be paid) whose vehicle registration number has not been recognized.

The terminal device 112 determines whether or not the vehicle 120 is a suspicious vehicle by querying the database for the information (the vehicle registration number, the feature of the vehicle 120, and the like) regarding the vehicle 120 obtained from the captured image. Furthermore, the terminal device 112 can also arbitrarily refer to information regarding a suspicious vehicle from the database.

The terminal device 112 is installed in, for example, the inside of the vehicle, a trunk, and the like of the patrol car 101. The terminal device 112 generates notification information for notifying the passenger and the like of the patrol car 101 of the information regarding the suspicious vehicle detection by the above-described processing, and supplies the notification information to the input/output device 113. A content of the notification information is arbitrary. For example, the notification information may include a warning (alert) indicating that a suspicious vehicle has been detected. Furthermore, the notification information may include information regarding the suspicious vehicle. Furthermore, the notification information may include a notification that information has been registered in the database. Furthermore, the notification information may include information indicating a reference result of the database. Furthermore, the notification information may include the captured image.

Note that the notification information may be image data, may be voice data, may be other data, for example, text data and the like, or may be a combination of a plurality of types of data, for example, an image, a voice, and the like.

Furthermore, the terminal device 112 acquires control information corresponding to an operation input received by the input/output device 113, and performs processing according to the control information. A content of this process is arbitrary. For example, the terminal device 112 can refer to information in the database or control the imaging of the imaging device 111 according to the control information thereof, that is, according to an instruction input by the passenger and the like of the patrol car 101.

The input/output device 113 is installed inside the vehicle (for example, in the vicinity of a driver seat or a passenger seat and the like). The input/output device 113 has an arbitrary input device (for example, a keyboard, a touch panel, and the like), and receives an operation input from the passenger (for example, police officer) and the like of the patrol car 101 through the input device. The input/output device 113 generates the control information corresponding to the operation input and supplies the control information to the terminal device 112.

Furthermore, the input/output device 113 has an arbitrary output device (for example, a monitor, a speaker, and the like), and outputs the notification information supplied from the terminal device 112 through the output device. That is, the input/output device 113 performs the notification related to the suspicious vehicle detection with respect to the passenger and the like, which is a user, of the patrol car 101.

Operation Example

Next, an operation example of the suspicious vehicle detection system 100 will be described. For example, while the patrol car 101 patrols a road, a parking lot, and the like, the imaging device 111 captures an image of the front of the patrol car 101, generates a captured image, and supplies the captured image to the terminal device 112.

The terminal device 112 detects the number plate 121 of the vehicle 120 from the captured image, and performs character recognition of a vehicle registration number and the like written on the number plate 121 in a case where the detection has succeeded. In a case where the entire vehicle registration number has been recognized, the database is queried for the vehicle registration number to determine whether or not the vehicle 120 is registered as a suspicious vehicle.

In a case where there is no match (the vehicle registration number is not registered), the processing for this number plate ends, and processing for another number plate (for example, processing for a new captured image) is performed. In a case where there is a match (the vehicle registration number has been registered), the terminal device 112 generates notification information indicating such a fact (that the vehicle 120 is the suspicious vehicle) and supplies the notification information to the input/output device 113. The input/output device 113 outputs the notification information for notifying a passenger of the patrol car 101.

Note that, in a case where at least a part of the vehicle registration number has not been recognized due to an accidental reason, the terminal device 112 ends the processing for the number plate and performs processing for another number plate (for example, processing for a new captured image). In a case where at least a part of the vehicle registration number has not been recognized for a non-accidental reason, the terminal device 112 extracts a feature of the vehicle 120 from the captured image. The terminal device 112 queries the database for the feature of the vehicle 120 to determine whether or not the vehicle 120 is registered as a suspicious vehicle.

In a case where there is a match (the feature has been registered), the terminal device 112 generates notification information indicating such a fact (that there is a possibility that the vehicle 120 is a suspicious vehicle) and supplies the notification information to the input/output device 113. The input/output device 113 outputs the notification information for notifying a passenger of the patrol car 101. Furthermore, the terminal device 112 registers the currently extracted feature in the database in association with a generation date and time and a generation place (that is, the date and time, and place where imaging of the vehicle 120 has been performed) of the captured image and the like.

In a case where there is no match (the feature is not registered), the terminal device 112 registers the currently extracted feature in the database in association with a generation date and time and a generation place (that is, the date and time, and place where imaging of the vehicle 120 has been performed) of the captured image and the like.

Note that the terminal device 112 extracts a feature of the vehicle 120 from the captured image in a case where the number plate 121 has not been detected for the vehicle 120. The terminal device 112 queries the database for the feature of the vehicle 120 to determine whether or not the vehicle 120 is registered as a suspicious vehicle.

In a case where there is a match (the feature has been registered), the terminal device 112 generates notification information indicating such a fact (that there is a possibility that the vehicle 120 is a suspicious vehicle) and supplies the notification information to the input/output device 113. The input/output device 113 outputs the notification information for notifying a passenger of the patrol car 101. Furthermore, the terminal device 112 registers the currently extracted feature in the database in association with a generation date and time and a generation place (that is, the date and time, and place where imaging of the vehicle 120 has been performed) of the captured image and the like.

In a case where there is no match (the feature is not registered), the terminal device 112 registers the currently extracted feature in the database in association with a generation date and time and a generation place (that is, the date and time, and place where imaging of the vehicle 120 has been performed) of the captured image and the like.

Of course, the above-described operation example is given as an example, and the processing performed by each of the devices is not limited to this example.

<Regarding Suspicious Vehicle Detection System 100>

As described above, the terminal device 112 extracts feature information of a vehicle from a captured image on the basis of a recognition result for a number plate of the vehicle in the captured image, and performs the processing using the extracted feature information of the vehicle. Therefore, the suspicious vehicle detection system 100 can perform the processing according to the recognition result for the number plate of the vehicle in the captured image. For example, even in a case where a vehicle registration number on a number plate is not recognizable, the suspicious vehicle detection system 100 can perform the processing coping with such a case.

For example, the terminal device 112 can extract the feature information of the vehicle from the captured image on the basis of a detection result of the number plate. For example, in a case where the number plate has not been detected, the terminal device 112 can extract the feature information of the vehicle from the captured image. Furthermore, for example, in a case where the number plate has been detected but at least a part of the vehicle registration number of the detected number plate has not been recognized, the terminal device 112 can extract the feature information of the vehicle from the captured image. Moreover, for example, in a case where at least a part of the vehicle registration number of the detected number plate has not been recognized for a predetermined reason, the terminal device 112 can extract the feature information of the vehicle from the captured image. Therefore, the suspicious vehicle detection system 100 can perform the processing using the feature information of the vehicle even in these cases.

Furthermore, for example, the terminal device 112 can register the extracted feature information in the database in each of the above cases. Therefore, the suspicious vehicle detection system 100 can utilize the feature information for the suspicious vehicle detection.

Note that the above description has been given assuming that the in-vehicle system 110 includes the imaging device 111, the terminal device 112, and the input/output device 113, but the configuration of the in-vehicle system 110 is arbitrary.

For example, the imaging device 111 and the terminal device 112 may be configured as one device. Furthermore, the imaging device 111 and the input/output device 113 may be configured as one device. Moreover, the terminal device 112 and the input/output device 113 may be configured as one device. Of course, the imaging device, the terminal device 112, and the input/output device 113 may be configured as one device.

<Imaging Device>

Figure 2:
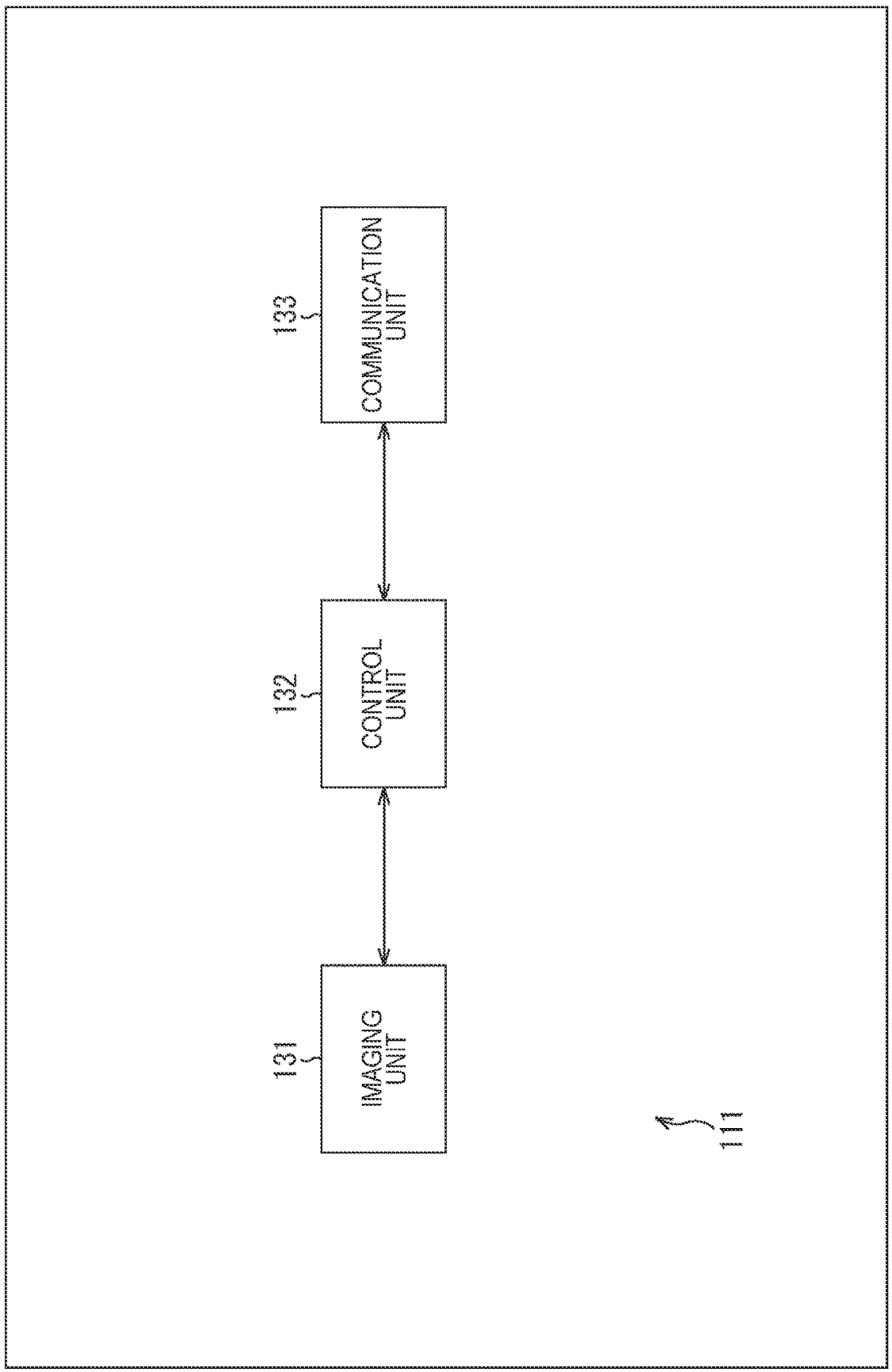
FIG. 2 is a block diagram illustrating a main configuration example of an imaging device.

Next, configurations of the respective devices will be described. FIG. 2 is a block diagram illustrating an example of a main configuration of the imaging device 111, which is one mode of an information processing device to which the present technology has been applied. As illustrated in FIG. 2, the imaging device 111 includes an imaging unit 131, a control unit 132, and a communication unit 133.

The imaging unit 131 has an optical system and a light receiving element, and performs processing related to imaging of a subject. For example, the imaging unit 131 is controlled by the control unit 132 and can capture an image of a subject (for example, the vehicle 120) and generate a captured image including the subject (for example, a captured image including the vehicle 120).

A timing (including moment and period) at which the imaging unit 131 performs imaging is arbitrary. For example, the imaging unit 131 may capture an image of a subject at a timing an instruction on which is given by the control unit 132 to generate a captured image. Furthermore, the imaging unit 131 may constantly capture images of a subject to generate captured images while being controlled and activated by the control unit 132.

Moreover, the imaging unit 131 may constantly take images while being controlled and activated by the control unit 132, and generate a captured image in a case where the vehicle 120 has been detected in the taken image (through image). Note that the detection of the vehicle 120 in the taken image may be performed by the imaging unit 131, may be performed by the control unit 132, or may be performed by another device (for example, the terminal device 112).

In such imaging, the imaging unit 131 may generate a single still image, a plurality of still images, or a moving image as the captured image including the vehicle 120. Of course, the imaging unit 131 may generate both the captured image of the moving image and the captured image of the still image. Furthermore, the imaging unit 131 may be capable of changing an image size, an aspect ratio, or the both of the captured image between the case of the moving image and the case of the still image. That is, the imaging unit 131 may be capable of generating the captured image of the moving image and the captured image of the still image in mutually different image sizes. Furthermore, the imaging unit 131 may be capable of generating the captured image of the moving image and the captured image of the still image at mutually different aspect ratios. Moreover, the imaging unit 131 may be capable of generating the captured image of the moving image and the captured image of the still image in mutually different image sizes at mutually different aspect ratios.

Furthermore, the imaging unit 131 can supply the captured image (still image, moving image, or both) to the control unit 132. Of course, the imaging unit 131 can supply the taken image to the control unit 132.

Note that the imaging unit 131 is controlled by the control unit 132 and can set an imaging parameter. Furthermore, the imaging unit 131 may be capable of zooming in, zooming out, panning, tilting, and the like. For example, the imaging unit 131 may be controlled by the control unit 132 to be capable of performing a setting of an imaging direction, a setting of a zoom position, focusing (so-called autofocus), aperture adjustment, and the like.

The imaging unit 131 can have any configuration in addition to the above-described optical system, light receiving element, and the like. For example, the imaging unit 131 may be configured using a logic circuit that implements the above-described processing by using the optical system and the light receiving element. Furthermore, the imaging unit 131 may have, for example, a central processing unit (CPU), a read only memory (ROM), a random access memory (RAM), and the like, and may execute a program using these parts to implement the above-described processing using the optical system and the light receiving element. Of course, the imaging unit 131 may have both the above configurations such that a part of the above-described processing is implemented by the logic circuit, and the other part is implemented by executing the program.

The control unit 132 causes the imaging unit 131 and the communication unit 133 to perform processing related to imaging. For example, the control unit 132 can cause the imaging unit 131 to capture an image of a subject and acquire the captured image. Furthermore, the control unit 132 can supply the captured image to the communication unit 133 to be transmitted to the terminal device 112. Moreover, the control unit 132 can acquire information supplied from the terminal device 112 via the communication unit 133. For example, the control unit 132 can acquire control information supplied from the terminal device 112 via the communication unit 133. Furthermore, the control unit 132 can control the imaging unit 131 according to the control information. For example, the control unit 132 can cause the imaging unit 131 to perform imaging, to set the imaging parameter, and to perform the setting of the imaging direction, the setting of the zoom position, focusing (so-called autofocus), the aperture adjustment, and the like according to the control information.

The control unit 132 can have any configuration. For example, the control unit 132 may be configured using a logic circuit that implements the above-described processing. Furthermore, the control unit 132 may have, for example, a CPU, a ROM, a RAM, and the like, and execute a program using these parts to implement the above-described processing. Of course, the control unit 132 may have both the above configurations such that a part of the above-described processing is implemented by the logic circuit, and the other part is implemented by executing the program.

The communication unit 133 has a communication interface and communicates with other devices via the communication interface. A scheme (standard) of such communication is arbitrary, and wireless communication, wired communication, or the both may be used.

For example, the communication unit 133 can communicate with the terminal device 112 and supply the captured image supplied from the control unit 132 to the terminal device 112. Furthermore, the communication unit 133 can communicate with the terminal device 112, acquire the control information supplied from the terminal device 112, and supply the control information to the control unit 132.

The communication unit 133 can have any configuration in addition to the above-described communication interface. For example, the communication unit 133 may be configured using a logic circuit that implements the above-described processing by using a communication interface. Furthermore, the communication unit 133 may have, for example, a CPU, a ROM, a RAM, and the like, and execute a program using these parts to implement the above-described processing by using the communication interface. Of course, the communication unit 133 may have both the above configurations such that a part of the above-described processing is implemented by the logic circuit, and the other part is implemented by executing the program.

<Control Device>

Figure 3:
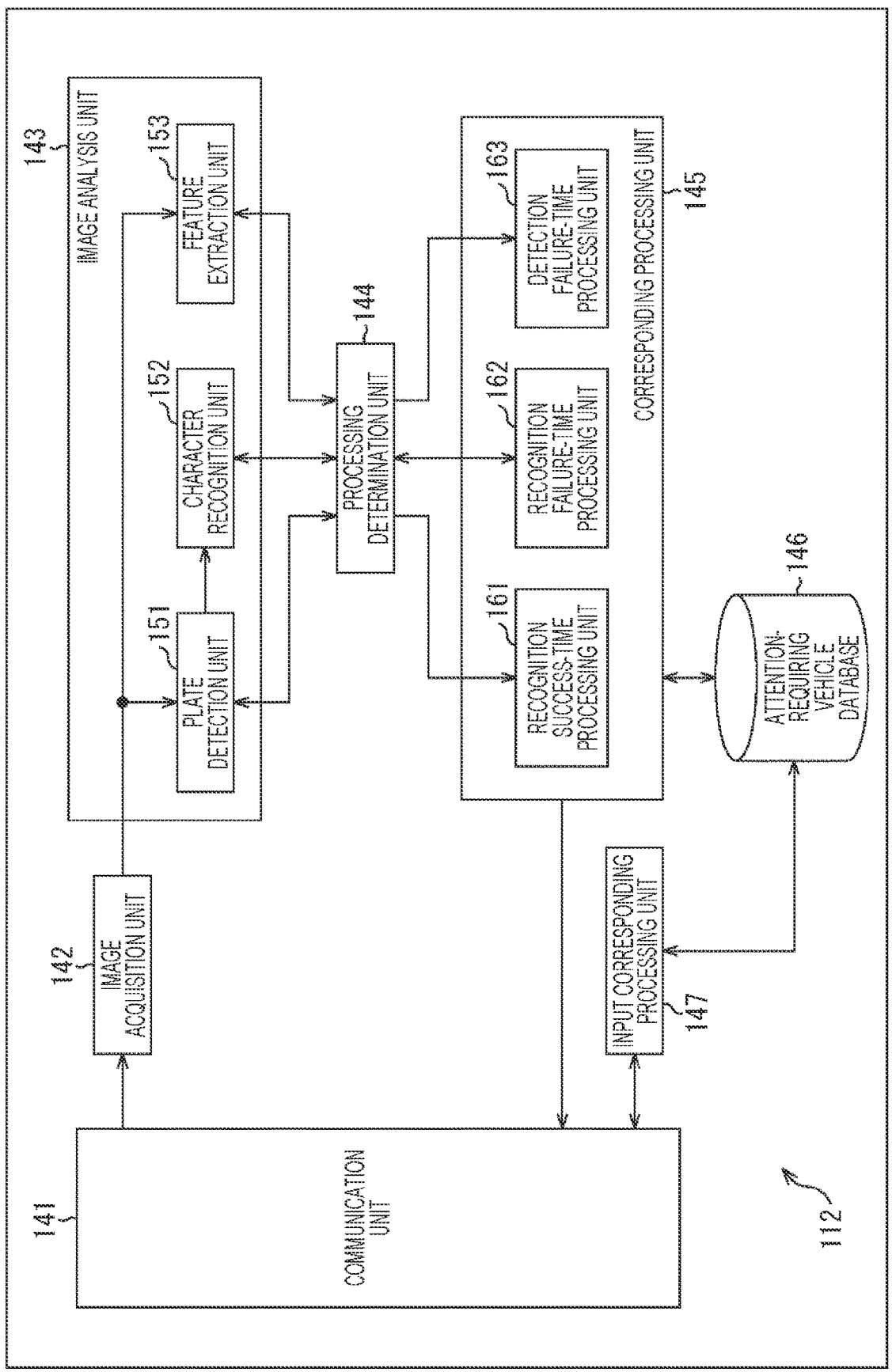
FIG. 3 is a block diagram illustrating a main configuration example of a terminal device.

FIG. 3 is a block diagram illustrating an example of a main configuration of the terminal device 112, which is one mode of an information processing device to which the present technology has been applied. As illustrated in FIG. 3, the terminal device 112 includes a communication unit 141, an image acquisition unit 142, an image analysis unit 143, a processing determination unit 144, a corresponding processing unit 145, an attention-requiring vehicle database 146, and an input corresponding processing unit 147.

The communication unit 141 has a communication interface and communicates with other devices via the communication interface. A scheme (standard) of such communication is arbitrary, and wireless communication, wired communication, or the both may be used.

For example, the communication unit 141 can communicate with other devices to transmit and receive any information. For example, the communication unit 141 may communicate with the imaging device 111 to receive a captured image supplied from the imaging device 111, and supply the captured image to the image acquisition unit 142. Furthermore, the communication unit 141 may communicate with the input/output device 113 to receive control information and the like supplied from the input/output device 113, and supply the control information and the like to the input corresponding processing unit 147. Furthermore, the communication unit 141 may communicate with the imaging device 111 and the input/output device 113 to transmit the control information supplied from the input corresponding processing unit 147 to the imaging device 111 and the input/output device 113.

The communication unit 141 can have any configuration in addition to the above-described communication interface. For example, the communication unit 141 may be configured using a logic circuit that implements the above-described processing by using a communication interface. Furthermore, the communication unit 141 may have, for example, a CPU, a ROM, a RAM, and the like, and execute a program using these parts to implement the above-described processing by using the communication interface. Of course, the communication unit 141 may have both the above configurations such that a part of the above-described processing is implemented by the logic circuit, and the other part is implemented by executing the program.

The image acquisition unit 142 performs processing related to acquisition of a captured image from another device. For example, the image acquisition unit 142 can acquire a captured image from the imaging device 111 via the communication unit 141. Furthermore, the image acquisition unit 142 can supply the acquired captured image to the image analysis unit 143 (a plate detection unit 151 and a feature extraction unit 153).

The image acquisition unit 142 can have any configuration. For example, the image acquisition unit 142 may be configured using a logic circuit that implements the above-described processing. Furthermore, the image acquisition unit 142 may have, for example, a CPU, a ROM, a RAM, and the like, and execute a program using these parts to implement the above-described processing. Of course, the image acquisition unit 142 may have both the above configurations such that a part of the above-described processing is implemented by the logic circuit, and the other part is implemented by executing the program.

The image analysis unit 143 performs processing related to image analysis. The image analysis unit 143 includes the plate detection unit 151, a character recognition unit 152, and the feature extraction unit 153 as functional blocks.

The plate detection unit 151 performs processing related to detection of a number plate. For example, the plate detection unit 151 can acquire a captured image supplied from the image acquisition unit 142. Furthermore, the plate detection unit 151 can perform image analysis of the captured image to detect the number plate 121 of the vehicle 120.

Moreover, the plate detection unit 151 can supply information indicating a detection result to the processing determination unit 144 as an image analysis result.

Furthermore, the plate detection unit 151 is controlled by the processing determination unit 144 and can perform processing. For example, in a case where the number plate 121 has been detected, the plate detection unit 151 may be controlled by the processing determination unit 144 to extract a partial area including the detected number plate 121 from the captured image and supply an image of the partial area to the character recognition unit 152.

Note that, here, the plate detection unit 151 may supply the entire captured image to the character recognition unit 152. However, the character recognition unit 152 can limit an area to be subjected to character recognition since the plate detection unit 151 supplies the image of the partial area as described above. Therefore, the character recognition unit 152 can suppress an increase of a load of the character recognition (typically, reduce the load) as compared with a case where the entire captured image is supplied.

The character recognition unit 152 performs processing related to the character recognition. For example, the character recognition unit 152 is controlled by the processing determination unit 144 and can perform processing related to the character recognition of characters written on the number plate 121 detected by the plate detection unit 151.

For example, in a case where the number plate 121 has been detected, the character recognition unit 152 may be controlled by the processing determination unit 144 to acquire the captured image (the image of the partial area including the detected number plate 121 or the entire captured image) supplied from the plate detection unit 151. Furthermore, in such a case, the character recognition unit 152 may be controlled by the processing determination unit 144 to perform the character recognition of the characters written on the detected number plate 121. That is, the character recognition unit 152 may perform the character recognition processing on the acquired captured image.

Moreover, the character recognition unit 152 can supply information indicating a character recognition result to the processing determination unit 144 as an image analysis result.

The feature extraction unit 153 performs processing related to the vehicle feature extraction. For example, the feature extraction unit 153 is controlled by the processing determination unit 144 and can perform processing related to extraction of a feature of the vehicle 120 included in a captured image supplied from the image acquisition unit 142.

For example, the feature extraction unit 153 is controlled by the processing determination unit 144 and can acquire the captured image supplied from the image acquisition unit 142.

For example, in a case where the number plate 121 has not been detected, the feature extraction unit 153 may be controlled by the processing determination unit 144 to acquire the captured image supplied from the image acquisition unit 142. Furthermore, in a case where at least a part of characters written on the number plate 121 has not been recognized, the feature extraction unit 153 may be controlled by the processing determination unit 144 to acquire the captured image supplied from the image acquisition unit 142. For example, in a case where at least a part of the characters written on the number plate 121 has not been recognized for a predetermined reason, the feature extraction unit 153 may acquire the captured image. The "predetermined reason" may be any reason. Hereinafter, a case where the predetermined reason is a "non-accidental reason" will be described as an example.

Furthermore, the feature extraction unit 153 is controlled by the processing determination unit 144 and can extract a feature of the vehicle 120 included in the acquired captured image. That is, the feature extraction unit 153 can extract feature information of the vehicle 120 from the captured image on the basis of a detection result of the number plate 121 of the vehicle 120 in the captured image.

For example, in the case where the number plate 121 has not been detected, the feature extraction unit 153 may be controlled by the processing determination unit 144 to extract the feature of the vehicle 120 included in the acquired captured image. Furthermore, in the case where at least a part of characters written on the number plate 121 has not been recognized, the feature extraction unit 153 may be controlled by the processing determination unit 144 to extract the feature of the vehicle 120 included in the acquired captured image. Moreover, in the case where at least a part of the characters written on the number plate 121 has not been recognized for the predetermined reason (for example, non-accidental reason), the feature extraction unit 153 may be controlled by the processing determination unit 144 to extract the feature of the vehicle 120 included in the acquired captured image.

Note that any feature may be extracted by the feature extraction unit 153. For example, a feature related to an exterior of the vehicle 120. That is, the feature extraction unit 153 may extract vehicle exterior feature information indicating the feature related to the exterior of the vehicle 120 from the captured image. The feature indicated by the vehicle exterior feature information may be any feature as long as relating to the exterior of the vehicle 120. For example, the vehicle exterior feature information may indicate at least one of a vehicle name, a vehicle type, a model, or a vehicle color of the vehicle 120.

Furthermore, the vehicle exterior feature information may indicate a feature unique to the vehicle 120 (a feature with which the vehicle 120 can be identified). For example, the vehicle exterior feature information may indicate a scratch on the vehicle 120 as the feature unique to the vehicle 120. Furthermore, the vehicle exterior feature information may indicate a component of the vehicle 120 (for example, optional equipment, an altered site, and the like) as the feature unique to the vehicle 120. Furthermore, the vehicle exterior feature information may indicate a traveling direction (orientation) of the vehicle 120 as the feature unique to the vehicle 120.

Moreover, the feature extracted by the feature extraction unit 153 may be a feature related to a passenger of the vehicle 120. That is, the feature extraction unit 153 may extract passenger feature information indicating the feature related to the passenger of the vehicle 120 from the captured image. The feature indicated by the passenger feature information may be any information as long as relating to the passenger of the vehicle 120. For example, the gender of a passenger, the approximate age of a passenger, the number of passengers, a garment or an accessory of a passenger, and the like may be used, or other information may be used. The passenger feature information may include a plurality of types of features.

The feature extraction unit 153 can supply information (also referred to as feature information) indicating the extracted feature to the processing determination unit 144 as the image analysis result.

Note that the feature extraction unit 153 may include at least one of a date and time or a place where imaging of the vehicle 120 has been performed (that is, the date and time or the place where the captured image has been generated) in the feature information.

The above image analysis unit 143 can have any configuration. For example, the image analysis unit 143 may be configured using a logic circuit that implements the processing of each of the above-described functional blocks.

Furthermore, the image analysis unit 143 may have, for example, a CPU, a ROM, a RAM, and the like, and execute a program using these parts to implement the processing of each of the above-described functional blocks. Of course, the image analysis unit 143 may have both the above configurations such that a part of the processing of each of the above-described functional blocks is implemented by the logic circuit, and the other part is implemented by executing the program.

Note that such image analysis (the number plate detection, the character recognition, and the vehicle feature extraction) is performed by any method. For example, the image analysis unit 143 may perform such image analysis by using an evaluator generated using learning (so-called machine learning, deep learning, and the like). Furthermore, the image analysis unit 143 may perform learning by inputting the captured image (entire image), the image of the partial area including the number plate 121, the information indicating the vehicle registration number, the information indicating the vehicle feature, and the like, as learning data, to a predetermined calculation model (for example, a calculation model based on a multilayer neural network) to generate an evaluator, and perform the above-described image analysis using the evaluator.

The processing determination unit 144 determines processing to be executed on the basis of the image analysis result of the image analysis unit 143.

For example, the processing determination unit 144 can control the processing of the image analysis unit 143 on the basis of an analysis result of the captured image supplied from the image analysis unit 143.

For example, the processing determination unit 144 can control the plate detection unit 151, the character recognition unit 152, and the feature extraction unit 153 on the basis of the information indicating the detection result supplied from the plate detection unit 151. For example, in a case where the number plate 121 has been detected, the processing determination unit 144 may cause the plate detection unit 151 to supply the captured image (the image of the partial area including the detected number plate 121 or the entire captured image) to the character recognition unit 152. Moreover, the processing determination unit 144 may cause the character recognition unit 152 to acquire a captured image, and perform the character recognition processing on the captured image. Furthermore, for example, in a case where the number plate 121 has not been detected, the processing determination unit 144 may cause the feature extraction unit 153 to acquire a captured image from the image acquisition unit 142 and extract a feature of the vehicle 120 from the captured image.

Furthermore, the processing determination unit 144 can control the feature extraction unit 153 on the basis of the information indicating the character recognition result supplied from the character recognition unit 152. Furthermore, for example, in a case where at least a part of characters written on the number plate 121 has not been recognized, the processing determination unit 144 may cause the feature extraction unit 153 to acquire a captured image from the image acquisition unit 142 and extract a feature of the vehicle 120 from the captured image. For example, in a case where the characters have not been recognized for a non-accidental reason, the processing determination unit 144 may cause the feature extraction unit 153 to acquire a captured image from the image acquisition unit 142 and extract a feature of the vehicle 120 from the captured image.

That is, the processing determination unit 144 can cause the feature extraction unit 153 to extract feature information of the vehicle 120 from the captured image on the basis of the recognition result of the number plate 121 of the vehicle 120 in the captured image.

Furthermore, the processing determination unit 144 can control the processing of the corresponding processing unit 145 on the basis of an analysis result of the captured image supplied from the image analysis unit 143. For example, the processing determination unit 144 can cause the corresponding processing unit 145 to execute processing according to the analysis result of the captured image.

For example, in a case where all characters written on the number plate 121 have been recognized (in a case where the vehicle registration number has been recognized), the processing determination unit 144 may cause the corresponding processing unit 145 (a recognition success-time processing unit 161) to execute processing corresponding to such a case. Furthermore, in a case where at least a part of the characters written on the number plate 121 has not been recognized, the processing determination unit 144 may cause the corresponding processing unit 145 (a recognition failure-time processing unit 162) to execute processing corresponding to such a case. Moreover, in a case where the number plate 121 has not been detected, the processing determination unit 144 may cause the corresponding processing unit 145 (a detection failure-time processing unit 163) to execute processing corresponding to such a case.

For example, the processing determination unit 144 can cause the corresponding processing unit 145 to perform processing using the feature information of the vehicle 120 extracted by the feature extraction unit 153 as processing according to the analysis result of the captured image.

The processing determination unit 144 can have any configuration. For example, the processing determination unit 144 may be configured using a logic circuit that implements the above-described processing. Furthermore, the processing determination unit 144 may have, for example, a CPU, a ROM, a RAM, and the like, and execute a program using these parts to implement the above-described processing. Of course, the processing determination unit 144 may have both the above configurations such that a part of the above-described processing is implemented by the logic circuit, and the other part is implemented by executing the program.

The corresponding processing unit 145 is controlled by the processing determination unit 144 and performs processing corresponding to the image analysis result. The corresponding processing unit 145 includes the recognition success-time processing unit 161, the recognition failure-time processing unit 162, and the detection failure-time processing unit 163 as functional blocks.

The recognition success-time processing unit 161 is controlled by the processing determination unit 144 and performs the processing corresponding to the case where the number plate 121 has been detected and all the characters written on the number plate 121 have been recognized (case where the vehicle registration number has been recognized).

The recognition failure-time processing unit 162 is controlled by the processing determination unit 144 and performs the processing corresponding to the case where the number plate 121 has been detected and at least a part of the characters written on the number plate 121 has not been recognized.

The detection failure-time processing unit 163 is controlled by the processing determination unit 144 and performs the processing corresponding to the case where the number plate 121 has not been detected.

For example, the corresponding processing unit 145 is controlled by the processing determination unit 144 and can perform processing using the feature information of the vehicle 120 extracted by the feature extraction unit 153 by appropriately using these processing units.

Furthermore, the corresponding processing unit 145 (the recognition success-time processing unit 161, the recognition failure-time processing unit 162, and the detection failure-time processing unit 163) can supply any information (for example, the notification information) to another device (for example, the input/output device 113 and the like) via the communication unit 141 as necessary.

The attention-requiring vehicle database 146 is a database in which information regarding a suspicious vehicle is registered in advance, and has an arbitrary storage medium and the like, for example, a hard disk, a semiconductor memory, and the like. The attention-requiring vehicle database 146 stores and manages the information regarding the suspicious vehicle. For example, the attention-requiring vehicle database 146 can compare the characters (vehicle registration number), the vehicle feature, or the like queried by the corresponding processing unit 145 (the recognition success-time processing unit 161, the recognition failure-time processing unit 162, or the detection failure-time processing unit 163) with the registered information, and return a match or a mismatch. Furthermore, the attention-requiring vehicle database 146 may also return information regarding such a registered vehicle in the case of the match.

Note that the "match" here is not limited to an exact match. For example, a case of encompassing queried information and a case of approximating the queried information may be included. Furthermore, in a case where the case of approximating to the queried information is included in the "match", the attention-requiring vehicle database 146 may also return information indicating the degree of approximation.

Furthermore, the attention-requiring vehicle database 146 can register information supplied from the corresponding processing unit 145 (the recognition failure-time processing unit 162 and the detection failure-time processing unit 163). For example, the attention-requiring vehicle database 146 may register the feature information of the vehicle 120 supplied from the corresponding processing unit 145 (the recognition failure-time processing unit 162 and the detection failure-time processing unit 163).

Moreover, the attention-requiring vehicle database 146 can also retrieve information requested from the input corresponding processing unit 147 from pieces of the registered information and return the retrieved information.

The attention-requiring vehicle database 146 can have any configuration in addition to the above-described storage medium. For example, the attention-requiring vehicle database 146 may be configured using a logic circuit that implements the above-described processing using the storage medium. Furthermore, the attention-requiring vehicle database 146 may have, for example, a CPU, a ROM, a RAM, and the like, and execute a program using these parts to implement the above-described processing by using the storage medium. Of course, the attention-requiring vehicle database 146 may have both the above configurations such that a part of the above-described processing is implemented by the logic circuit, and the other part is implemented by executing the program.

The input corresponding processing unit 147 performs processing corresponding to an operation input received by the input/output device 113. For example, the input corresponding processing unit 147 can acquire control information corresponding to the operation input transmitted from the input/output device 113 via the communication unit 141.

Furthermore, the input corresponding processing unit 147 can perform processing according to the control information. For example, in a case where the control information is control information related to the imaging device 111, the input corresponding processing unit 147 may supply the control information to the imaging device 111 via the communication unit 141. Furthermore, in a case where the control information is control information related to the terminal device 112, the input corresponding processing unit 147 may control the respective processing units of the terminal device 112 on the basis of the control information.

Furthermore, in a case where the control information relates to reference to the attention-requiring vehicle database 146, the input corresponding processing unit 147 may refer to the attention-requiring vehicle database 146 and acquire information requested by the control information. In such a case, the input corresponding processing unit 147 may supply the information, acquired by referring to the attention-requiring vehicle database 146, to the input/output device 113 via the communication unit 141 for output (for example, for display as an image).

<Corresponding Processing Unit>

FIG. 4 is a diagram illustrating a main configuration example of functional blocks included in the corresponding processing unit 145. As illustrated in FIG. 4, the recognition success-time processing unit 161 includes a character query unit 171 and a notification processing unit 172 as functional blocks.

The character query unit 171 is controlled by the processing determination unit 144, and performs processing related to a query of characters (a character string) recognized by the character recognition unit 152 with respect to the attention-requiring vehicle database 146. For example, the character query unit 171 can acquire information indicating the characters recognized by the character recognition unit 152 (for example, the vehicle registration number displayed on the number plate 121) supplied from the processing determination unit 144. Furthermore, the character query unit 171 can supply the information to the attention-requiring vehicle database 146 and query the characters (character string) recognized by the character recognition unit 152. Moreover, the character query unit 171 can acquire information indicating a result of the query supplied from the attention-requiring vehicle database 146.

The notification processing unit 172 is controlled by the processing determination unit 144, and performs processing related to notification of the character query result of the character query unit 171. For example, the notification processing unit 172 can generate notification information for providing notification of the query result on the basis of the information indicating the query result acquired from the attention-requiring vehicle database 146 by the character query unit 171. For example, in a case where a queried vehicle registration number is registered in the attention-requiring vehicle database 146, the notification processing unit 172 may generate notification information indicating such a fact (that the vehicle 120 is a suspicious vehicle). The notification information may be image data, may be voice data, may be other data, for example, text data and the like, or may be a combination of a plurality of types of data, for example, an image, a voice, and the like.

Furthermore, the notification processing unit 172 can supply the generated notification information to the input/output device 113 via the communication unit 141.

That is, for example, in a case where the entire vehicle registration number has been recognized, the recognition success-time processing unit 161 can query the attention-requiring vehicle database 146 for the vehicle registration number, generate the notification information for providing notification of the query result, and supply the generated notification information to the input/output device 113 via the communication unit 141 for output.

As illustrated in FIG. 4, the recognition failure-time processing unit 162 includes a reason determination unit 181, a feature query unit 182, a notification processing unit 183, and a feature registration unit 184 as functional blocks.

The reason determination unit 181 performs processing related to determination of a reason why at least a part of characters has not been recognized. For example, in response to a request from the processing determination unit 144, the reason determination unit 181 can determine a reason why the character recognition unit 152 has not recognized at least a part of characters in a character string written on the number plate 121, and return a result obtained by the determination to the processing determination unit 144.

The feature query unit 182 is controlled by the processing determination unit 144, and performs processing related to a query of feature information of the vehicle 120 extracted by the feature extraction unit 153 with respect to the attention-requiring vehicle database 146. For example, the feature query unit 182 can acquire the feature information of the vehicle 120 extracted by the feature extraction unit 153 and supplied from the processing determination unit 144. Furthermore, the feature query unit 182 can supply the feature information to the attention-requiring vehicle database 146 to raise a query. Moreover, the feature query unit 182 can acquire information indicating a result of the query supplied from the attention-requiring vehicle database 146.

The notification processing unit 183 is controlled by the processing determination unit 144, and performs processing related to notification of the query result of the feature information obtained by the feature query unit 182. For example, the notification processing unit 183 can generate notification information for providing notification of the query result on the basis of the information indicating the query result acquired from the attention-requiring vehicle database 146 by the feature query unit 182. For example, in a case where queried feature information matches feature information registered in the attention-requiring vehicle database 146, that is, in a case where there is information corresponding to the queried feature information in the attention-requiring vehicle database 146, the notification processing unit 183 may generate notification information indicating such a fact (that there is a possibility that the vehicle 120 is a suspicious vehicle). The notification information may be image data, may be voice data, may be other data, for example, text data and the like, or may be a combination of a plurality of types of data, for example, an image, a voice, and the like.

Furthermore, the notification processing unit 183 can supply the generated notification information to the input/output device 113 via the communication unit 141.

The feature registration unit 184 is controlled by the processing determination unit 144, and performs processing related to registration of feature information of the vehicle 120 extracted by the feature extraction unit 153 with respect to the attention-requiring vehicle database 146. For example, the feature registration unit 184 can supply the feature information of the vehicle 120 acquired from the processing determination unit 144 to the attention-requiring vehicle database 146 for registration. At that time, the feature registration unit 184 can register a place where imaging of the vehicle 120 has been performed in association with the corresponding feature information as an appearance result of the vehicle 120.

That is, for example, in a case where at least a part of a vehicle registration number of the vehicle 120 has not been recognized, the recognition failure-time processing unit 162 can acquire feature information of the vehicle 120 and query the attention-requiring vehicle database 146. Then, in a case where the queried feature information matches feature information registered in the attention-requiring vehicle database 146, that is, in a case where there is information corresponding to the queried feature information in the attention-requiring vehicle database 146, the recognition failure-time processing unit 162 can generate notification information indicating such a fact (that there is a possibility that the vehicle 120 is a suspicious vehicle), and supply the generated notification information to the input/output device 113 via the communication unit 141 for output. Moreover, in this case, the recognition failure-time processing unit 162 can register the feature information of the vehicle 120 in the attention-requiring vehicle database 146 For example, in a case where information corresponding to the feature information exists in the attention-requiring vehicle database 146, the recognition failure-time processing unit 162 may register a place where imaging of the vehicle 120 has been performed in association with the corresponding information as an appearance result of the vehicle 120.

Furthermore, in a case where the queried feature information does not match the feature information registered in the attention-requiring vehicle database 146, that is, in a case where there is no information corresponding to the feature information for which the attention-requiring vehicle database 146 has been queried, the recognition failure-time processing unit 162 can register the feature information of the vehicle 120 in the attention-requiring vehicle database 146.

Note that the feature query unit 182 may query the attention-requiring vehicle database 146 for not only the feature information but also a part of a recognized vehicle registration number. That is, for example, in a case where a part of the vehicle registration number of the vehicle 120 has been recognized, the recognition failure-time processing unit 162 may query the attention-requiring vehicle database 146 for the "feature information" and the "part of the recognized vehicle registration number" of the vehicle 120.

In this case, the attention-requiring vehicle database 146 retrieves registered vehicles that match both the queried "feature information" and the queried "part of the vehicle registration number", and returns such retrieval results to the feature query unit 182 as query results. That is, the attention-requiring vehicle database 146 returns information indicating whether or not there is a registered vehicle, which corresponds to a feature indicated by the queried "feature information" and corresponds to a vehicle registration number including the queried "part of the vehicle registration number", to the feature query unit 182 as the query result. Note that in a case where there is a registered vehicle that satisfies such conditions, the attention-requiring vehicle database 146 may also return information regarding the registered vehicle to the feature query unit 182 as the query result.

Then, in a case where there is a registered vehicle that matches the queried "feature information" and the queried "part of vehicle registration number", the recognition failure-time processing unit 162 can generate notification information indicating such a fact (that there is a possibility that the vehicle 120 is a suspicious vehicle), and supply the generated notification information to the input/output device 113 via the communication unit 141 for output.

Accordingly, the suspicious vehicle detection system 100 can perform the suspicious vehicle detection using more information and improve the accuracy of the suspicious vehicle detection.

Note that the attention-requiring vehicle database 146 may retrieve registered vehicles that match a queried "feature information" or a queried "part of a vehicle registration number", and returns such retrieval results to the feature query unit 182 as query results. That is, the attention-requiring vehicle database 146 returns information, which indicates whether or not there is a registered vehicle corresponding to a feature indicated by the queried "feature information" or a registered vehicle corresponding to a vehicle registration number including the queried "part of the vehicle registration number", to the feature query unit 182 as the query result. Note that in a case where there is a registered vehicle that satisfies such conditions, the attention-requiring vehicle database 146 may also return information regarding the registered vehicle to the feature query unit 182 as the query result.

Then, in a case where there is a registered vehicle that matches the queried "feature information" or the queried "part of vehicle registration number", the recognition failure-time processing unit 162 can generate notification information indicating such a fact (that there is a possibility that the vehicle 120 is a suspicious vehicle), and supply the generated notification information to the input/output device 113 via the communication unit 141 for output.

Accordingly, the suspicious vehicle detection system 100 can detect more vehicles that are likely to be suspicious vehicles and suppress overlooking of the suspicious vehicle.

Note that the notification processing unit 183 may perform a different notification from the notification processing unit 172. That is, different notification information may be generated between a case where a vehicle registration number recognized from a captured image exists in the attention-requiring vehicle database 146 and a case where information corresponding to feature information exists in the attention-requiring vehicle database 146. For example, an alert level may be different between the notification information generated by the notification processing unit 183 and the notification information generated by the notification processing unit 172.

In general, in a case of being determined as a suspicious vehicle on the basis of a vehicle registration number, there is a high possibility that the vehicle 120 is a vehicle set as an inspection target, such as a so-called stolen vehicle or a wanted vehicle since the vehicle registration number is registered in the attention-requiring vehicle database 146. In other words, a basis (problem of the vehicle 120) for a police officer to pay attention to (be wary of) the vehicle 120 is clear.

Thus, the notification processing unit 183 may generate notification information having a higher alert level than the notification information generated by the notification processing unit 172. For example, the notification information generated by the notification processing unit 183 may be displayed with a larger message or picture or may be displayed to be highlighted more as compared with the notification information generated by the notification processing unit 172. Furthermore, a warning sound and a voice message may be output more loudly. Furthermore, a display content of the message, the picture, or the like and an output voice content of the warning sound, the voice message, or the like may be set to a higher degree of warning.

As illustrated in FIG. 4, the detection failure-time processing unit 163 includes a feature query unit 191 and a notification processing unit 192, and a feature registration unit 193 as functional blocks.

The feature query unit 191 is controlled by the processing determination unit 144, and performs processing related to a query of feature information of the vehicle 120 extracted by the feature extraction unit 153 with respect to the attention-requiring vehicle database 146, which is similar to the feature query unit 182. Since this processing is similar to the above description regarding the feature query unit 182, the description thereof will be omitted.

The notification processing unit 192 is controlled by the processing determination unit 144, and performs processing related to notification of a query result of the feature information obtained by the feature query unit 191, which is similar to the notification processing unit 183. Since this processing is similar to the above description regarding the notification processing unit 183, the description thereof will be omitted.

The feature registration unit 193 is controlled by the processing determination unit 144, and performs processing related to registration of the feature information of the vehicle 120 extracted by the feature extraction unit 153 with respect to the attention-requiring vehicle database 146, which is similar to the feature registration unit 184. Since this processing is similar to the above description regarding the feature registration unit 184, the description thereof will be omitted.

That is, for example, in a case where the number plate 121 of the vehicle 120 has not been detected, the detection failure-time processing unit 163 can acquire feature information of the vehicle 120 and query the attention-requiring vehicle database 146, which is similar to the recognition failure-time processing unit 162. Then, in a case where the queried feature information matches feature information registered in the attention-requiring vehicle database 146, the detection failure-time processing unit 163 can generate notification information indicating such a fact (that there is a possibility that the vehicle 120 is a suspicious vehicle), and supply the generated notification information to the input/output device 113 via the communication unit 141 for output. Moreover, in this case, the detection failure-time processing unit 163 can register the feature information of the vehicle 120 in the attention-requiring vehicle database 146 For example, in a case where information corresponding to the feature information exists in the attention-requiring vehicle database 146, the detection failure-time processing unit 163 may register a place where imaging of the vehicle 120 has been performed in association with the corresponding information as an appearance result of the vehicle 120.

Furthermore, in a case where the queried feature information does not match the feature information registered in the attention-requiring vehicle database 146, the detection failure-time processing unit 163 can register the feature information of the vehicle 120 in the attention-requiring vehicle database 146.

<Example of Character Recognition of Plate Detection>

Figure 5A:
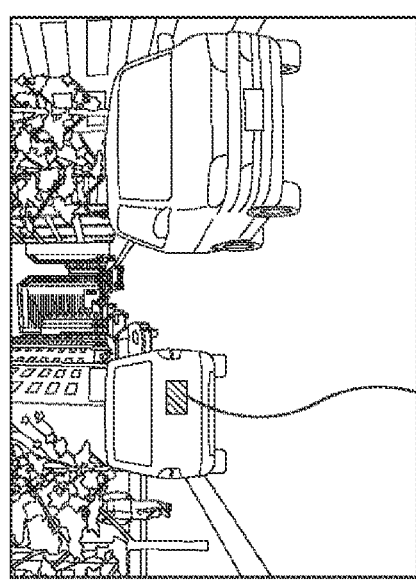
FIGS. 5A, 5B, 5C, and 5D are diagrams illustrating outlines of plate detection and character recognition.

Next, examples of plate detection and character recognition will be described. For example, the plate detection unit 151 acquires a captured image as illustrated in FIG. 5A, detects a number plate of a vehicle included in the captured image, and specifies a partial area 201 including the number plate of the vehicle.

Figure 5B:

In a case where the partial area 201 has been specified, the plate detection unit 151 cuts out the partial area 201 from the captured image. As illustrated in FIG. 5B, an image of the cut-out partial area 201 includes an image 202 of the detected number plate.

Figure 5C:
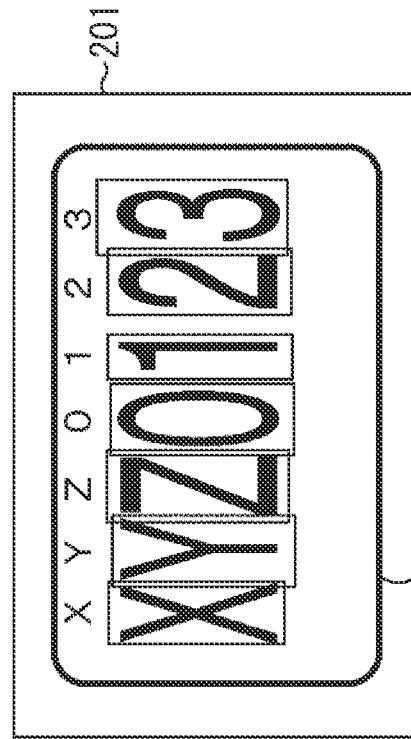
Figure 5D:
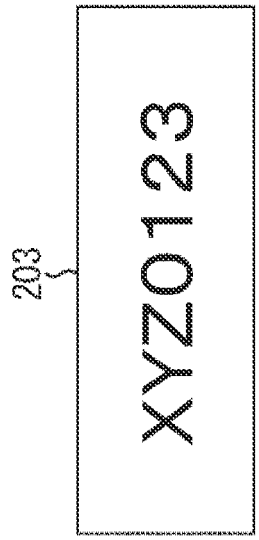

As illustrated in FIG. 5C, the character recognition unit 152 performs character recognition of each character written on the number plate included in the image of the partial area 201. In a case of an example of C of FIG. 5C, the respective characters of "X", "Y", "Z", "0", "1", "2", and "3" written on the number plate have been recognized. Therefore, in this case, the character recognition unit 152 has recognized all the characters written on the number plate as illustrated in FIG. 5D.

In this manner, the plate detection unit 151 cuts out the image of the partial area 201 from the captured image, and the character recognition unit 152 performs the character recognition on the image of the partial area 201, so that the character recognition unit 152 can suppress an increase of a processing load.

<Processing Utilizing Learning>

Note that there is also a country where various designs, for example, number plates 121-1 to 121-4 illustrated in FIG. 6, are accepted as the design of the number plate 121. Even in such a case, the image analysis unit 143 can perform image analysis (detection of the number plate 121, character recognition, and the like) more accurately as compared with processing based on simple image feature extraction by performing the image analysis (the detection of the number plate 121, the character recognition, and the like) using a result of the above-described learning.

Figure 7B:
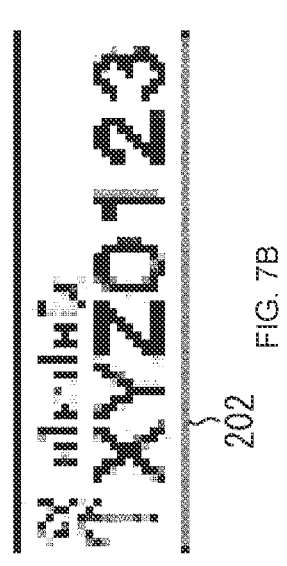
FIGS. 7A, 7B, 7C, and 7D are diagrams illustrating an example of a cause of a failure in the character recognition.
Figure 7D:
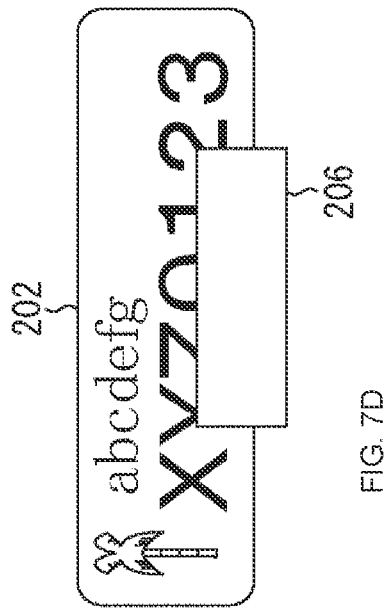
Figure 7A:
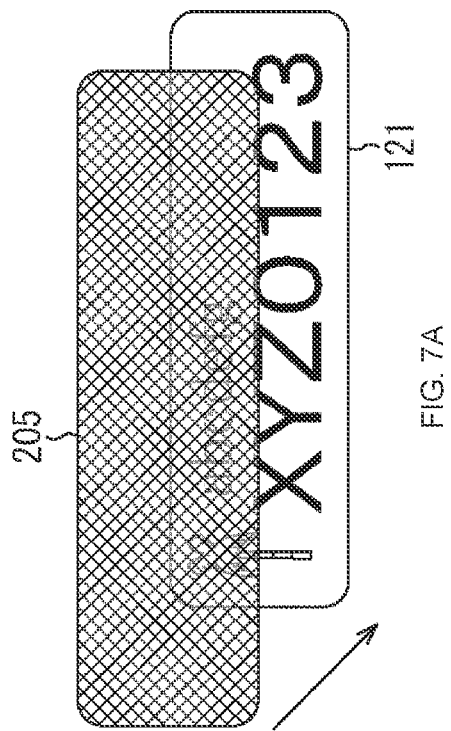
Figure 7C:
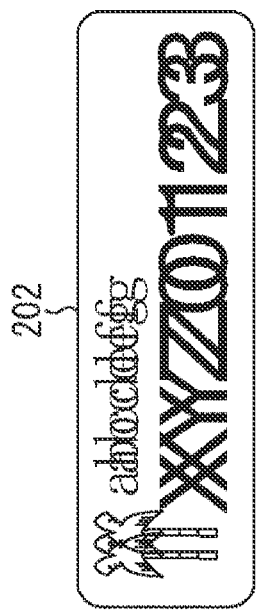

<Selection of Processing Based on Unrecognizable Reason> By the way, there is a case where characters written on the number plate 121 are not recognizable due to various factors in an actual environment. Considered is a case where characters are not recognizable because a translucent plate 205, configured for protection and suppression of detection by an infrared sensor, is pasted to the surface of the number plate 121 as illustrated in FIG. 7A, for example. Furthermore, considered is a case where characters are not recognizable because the surroundings are too dark or the resolution of the image 202 of the number plate is too low in a captured image as illustrated in FIG. 7B, for example. Furthermore, considered is a case where characters are not recognizable because the characters written in the image 202 of the number plate blur in a captured image as illustrated in FIG. 7C, for example. Moreover, considered is a case where characters are not recognizable because a part or all of the characters written on the number plate 122 are hidden by a certain object 206 installed on a front surface of the number plate 121 as illustrated in FIG. 7D, for example.

For example, there is a case where characters are not recognizable for an accidental reason. The accidental reason is arbitrary, but may include, for example, an environment at the time of imaging and the like. For example, a distance from an imaging position to the vehicle 120 and an angle thereof, and an installation angle, reflected light, dirt, and the like of the number plate 121 may be included. For example, the case in FIG. 7B and the case in FIG. 7C are highly likely to occur due to the accidental reason.

In such a case where the characters are not recognizable due to the accidental reason, there is a high possibility that the vehicle 120 itself has no problem. Thus, in this case, the recognition failure-time processing unit 162 omits the query to the database and ends the processing.

Furthermore, for example, there is also a case where characters are not recognizable for a non-accidental reason. The non-accidental reason is arbitrary, but may include, for example, a way of installing the number plate 121 and the like. For example, the case in FIG. 7A and the case in FIG. 7D are highly likely to occur due to the non-accidental reason.

In such a case of the non-accidental reason, there is a high possibility that the vehicle 120 is a suspicious vehicle with the number plate 121 being intentionally hidden and the like. Thus, in this case, the feature extraction unit 153 extracts the feature information of the vehicle 120 from the captured image.

Since the processing is selected on the basis of the reason why the characters are not recognizable as described above, the terminal device 112 can perform more appropriate processing for a recognition result for the number plate of the vehicle.

<Processing in Case where Detection or Recognition has Failed>

Furthermore, a conventional method simply ends processing in a case where the number plate 121 has not been detected or characters written on the number plate 121 have not been recognized. That is, in this case, the conventional method does not confirm whether or not the vehicle 120 is a suspicious vehicle. In other words, the vehicle 120 is treated as a non-suspicious vehicle in this case.

However, the cases where characters are not recognizable for various reasons are considered in an actual environment as described above. In other words, there is a high possibility that a vehicle which is likely to be a suspicious vehicle is not detectable (the incidence of overlooking is high) with the conventional method, so that there is a possibility that the accuracy of suspicious vehicle detection is reduced. That is, there is a possibility that the effectiveness of the suspicious vehicle detection system 100 is reduced.

Thus, the feature extraction unit 153 may extract feature information of a vehicle even in a case where number plate detection or character recognition fails. Then, various processes may be performed using the extracted feature information.

For example, the recognition failure-time processing unit 162 or the detection failure-time processing unit 163 may query the attention-requiring vehicle database 146 for the extracted feature information of the vehicle 120, and, in a case where there is a match, a notification of such a fact may be performed. Furthermore, the recognition failure-time processing unit 162 and the detection failure-time processing unit 163 may register the extracted feature information of the vehicle 120 in the attention-requiring vehicle database 146.

Accordingly, even in a case where the number plate detection or the character recognition fails, it is possible to perform confirmation of whether or not the vehicle 120 is a suspicious vehicle. Therefore, the possibility that the vehicle which is likely to be the suspicious vehicle is not detectable can be suppressed (the incidence of overlooking can be reduced), and the reduction in the accuracy of the suspicious vehicle detection can be suppressed. That is, it is possible to suppress the reduction in the effectiveness of the suspicious vehicle detection system 100.

<Attention-Requiring Vehicle Database> FIGS. 8A and 8B illustrates an example of the information registered in the attention-requiring vehicle database 146. Registration information 210 illustrated in FIG. 8A is information regarding a vehicle that requires attention. The registration information 210 is registered as a record in the attention-requiring vehicle database 146. The registration information 210 can include, for example, vehicle registration information 211, owner information 212, a reason for attention 213, and vehicle feature information 214.

The vehicle registration information 211 is information regarding a suspicious vehicle, and can include, for example, a vehicle registration number and the like. Of course, the vehicle registration information 211 can include any other information.

The owner information 212 is information regarding an owner of a vehicle registered in the attention-requiring vehicle database 146. That is, the owner information 212 is information regarding the owner of the vehicle indicated by the vehicle registration information 211 of the same record. The owner information 212 can include, for example, information, such as a name, an address, and a contact number, of the owner. Of course, the owner information 212 can include any other information.

The reason for attention 213 is information regarding a reason why a vehicle is registered in the attention-requiring vehicle database 146. That is, the reason for attention 213 is information regarding the reason why the vehicle indicated by the vehicle registration information 211 of the same record is registered in the attention-requiring vehicle database 146. The reason for attention 213 can include, for example, information indicating whether or not a vehicle is a stolen vehicle, information regarding an incident or an accident involving the vehicle, and the like. Of course, the reason for attention 213 can include any other information.

The vehicle feature information 214 is information regarding a feature of a vehicle registered in the attention-requiring vehicle database 146. For example, the vehicle feature information 214 can include information such as a date and time, a place, a vehicle name, a vehicle type, a model, a vehicle color, a vehicle-specific feature, and a feature related to a passenger of the vehicle. Furthermore, the vehicle feature information 214 can include a captured image of the vehicle. Of course, the vehicle feature information 214 can include any other information.

Note that the vehicle feature information 214 may be registered in the attention-requiring vehicle database 146 as a different record from the vehicle registration information 211 to the reason for attention 213 as illustrated in FIG. 8B. In a case of an example of FIG. 8B, the vehicle registration information 211 to the reason for attention 213 are registered in the attention-requiring vehicle database 146 as registration information 221. On the other hand, the vehicle feature information 214 is registered in the attention-requiring vehicle database 146 as registration information 222.

That is, the attention-requiring vehicle database 146 may be configured using a single database or using a plurality of databases.

<Input/Output Device>

FIG. 9 is a block diagram illustrating an example of a main configuration of the input/output device 113, which is one mode of the information processing device to which the present technology has been applied. As illustrated in FIG. 9, the input/output device 113 includes a communication unit 251, a control unit 252, an input unit 253, and an output unit 254.

The communication unit 251 has a communication interface and communicates with other devices via the communication interface. A scheme (standard) of such communication is arbitrary, and wireless communication, wired communication, or the both may be used.

For example, the communication unit 251 can communicate with the terminal device 112 and supply control information supplied from the control unit 132 to the terminal device 112. Furthermore, the communication unit 251 can communicate with the terminal device 112, acquire notification information supplied from the terminal device 112, and supply the notification information to the control unit 252.

The communication unit 251 can have any configuration in addition to the above-described communication interface. For example, the communication unit 251 may be configured using a logic circuit that implements the above-described processing by using a communication interface. Furthermore, the communication unit 251 may have, for example, a CPU, a ROM, a RAM, and the like, and execute a program using these parts to implement the above-described processing by using the communication interface. Of course, the communication unit 251 may have both the above configurations such that a part of the above-described processing is implemented by the logic circuit, and the other part is implemented by executing the program.

The control unit 252 causes the communication unit 251, the input unit 253, and the output unit 254 to perform processing related to input and output of information. For example, the control unit 252 can cause the input unit 253 to receive an input operation by a user (passenger of the patrol car 101). Furthermore, the control unit 252 can acquire information indicating the input operation, and generate control information corresponding to the input operation received by the input unit 253 on the basis of the information. Moreover, the control unit 252 can supply the acquired control information to another device (for example, the terminal device 112) via the communication unit 251.

Furthermore, the control unit 252 can acquire notification information supplied from, for example, the terminal device 112 via the communication unit 251. Then, the control unit 252 can supply the notification information to the output unit 254 for output.

The control unit 252 can have any configuration. For example, the control unit 252 may be configured using a logic circuit that implements the above-described processing. Furthermore, the control unit 252 may have, for example, a CPU, a ROM, a RAM, and the like, and execute a program using these parts to implement the above-described processing. Of course, the control unit 252 may have both the above configurations such that a part of the above-described processing is implemented by the logic circuit, and the other part is implemented by executing the program.

The input unit 253 has an input device, for example, a keyboard, a touch panel, and the like and receives an operation input by the user and the like. Furthermore, the input unit 253 generates information indicating the operation input and supplies the information to the control unit 252.

The output unit 254 has an output device, for example, a monitor, a speaker, and the like, acquires notification information supplied from the control unit 252, and outputs the notification information as an image or a voice.

<Flow of Suspicious Vehicle Detection Processing>

Next, an example of a flow of suspicious vehicle detection processing performed by the suspicious vehicle detection system 100 will be described with reference to a flowchart of FIG. 10.

In a case where the suspicious vehicle detection processing is started, the imaging unit 131 of the imaging device 111 captures an image of the front of the patrol car 101 in step S101, and generates a captured image including the vehicle 120 at the front. The control unit 132 acquires the captured image.

In step S102, the control unit 132 supplies the captured image to the communication unit 133 to be transmitted to the terminal device 112. The communication unit 133 transmits the captured image supplied from the control unit 132 to the terminal device 112.

In step S111, the image acquisition unit 142 of the terminal device 112 receives the captured image transmitted from the imaging device 111 via the communication unit 141.

In step S112, the image analysis unit 143, the processing determination unit 144, and the corresponding processing unit 145 perform vehicle determination processing using the captured image and using, as appropriate, the attention-requiring vehicle database 146.

In the vehicle determination processing, the corresponding processing unit 145 generates notification information as necessary and transmits the notification information to the input/output device 113 via the communication unit 141.

In step S121, the control unit 252 of the input/output device 113 receives the notification information transmitted from the terminal device 112 via the communication unit 251.

In step S122, the control unit 252 supplies the notification information to the output unit 254 for output. The output unit 254 acquires the notification information and outputs the notification information as, for example, an image, a voice, and the like via the output device to notify a passenger of the patrol car 101.

In step S103, the control unit 132 of the imaging device 111 determines whether or not to end the suspicious vehicle detection processing. In a case where it is determined not to end the processing, the processing returns to step S101, and the processes in step S101 and subsequent steps are repeated.

Furthermore, in a case where it is determined in step S103 to end the suspicious vehicle detection processing, the suspicious vehicle detection processing is ended.

Similarly, in step S113, the input corresponding processing unit 147 of the terminal device 112 determines whether or not to end the suspicious vehicle detection processing. In a case where it is determined not to end the processing, the processing returns to step S111, and the processes in step S111 and subsequent steps are repeated. Furthermore, in a case where it is determined in step S113 to end the suspicious vehicle detection processing, the suspicious vehicle detection processing is ended.

Similarly, in step S123, the control unit 252 of the input/output device 113 determines whether or not to end the suspicious vehicle detection processing. In a case where it is determined not to end the processing, the processing returns to step S121, and the processes in step S121 and subsequent steps are repeated. Furthermore, in a case where it is determined in step S123 to end the suspicious vehicle detection processing, the suspicious vehicle detection processing is ended.

<Flow of Vehicle Determination Processing>

Next, an example of a flow of the vehicle determination processing executed in step S112 of FIG. 10 will be described with reference to flowcharts of FIGS. 11 and 12.

In a case where the vehicle determination processing is started, the plate detection unit 151 detects a number plate from the captured image in step S141.

In step S142, the processing determination unit 144 determines whether or not the number plate has been detected by the process of step S141. In a case where it is determined that the detection has been detected, the processing proceeds to step S143.

In step S143, the character recognition unit 152 performs character recognition on the number plate. For example, the plate detection unit 151 extracts a partial image including the detected number plate from the captured image, and the character recognition unit 152 performs character recognition on the partial image to recognize each of characters of a vehicle registration number and the like written on the number plate included in the partial image.

In step S144, the processing determination unit 144 determines whether or not all the characters written on the number plate have been recognized by the process of step S143. In a case where it is determined that all the characters have been recognized, the processing proceeds to step S145.

In step S145, the recognition success-time processing unit 451 performs processing corresponding to the case where all the characters written on the number plate have been recognized. For example, the character query unit 171 queries the attention-requiring vehicle database 146 for a recognized character string, that is, the vehicle registration number. In a case where there is a match, that is, in a case where the queried vehicle registration number is registered in the attention-requiring vehicle database 146, the notification processing unit 172 generates notification information for providing notification of such a fact. Then, the notification processing unit 172 supplies the notification information to the input/output device 113, and notifies the passenger of the patrol car that a suspicious vehicle has been detected. The input/output device 113 receives the notification information and outputs the notification information. That is, the notification is performed.

Figure 10:
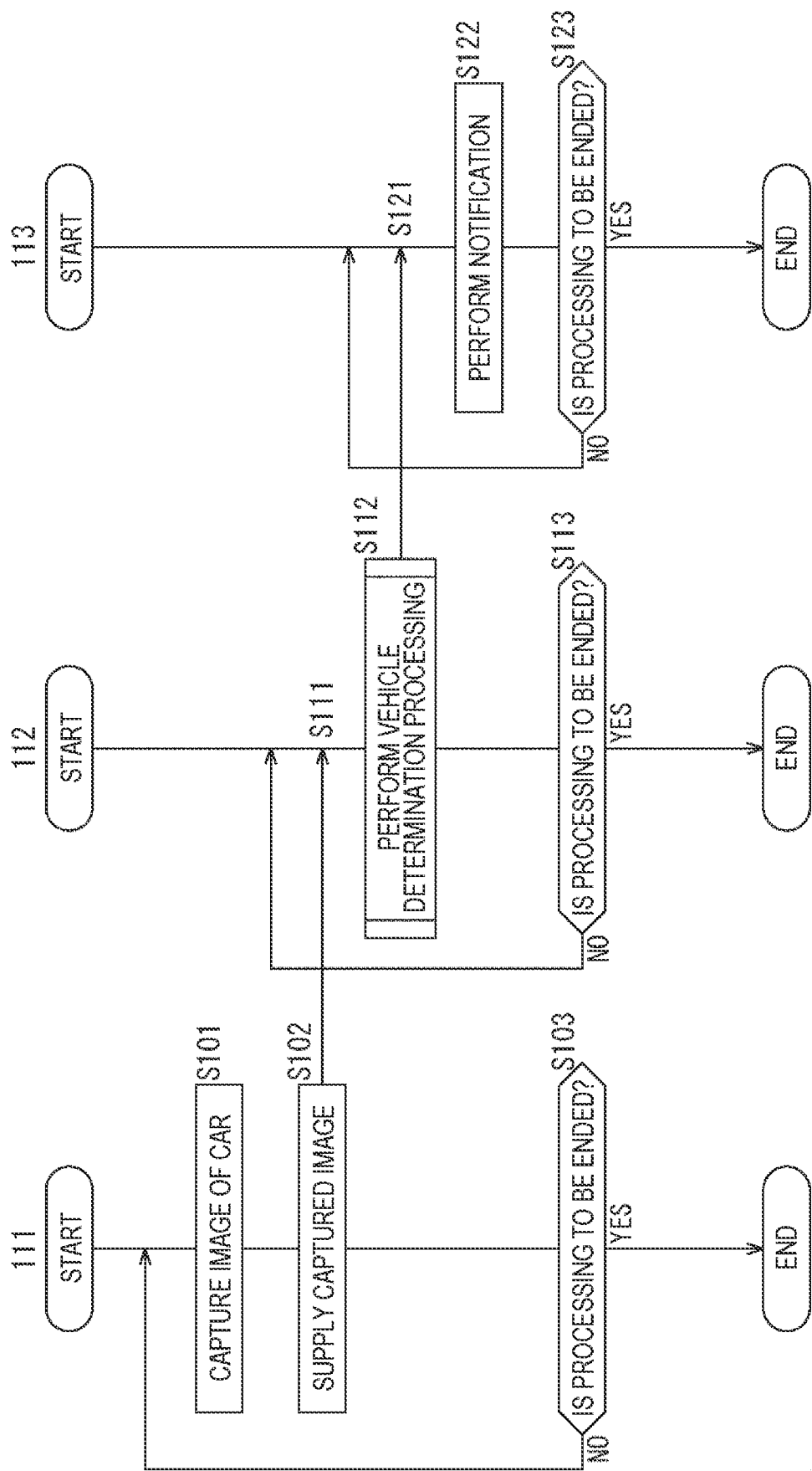
FIG. 10 is a flowchart illustrating an example of a flow of suspicious vehicle detection processing.

In a case where the process of step S145 ends, the vehicle determination processing is ended, and the processing returns to FIG. 10.

Furthermore, in a case where at least a part of the characters has not been recognized in step S144, the processing proceeds to step S146.

In step S146, the processing determination unit 144 causes the reason determination unit 181 to determine a reason why at least a part of the characters has not been recognized. Then, the processing determination unit 144 determines whether or not the reason why at least a part of the characters has not been recognized is accidental on the basis of a result of the determination. In a case where it is determined that the reason is accidental, the vehicle determination processing is ended, and the processing returns to FIG. 10. That is, the registration of information in the attention-requiring vehicle database 146 and the like are omitted.

Figure 12:
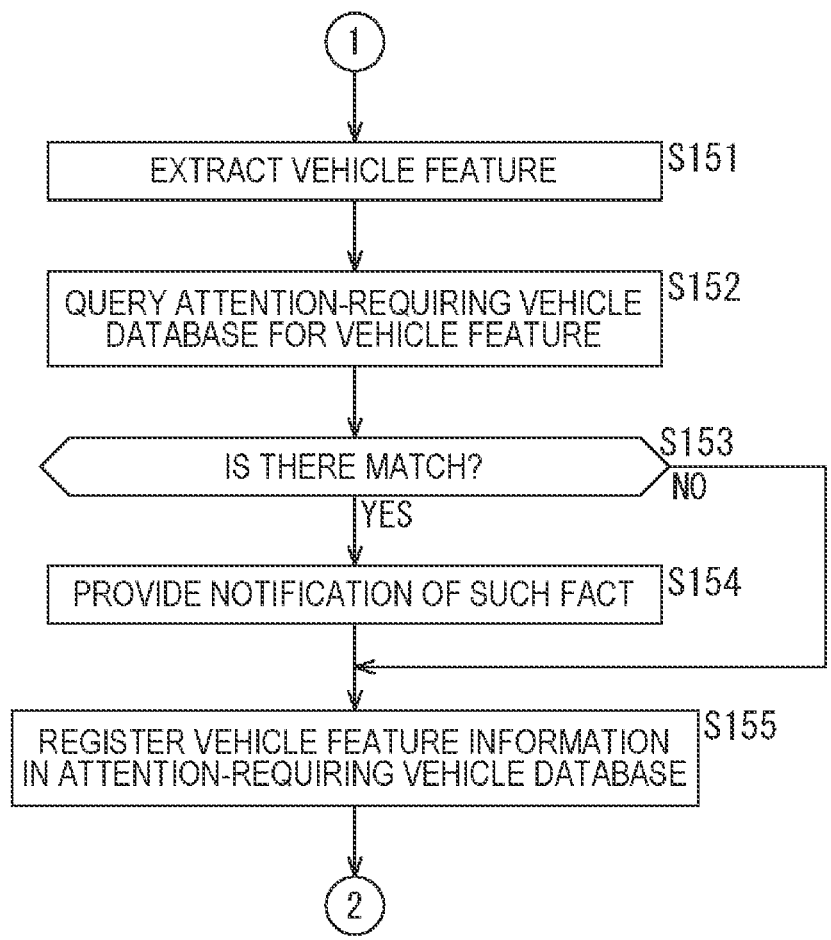
FIG. 12 is a flowchart illustrating the example of the flow of the vehicle determination processing, which is subsequent to FIG. 11.

Furthermore, in a case where it is determined in step S146 that the recognition has not been performed for a non-accidental reason, the processing proceeds to FIG. 12.

In this case, in step S151 of FIG. 12, the feature extraction unit 153 extracts a feature of a vehicle from the captured image.

In step S152, the feature query unit 182 queries the attention-requiring vehicle database 146 for information on the feature of the vehicle extracted in step S151.

In step S153, the processing determination unit 144 determines whether or not there is a match of the queried feature information on the basis of a result of the query. That is, in a case where it is determined that the queried feature information matches feature information registered in the attention-requiring vehicle database 146, the processing proceeds to step S154.

In step S154, the notification processing unit 183 generates notification information for providing notification that the pieces of feature information match (that is, the vehicle 120 is a vehicle to which attention needs to be paid), and supplies the notification information to the input/output device 113 via the communication unit 141.

In a case where the process of step S154 ends, the processing proceeds to step S155. Furthermore, in a case where it is determined in step S153 that there is no match of the queried feature information, the process of step S154 is omitted, and the processing proceeds to step S155.

In step S155, the feature registration unit 184 registers the feature information of the vehicle 120 in the attention-requiring vehicle database 146. In a case where the process of step S155 ends, the vehicle determination processing is ended.

Furthermore, in a case where it is determined in step S142 that the number plate has not been detected, the processing proceeds to FIG. 12.

In this case, in step S151 of FIG. 12, the feature extraction unit 153 extracts a feature of a vehicle from the captured image.

In step S152, the feature query unit 191 queries the attention-requiring vehicle database 146 for information on the feature of the vehicle extracted in step S151.

In step S153, the processing determination unit 144 determines whether or not there is a match of the queried feature information on the basis of a result of the query. That is, in a case where it is determined that the queried feature information matches feature information registered in the attention-requiring vehicle database 146, the processing proceeds to step S154.

In step S154, the notification processing unit 192 generates notification information for providing notification that the pieces of feature information match (that is, the vehicle 120 is a vehicle to which attention needs to be paid), and supplies the notification information to the input/output device 113 via the communication unit 141.

In a case where the process of step S154 ends, the processing proceeds to step S155. Furthermore, in a case where it is determined in step S153 that there is no match of the queried feature information, the process of step S154 is omitted, and the processing proceeds to step S155.

In step S155, the feature registration unit 193 registers the feature information of the vehicle 120 in the attention-requiring vehicle database 146. In a case where the process of step S155 ends, the vehicle determination processing is ended.

As the respective processes are executed as described above, the suspicious vehicle detection system 100 can suppress the possibility that the vehicle which is likely to be the suspicious vehicle is not detectable (reduce the incidence of overlooking), and suppress the reduction in the accuracy of the suspicious vehicle detection. That is, it is possible to suppress the reduction in the effectiveness of the suspicious vehicle detection system 100.

<Flow of Database Reference Processing>

Next, an example of a flow of database reference processing executed in a case where a user or the like refers to information in the attention-requiring vehicle database 146 will be described with reference to a flowchart of FIG. 13.

In a case where the database reference processing is started, the input unit 253 of the input/output device 113 receives an input of a vehicle feature to be referred to in step S181.

In step S182, the control unit 252 supplies information on the vehicle feature received in step S181 to the terminal device 112 via the communication unit 251.

In step S171, the input corresponding processing unit 147 of the terminal device 112 acquires the vehicle feature information transmitted from the input/output device 113 via the communication unit 141.

In step S172, the input corresponding processing unit 147 queries the attention-requiring vehicle database 146 for the acquired vehicle feature information. In step S173, in a case where it is determined that there is a match of the vehicle feature information matches (information matching the vehicle feature information is registered in the attention-requiring vehicle database 146), the input corresponding processing unit 147 reads the matching feature information from the attention-requiring vehicle database 146, and generates an appearance map indicating a position where a vehicle corresponding to the feature information appears.

In step S174, the input corresponding processing unit 147 supplies the generated appearance map to the input/output device 113 via the communication unit 141.

In step S183, the control unit 252 of the input/output device 114 acquires the appearance map supplied from the terminal device 112 via the communication unit 251.

In step S184, the control unit 252 supplies the acquired appearance map to the output unit 254 for output (display).

In a case where the above processes are ended, the database reference processing is ended.

As the processing is performed as described above, the user can refer to the feature information registered in the attention-requiring vehicle database 146. Furthermore, the user can refer to the appearance map generated on the basis of the feature information. Therefore, it is possible to easily grasp the tendency of the vehicle corresponding to the feature information to appear at which position.

3. Second Embodiment

<Suspicious Vehicle Detection System>
<System Configuration>

The above description has been given assuming that the terminal device 112 includes the attention-requiring vehicle database 146 and the terminal device 112 performs the processing such as the query, the registration, and the reference, but the configuration of the suspicious vehicle detection system 100 is arbitrary and is not limited to the above example. For example, a server may be provided with an attention-requiring vehicle database, and the processing such as the query, the registration, and the reference may be performed on the server.

Figure 14:
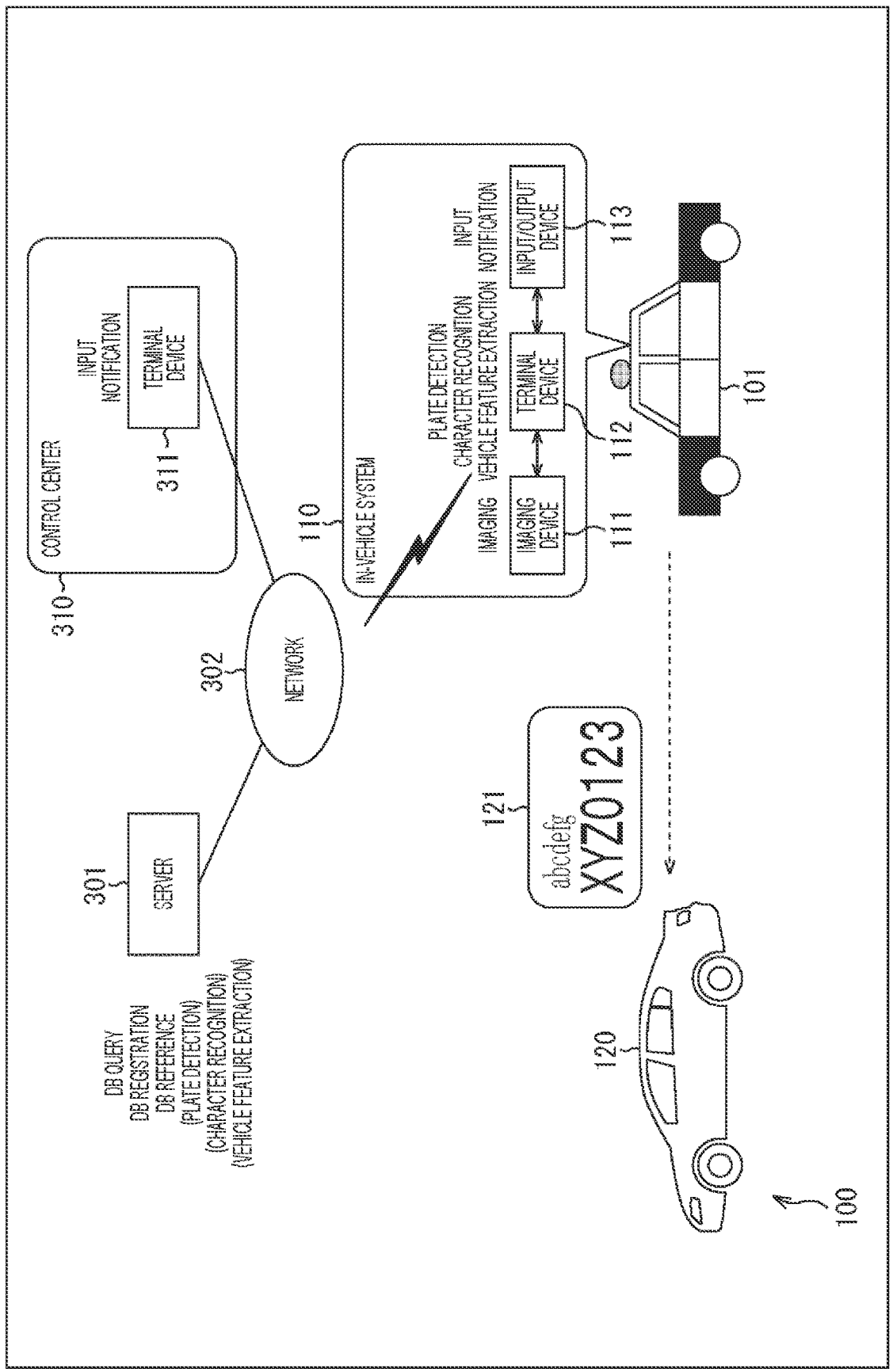
FIG. 14 is a diagram illustrating a main configuration example of a suspicious vehicle detection system.

FIG. 14 illustrates a main configuration example of the suspicious vehicle detection system 100 in this case. The suspicious vehicle detection system 100 illustrated in FIG. 14 includes a server 301, a network 302, and a control center 310 in addition to the configuration illustrated in FIG. 1.

The server 301 and the control center 310 are connected to the network 302 by wired communication, wireless communication, or the both. Similarly, the terminal device 112 is connected to the network 302 by wireless communication. That is, the server 301, the control center 310, and the terminal device 112 may be connected to each other via the network 302 to be capable of communicating with each other.

In a case of this example, the server 301 includes an attention-requiring vehicle database, and can query and register a vehicle detection number and feature information supplied from the terminal device 112. Furthermore, information in the attention-requiring vehicle database can be referred to on the basis of an instruction of a user of the terminal device 112 similarly to the case of the first embodiment.

In this case, the terminal device 112 can perform processing such as detection of a number plate, recognition of characters written on the number plate, and extraction of the feature information of a vehicle.

Note that the processing, such as the number plate detection, the recognition of the characters written on the number plate, and the extraction of the vehicle feature information, may be performed on the server 301.

The control center 310 is a center that manages the patrol car 101. The control center 310 has a terminal device 311 operated by an employee of the control center 310. A device other than the input/output device 113, for example, the terminal device 311 of the control center 310 may receive an input operation and output notification information. In such a case, it is sufficient if the server 301 supplies the notification information and the like to the terminal device 311.

Since the processing related to the database is performed on the server 301 in this manner, the configuration of the terminal device 112 can be simplified as compared with the case of the first embodiment, and an increase in cost can be suppressed.

<Control Device>

Figure 15:
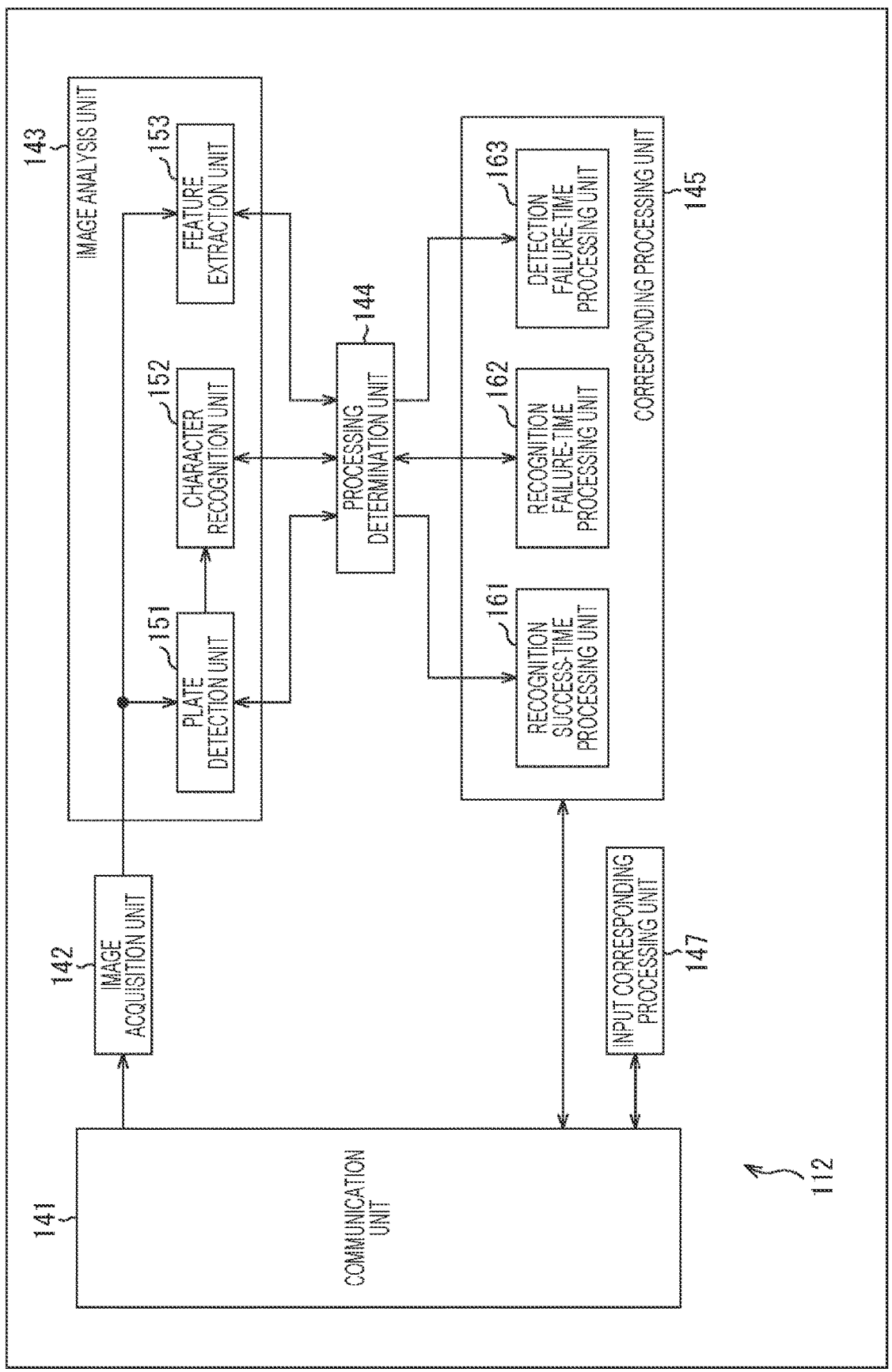
FIG. 15 is a block diagram illustrating a main configuration example of a terminal device.

FIG. 15 is a block diagram illustrating an example of a main configuration of the terminal device 112 in this case. In a case of the example of FIG. 15, the attention-requiring vehicle database 146 is omitted from the terminal device 112 as compared with the example of FIG. 3.

Figure 16:
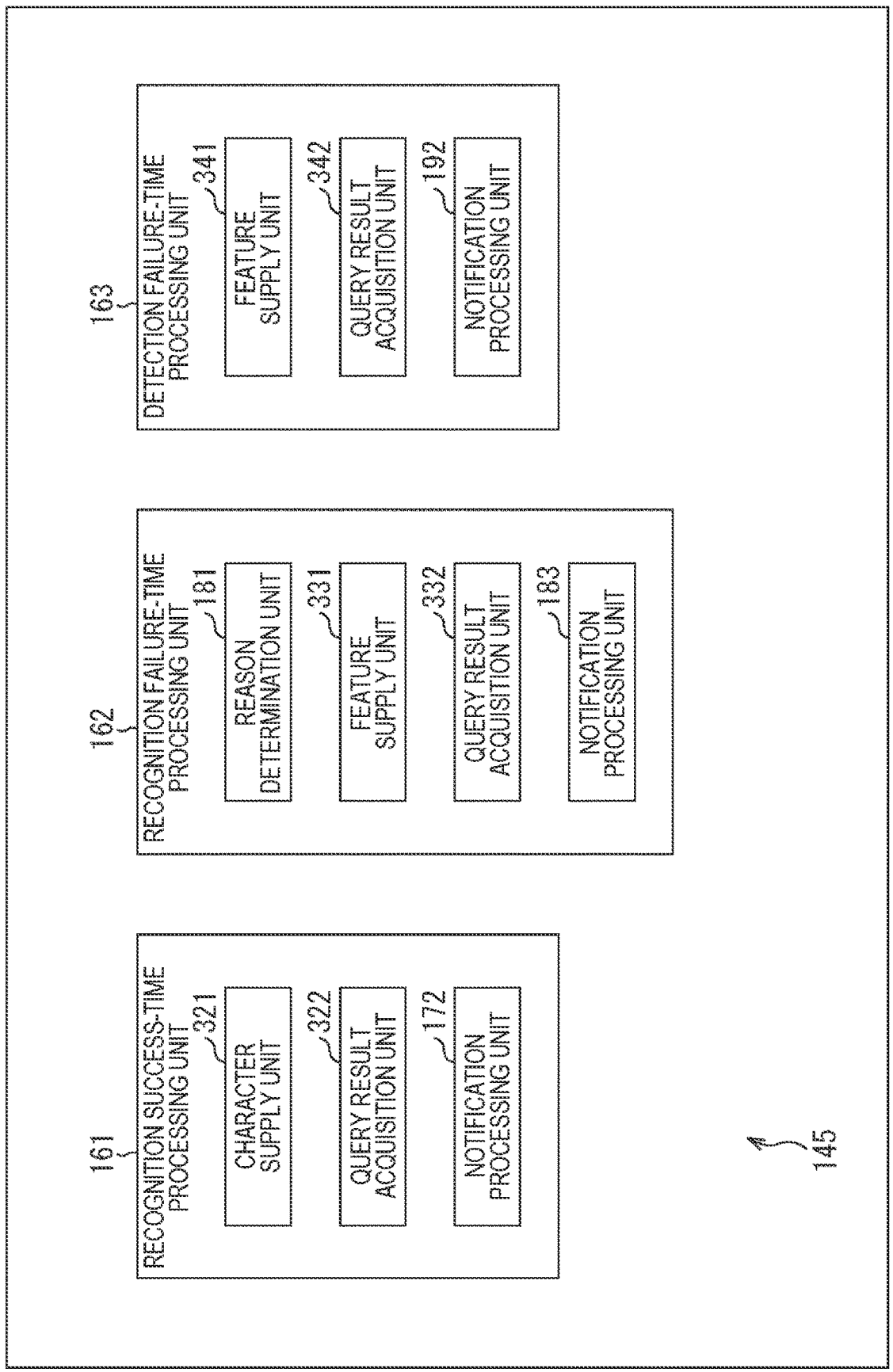
FIG. 16 is a block diagram illustrating a main configuration example of functional blocks of a corresponding processing unit.

FIG. 16 is a diagram illustrating a main configuration example of functional blocks included in the corresponding processing unit 145 in this case. As illustrated in FIG. 16, the recognition success-time processing unit 161 includes a character supply unit 321, a query result acquisition unit 332, and the notification processing unit 172 as functional blocks.

The character supply unit 321 supplies characters (a vehicle registration number) recognized by the character recognition unit 152 to the server 301 via the communication unit 141 to query the attention-requiring vehicle database.

The query result acquisition unit 322 acquires a query result of the characters (vehicle registration number) transmitted from the server 301 via the communication unit 141. The notification processing unit 172 generates notification information for providing notification of the query result, and supplies the notification information to the input/output device 113 via the communication unit 141.

Furthermore, as illustrated in FIG. 16, the recognition failure-time processing unit 162 includes the reason determination unit 181, a feature supply unit 331, a query result acquisition unit 332, and the notification processing unit 183 as functional blocks.

The feature supply unit 331 supplies feature information extracted by the feature extraction unit 153 to the server 301 via the communication unit 141 to query the attention-requiring vehicle database.

The query result acquisition unit 332 acquires a query result of the feature information transmitted from the server 301 via the communication unit 141. The notification processing unit 183 generates notification information for providing notification of the query result, and supplies the notification information to the input/output device 113 via the communication unit 141. For example, in a case where information corresponding to the feature information exists in an attention-requiring vehicle database 354 as the query result of the feature information with respect to the attention-requiring vehicle database 354, the query result being acquired from the server 301, the notification processing unit 183 generates the notification information for providing notification of such a fact.

Furthermore, as illustrated in FIG. 16, the detection failure-time processing unit 163 includes a feature supply unit 341, a query result acquisition unit 342, and the notification processing unit 192 as functional blocks.

The feature supply unit 341 supplies feature information extracted by the feature extraction unit 153 to the server 301 via the communication unit 141 to query the attention-requiring vehicle database.

The query result acquisition unit 342 acquires a query result of the feature information transmitted from the server 301 via the communication unit 141. The notification processing unit 192 generates notification information for providing notification of the query result, and supplies the notification information to the input/output device 113 via the communication unit 141. For example, in a case where information corresponding to the feature information exists in the attention-requiring vehicle database as the query result of the feature information with respect to the attention-requiring vehicle database, the query result being acquired from the server 301, the notification processing unit 192 generates the notification information for providing notification of such a fact.

<Server>

Figure 17:
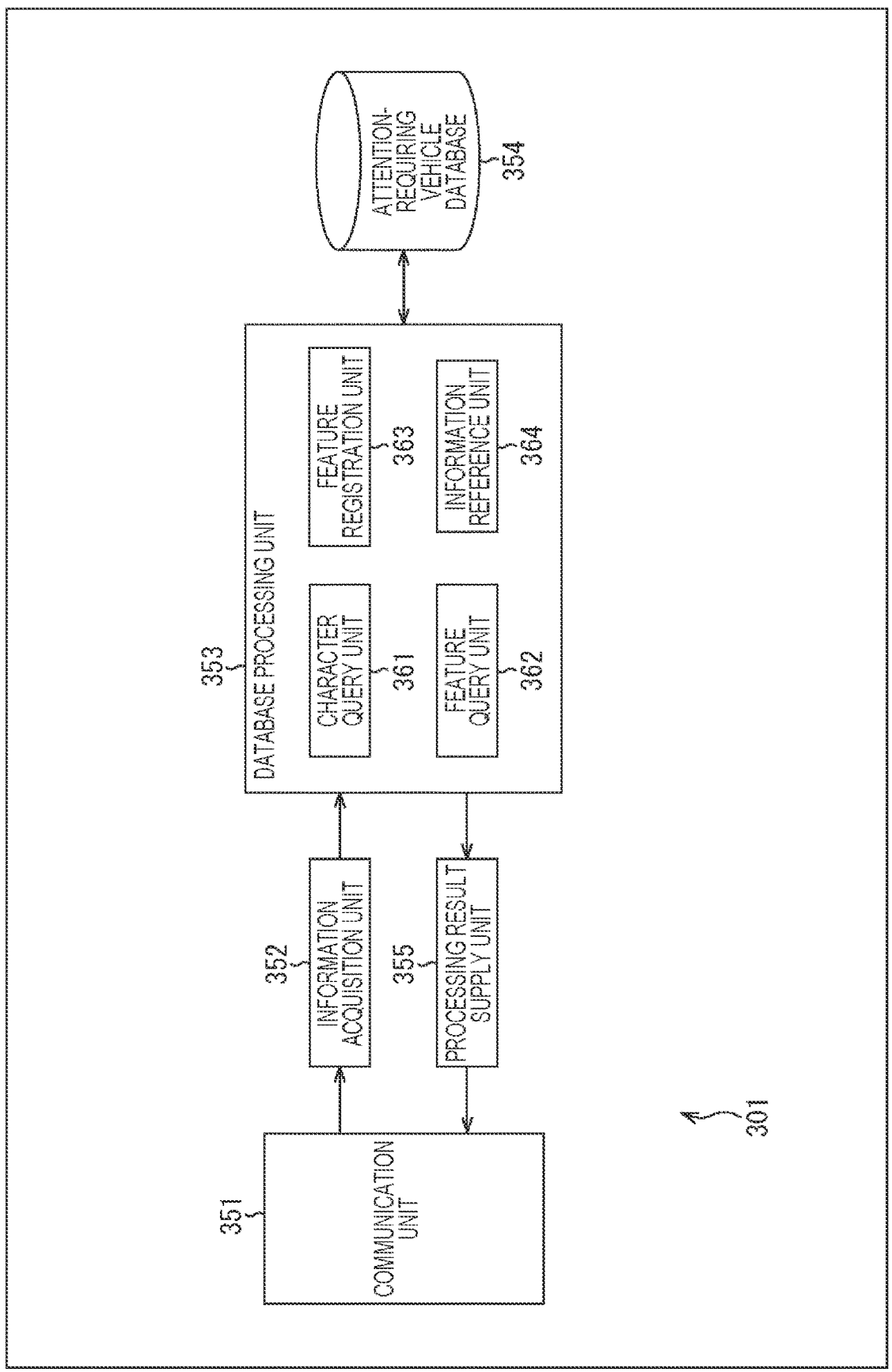
FIG. 17 is a block diagram illustrating a main configuration example of a server.

FIG. 17 is a block diagram illustrating an example of a main configuration of the server 301, which is one mode of the information processing device to which the present technology has been applied. As illustrated in FIG. 17, the server 301 includes a communication unit 351, an information acquisition unit 352, a database processing unit 353, the attention-requiring vehicle database 354, and a processing result supply unit 355.

The communication unit 351 has a communication interface and communicates with other devices via the communication interface. A scheme (standard) of such communication is arbitrary, and wireless communication, wired communication, or the both may be used.

For example, the communication unit 351 can communicate with other devices to transmit and receive any information. For example, the communication unit 351 may communicate with the terminal device 112, receive characters (a vehicle registration number), feature information, and the like supplied from the terminal device 112, and supply the characters, feature information, and the like to the information acquisition unit 352. Furthermore, the communication unit 351 may communicate with the terminal device 112 and supply the notification information and the like supplied from the processing result supply unit 355 to the terminal device 112.

The communication unit 351 can have any configuration in addition to the above-described communication interface. For example, the communication unit 351 may be configured using a logic circuit that implements the above-described processing by using a communication interface. Furthermore, the communication unit 351 may have, for example, a CPU, a ROM, a RAM, and the like, and execute a program using these parts to implement the above-described processing by using the communication interface. Of course, the communication unit 351 may have both the above configurations such that a part of the above-described processing is implemented by the logic circuit, and the other part is implemented by executing the program.

The information acquisition unit 352 performs processing related to acquisition of information from another device. For example, the information acquisition unit 352 can acquire characters (a vehicle registration number) and feature information supplied from the terminal device 112 via the communication unit 351. Furthermore, the information acquisition unit 352 can supply the acquired information to the database processing unit 353. Furthermore, the information acquisition unit 352 can acquire control information requesting information of the attention-requiring vehicle database 354 via the communication unit 351. The information acquisition unit 352 can supply the control information to the database processing unit 353.

The database processing unit 353 performs processing related to the attention-requiring vehicle database 354. For example, the database processing unit 353 includes a character query unit 361, a feature query unit 362, a feature registration unit 363, and an information reference unit 364 as functional blocks.

The character query unit 361 queries the attention-requiring vehicle database 354 for the characters (vehicle registration number) and the like supplied from the information acquisition unit 352 to acquire a result of the query, and supplies the query result to the processing result supply unit 355 as a response.

The feature query unit 362 queries the attention-requiring vehicle database 354 for the feature information and the like supplied from the information acquisition unit 352 to acquire a result of the query, and supplies the query result to the processing result supply unit 355 as a response.

The feature registration unit 363 supplies and registers the feature information to the attention-requiring vehicle database 354.

The information reference unit 364 refers to the attention-requiring vehicle database 354 according to control information supplied from the information acquisition unit 352, and acquires desired vehicle feature information from the attention-requiring vehicle database 354. The information reference unit 364 supplies the acquired vehicle feature information as a reference result to the processing result supply unit 355.

The attention-requiring vehicle database 354 is a database similar to the attention-requiring vehicle database 146 described in the first embodiment, and performs similar processing.

The processing result supply unit 355 acquires various types of information supplied from the database processing unit 353, and supplies the various types of information to the terminal device 112 as a processing result via the communication unit 351.

With such a configuration, the server 301 can perform the processing using the attention-requiring vehicle database 354 even in a case where the characters have not been recognized, which is similar to the terminal device 112 of the first embodiment.

Therefore, similarly to the case of the first embodiment, the suspicious vehicle detection system 100 can suppress a possibility that a vehicle which is likely to be a suspicious vehicle is not detectable (reduce the incidence of overlooking), and suppress reduction in accuracy of suspicious vehicle detection. That is, it is possible to suppress the reduction in the effectiveness of the suspicious vehicle detection system 100.

<Flow of Suspicious Vehicle Detection Processing>

Figure 18:
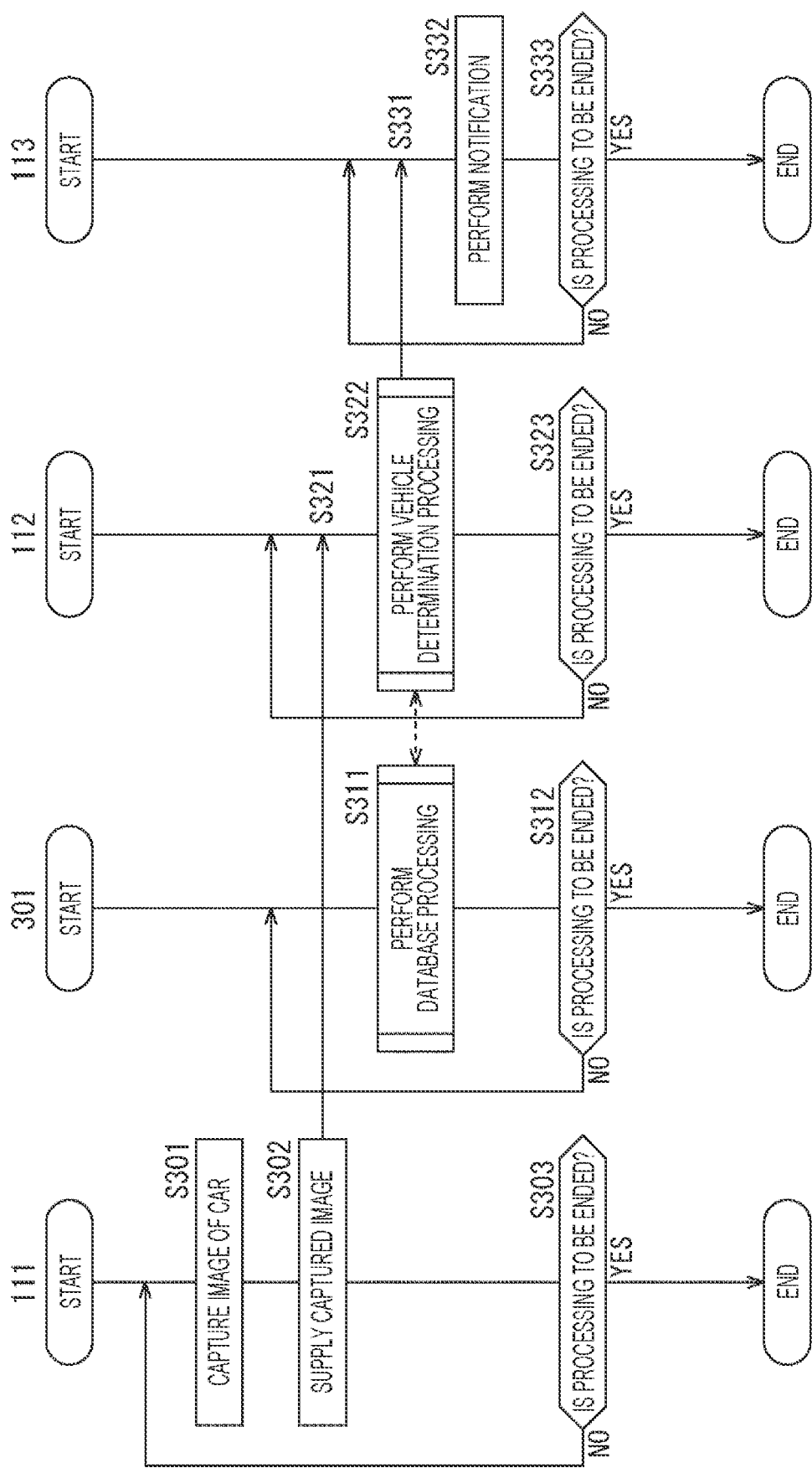
FIG. 18 is a flowchart illustrating an example of a flow of suspicious vehicle detection processing.

FIG. 18 illustrates an example of a flow of suspicious vehicle detection processing in this case. In this case, the imaging device 111 performs processing similar to that in the case of FIG. 10. That is, each process of step S301 to step S303 of FIG. 18 is executed similarly to each process of step S101 to step S103 of FIG. 10.

Furthermore, in step S311, the server 301 executes database processing in cooperation with vehicle determination processing of the terminal device 112. Details of the database processing will be described later. Furthermore, since a process of step S312 is similar to a process of step S303, the description thereof will be omitted.

In this case, the terminal device 112 performs processing that is basically similar to that in the case of FIG. 10. That is, each process of step S321 to step S323 of FIG. 18 is executed similarly to each process of step S111 to step S113 of FIG. 10. However, the vehicle determination processing is executed in cooperation with the database processing.

Furthermore, in this case, the input/output device 113 performs processing similar to that in the case of FIG. 10. That is, each process of step S331 to step S333 of FIG. 18 is executed similarly to each process of step S121 to step S123 of FIG. 10.

<Flow of Vehicle Determination Processing>

An example of a flow of the vehicle determination processing in this case will be described with reference to flowcharts of FIGS. 19 and 20.

Figure 11:
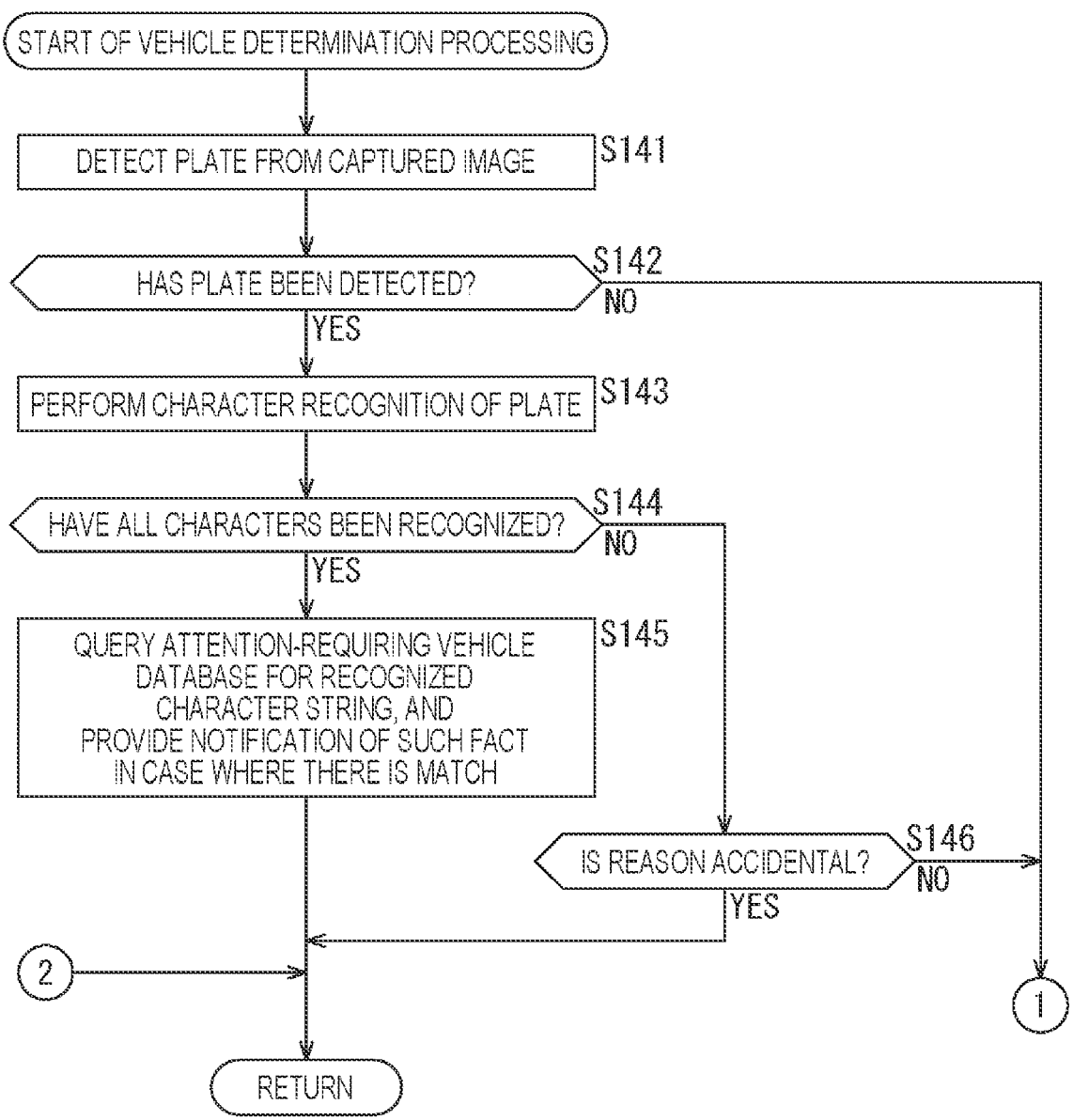
FIG. 11 is a flowchart illustrating an example of a flow of vehicle determination processing.
Figure 19:
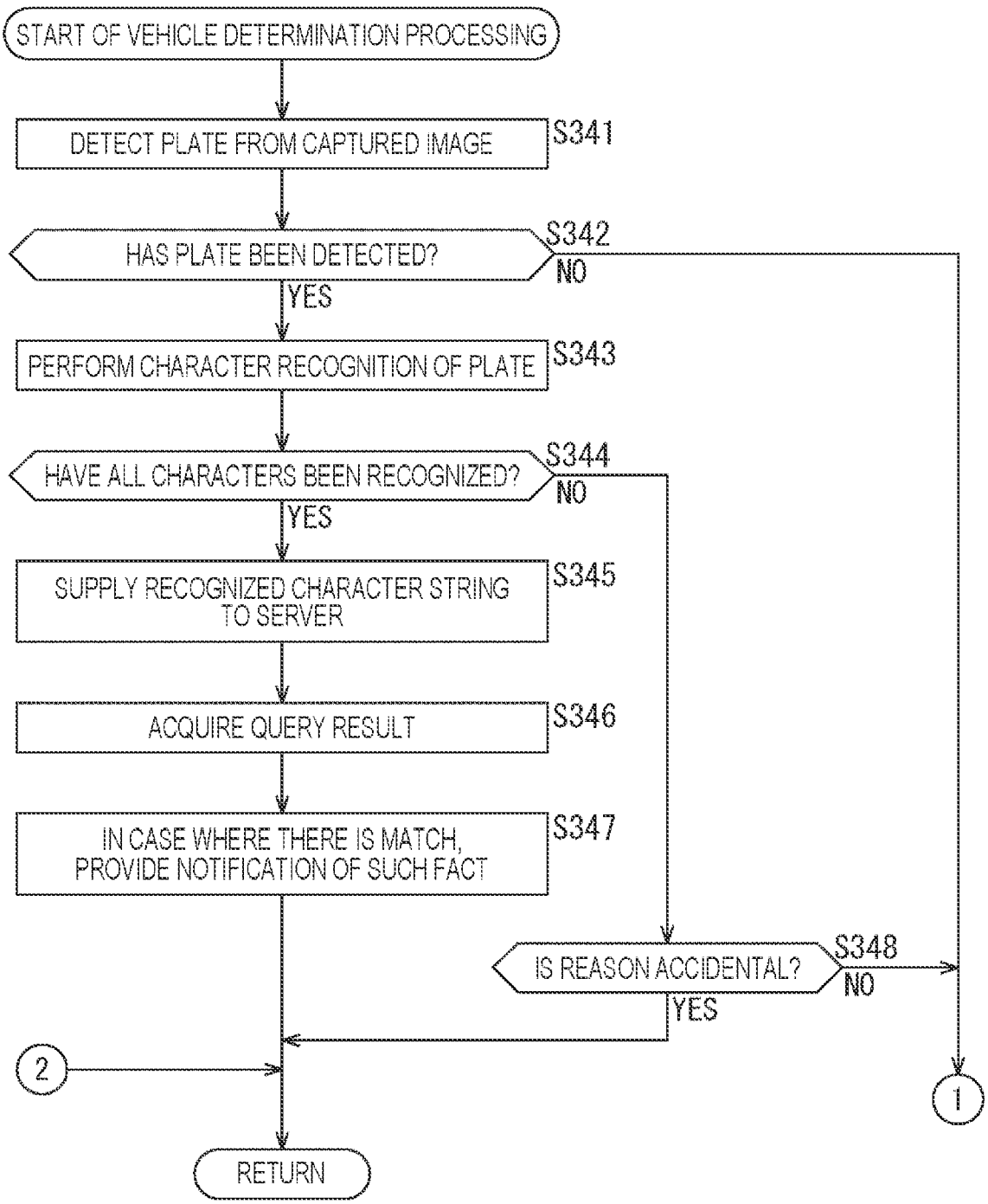
FIG. 19 is a flowchart illustrating an example of a flow of vehicle determination processing.

Each process of step S341 to step S344 and step S348 of FIG. 19 is executed similarly to each process of step S141 to step S144 and step S146 of FIG. 11.

In step S345, the character supply unit 321 supplies a recognized character string (vehicle registration number) to the server 301 via the communication unit 141 to query the attention-requiring vehicle database 354 for the character string.

In step S346, the query result acquisition unit 322 acquires a result of the query supplied from the server 301 via the communication unit 141.

In step S347, in a case where it is determined that there is a match of the supplied character string (vehicle registration number) as the query result, the notification processing unit 172 generates notification information for providing notification of such a fact. The notification processing unit 172 supplies the notification information to the input/output device 113 via the communication unit 141 for output.

In a case where the process of step S347 ends, the vehicle determination processing is ended, and the processing returns to FIG. 18.

Figure 20:
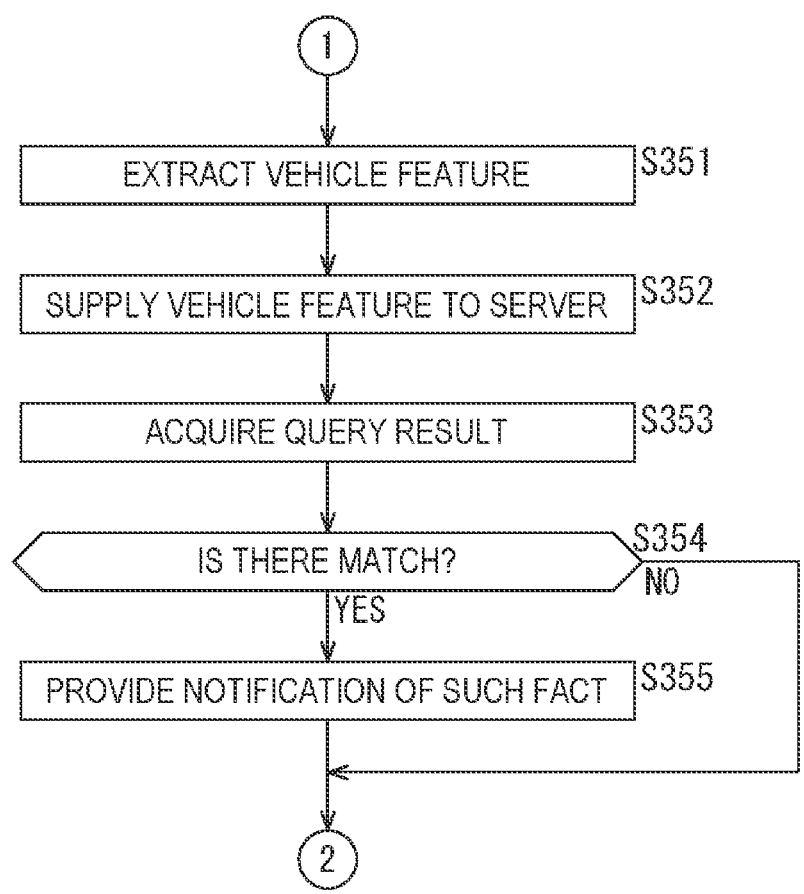
FIG. 20 is a flowchart illustrating the example of the flow of the vehicle determination processing, which is subsequent to FIG. 19.

Furthermore, each process of step S351, step S354, and step S355 of FIG. 20 is executed similarly to each process of step S151, step S153, and step S154 of FIG. 12.

In step S352, the feature supply unit 331 or the feature supply unit 341 supplies vehicle feature information to the server 301 via the communication unit 141.

In step S353, the query result acquisition unit 332 or the query result acquisition unit 342 acquires a query result of the feature information transmitted from the server 301 via the communication unit 141.

In a case where the process of step S355 ends or in a case where it is determined in step S354 that there is no match, the vehicle determination processing is ended, and the processing returns to FIG. 18.

<Flow of Database Processing>

Next, an example of a flow of the database processing of FIG. 18 will be described with reference to a flowchart of FIG. 21.

In a case where the database processing is started, the character query unit 361 determines in step S361 whether or not a character string has been acquired. In a case where it is determined that the character string has been acquired, the processing proceeds to step S362.

In step S362, the character query unit 361 queries the attention-requiring vehicle database 354 for the character string.

In step S363, the processing result supply unit 355 acquires a query result of the character string and supplies the query result to the terminal device 112, which is a supply source of the character string, via the communication unit 351. In a case where the process of step S363 ends, the processing proceeds to step S364. Furthermore, in a case where it is determined in step S361 that the character string has not been acquired, the processing proceeds to step S364.

In step S364, the feature query unit 362 determines whether or not vehicle feature information has been acquired. In a case where it is determined that the feature information has been acquired, the processing proceeds to step S365.

In step S365, the feature query unit 362 queries the attention-requiring vehicle database 354 for the feature information.

In step S366, the processing result supply unit 355 acquires a query result of the feature information and supplies the query result to the terminal device 112, which is a supply source of the feature information, via the communication unit 351.

In step S367, the feature registration unit 363 registers the feature information in the attention-requiring vehicle database 354.

In a case where the process of step S367 ends, the database processing is ended, and the processing returns to FIG. 18. Furthermore, in a case where it is determined in step S364 that the feature information has not been acquired, the database processing is ended, and the processing returns to FIG. 18.

As the respective processes are executed as described above, the suspicious vehicle detection system 100 can suppress the possibility that the vehicle which is likely to be the suspicious vehicle is not detectable (reduce the incidence of overlooking), and suppress the reduction in the accuracy of the suspicious vehicle detection. That is, it is possible to suppress the reduction in the effectiveness of the suspicious vehicle detection system 100.

Figure 13:
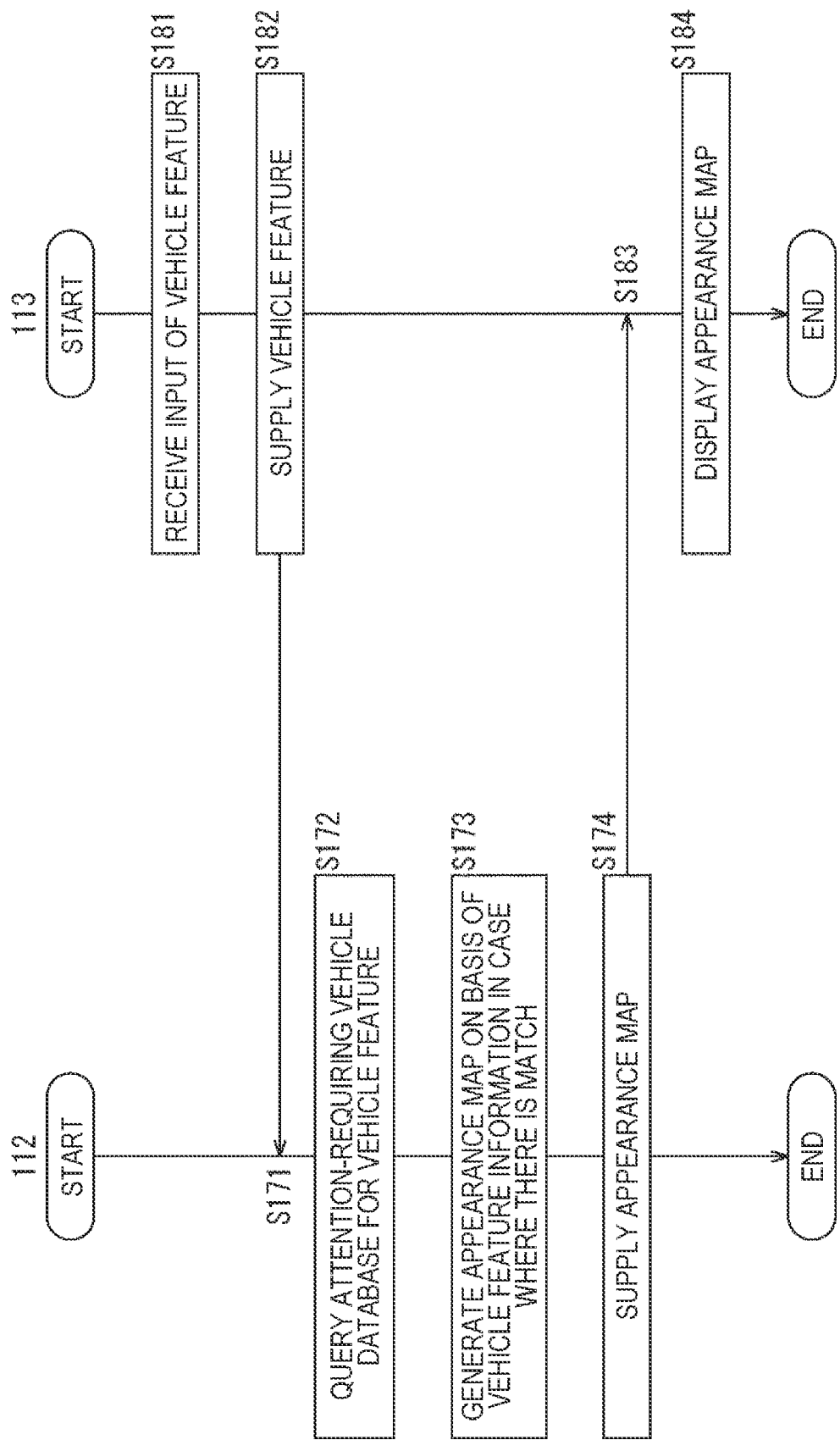
FIG. 13 is a flowchart illustrating an example of a flow of database reference processing.

Note that the server 301 may perform the processing of the terminal device 112 in the example of FIG. 13 as database reference processing. In such a case, the terminal device 112 is only required to relay the communication between the server 301 and the input/output device 113.

Furthermore, the output of the notification information can be performed by the terminal device 311 instead of the input/output device 113, or can also be performed by both the input/output device 113 and the terminal device 311. In those cases, the terminal device 311 may perform processing similar to that of the input/output device 113.

4. Third Embodiment

Suspicious Vehicle Detection System

System Configuration Example 1

Figure 22:
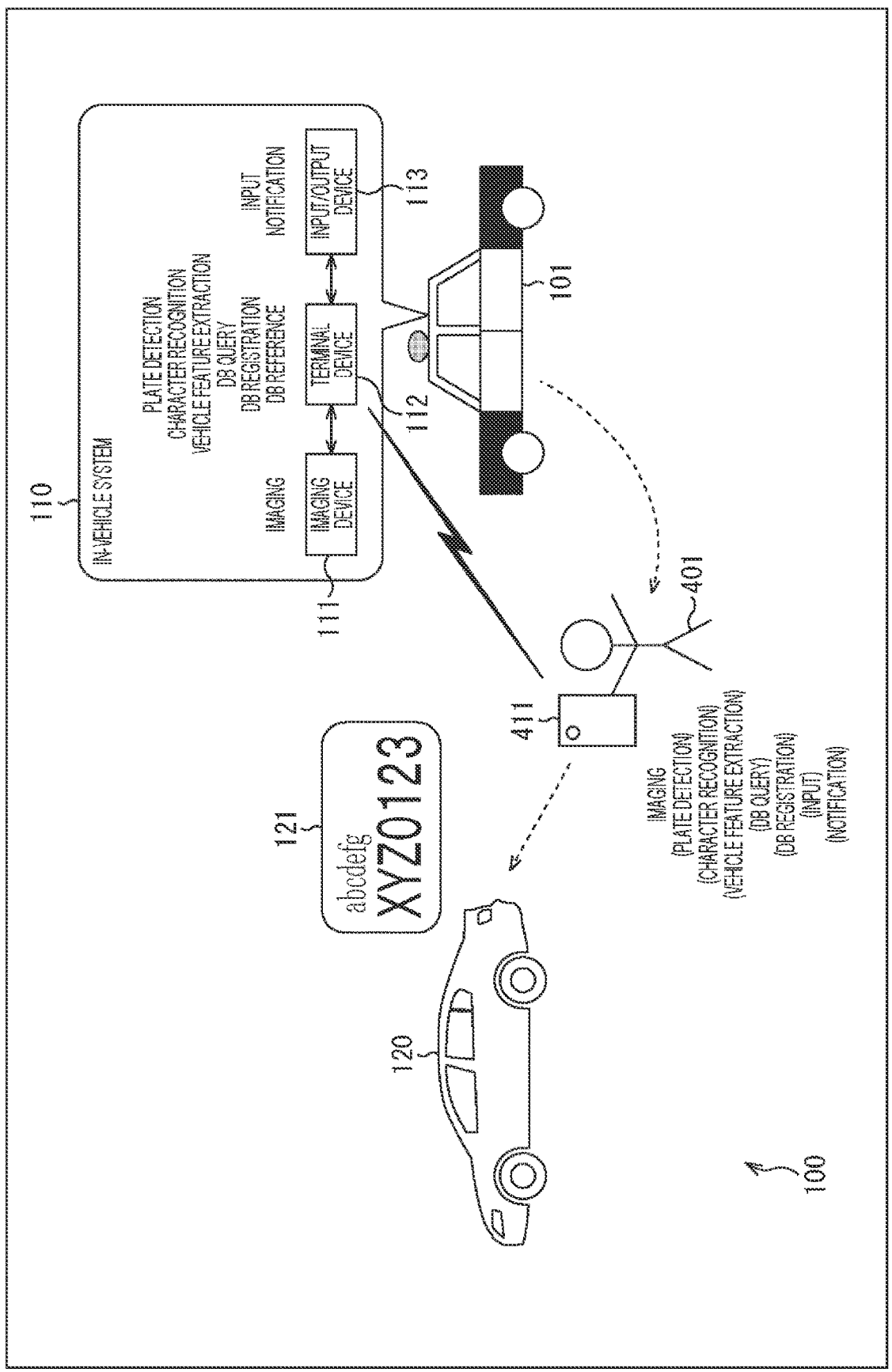
FIG. 22 is a diagram illustrating a main configuration example of a suspicious vehicle detection system.

Note that imaging of the vehicle 120 may be performed by a device other than the imaging device 111. For example, as illustrated in FIG. 22, a portable terminal device 411 possessed by a police officer 401, who is a passenger of the patrol car 101, may perform the imaging of the vehicle 120.

At this time, the imaging device 111 may be omitted. Furthermore, the imaging may be performed by both the imaging device 111 and the portable terminal device 411 as illustrated in FIG. 22.

The portable terminal device 411 is an information processing device that can be carried by the police officer 401, for example, a smartphone, a foldable mobile phone, a tablet terminal, a notebook personal computer, and the like. The portable terminal device 411 has at least an imaging function and a communication function. For example, the police officer 401 can get off the patrol car 101 and take an image of the vehicle 120 from outside the patrol car 101 using the portable terminal device 411.

The portable terminal device 411 can communicate with the terminal device 112 by a wireless communication function. The portable terminal device 411 transmits the generated captured image to the terminal device 112 by the communication. The terminal device 112 receives the captured image transmitted from the portable terminal device 411 similarly to the case of acquiring from the imaging device 111.

Note that the portable terminal device 411 may perform processing of the terminal device 112, for example, number plate detection, character recognition, feature extraction, database query, database registration, and the like in addition to the imaging.

Furthermore, the portable terminal device 411 may perform processing of the input/output device 113 such as reception of an input operation and output of notification information.

System Configuration Example 2

Figure 23:
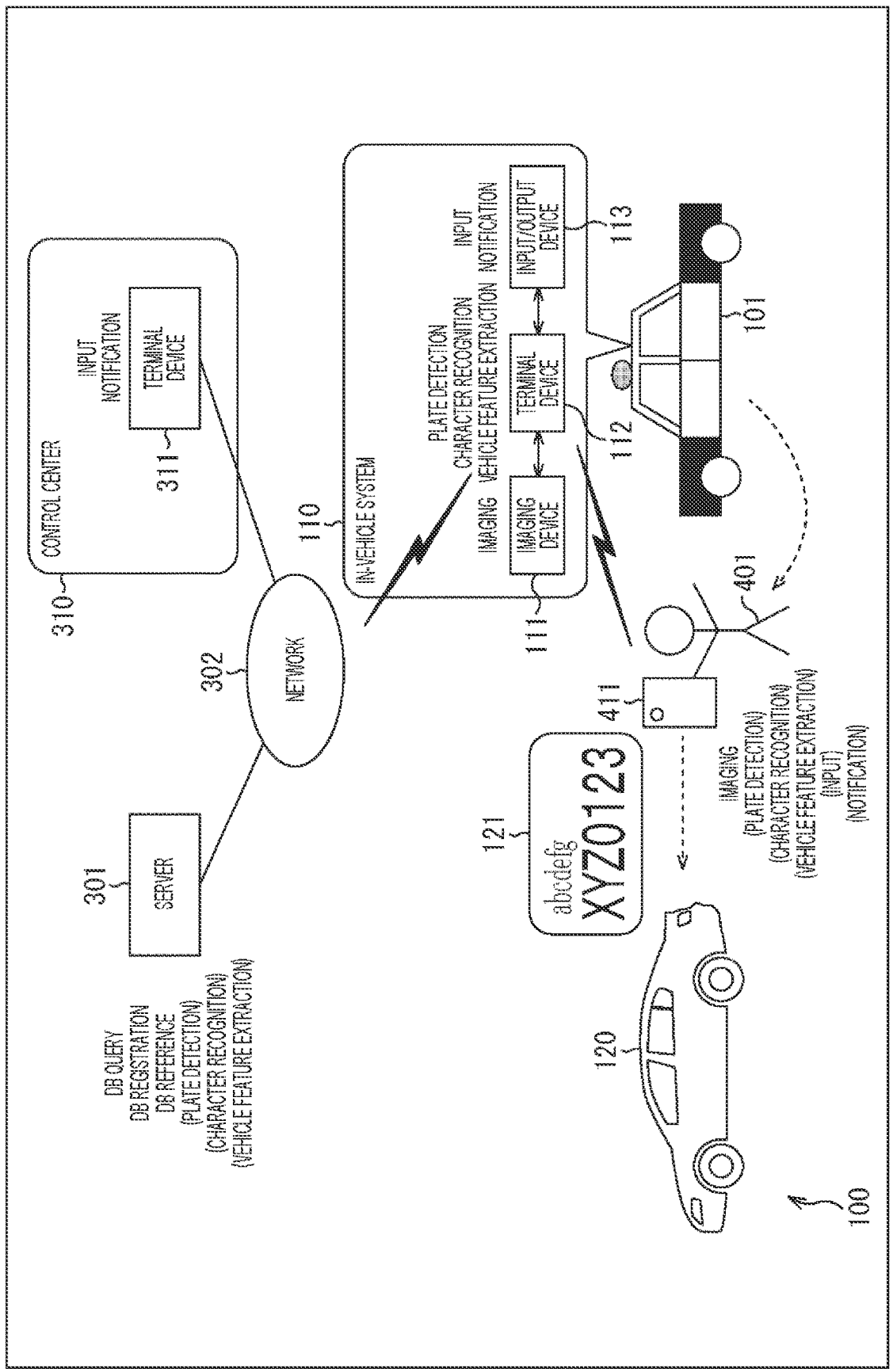
FIG. 23 is a diagram illustrating a main configuration example of a suspicious vehicle detection system.

Note that the server 301 may be provided as in the second embodiment. FIG. 23 illustrates a main configuration example in such a case. That is, an attention-requiring vehicle database is provided in the server 301 so that processing such as a query, registration, and reference is performed on the server 301, which is similar to the case of the second embodiment. The other configurations are similar to those in the case of FIG. 22.

System Configuration Example 3

Figure 24:
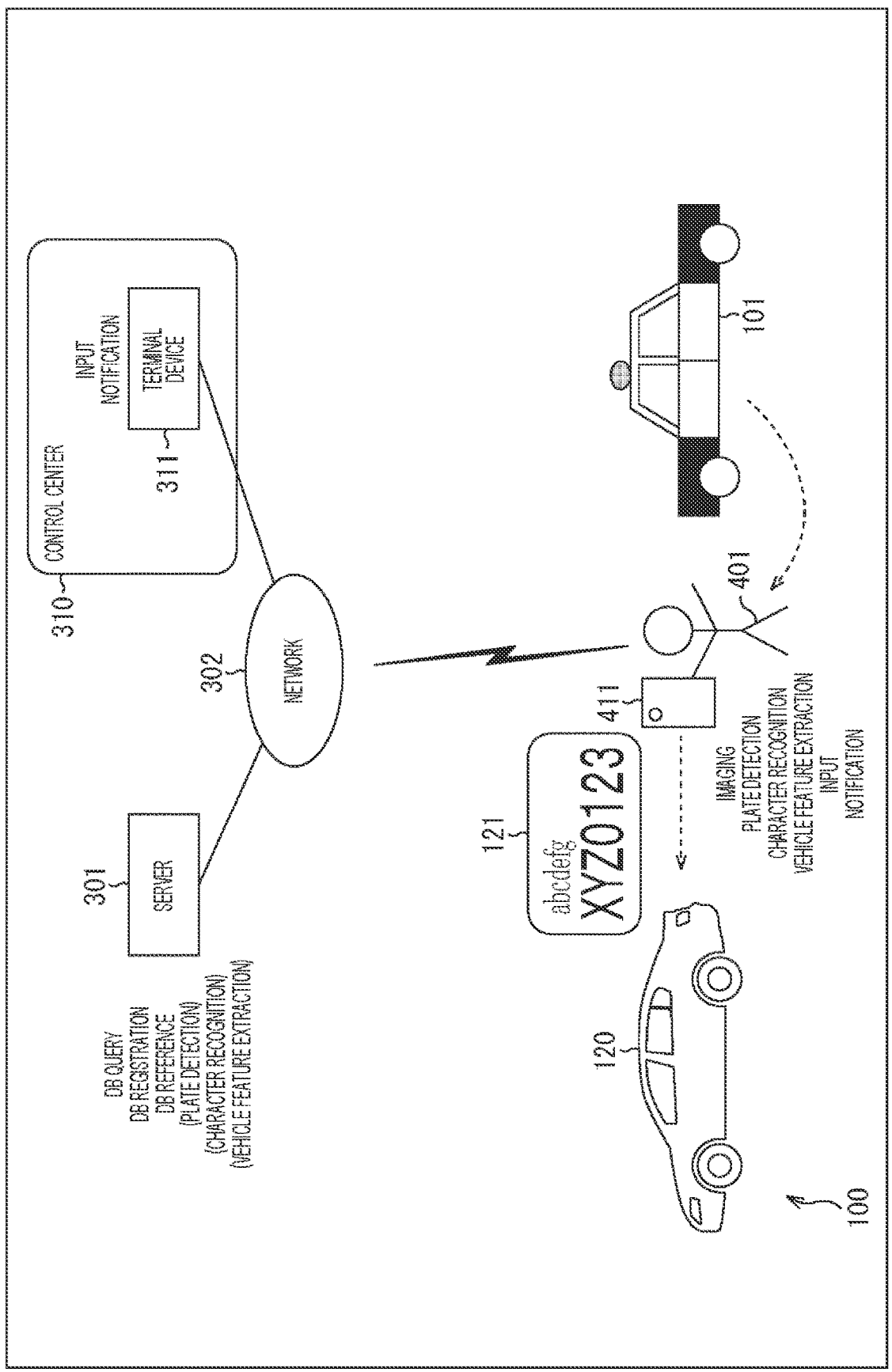
FIG. 24 is a diagram illustrating a main configuration example of a suspicious vehicle detection system.

Furthermore, the in-vehicle system 110 may be omitted. In such a case, the portable terminal device 411 may perform all the processing performed by each device of the in-vehicle system 110 in the first embodiment. Furthermore, as in an example illustrated in FIG. 24, the portable terminal device 411 may perform all the processing performed by each device of the in-vehicle system 110 in the example of FIG. 23.

<Portable Terminal Device>

Figure 25:
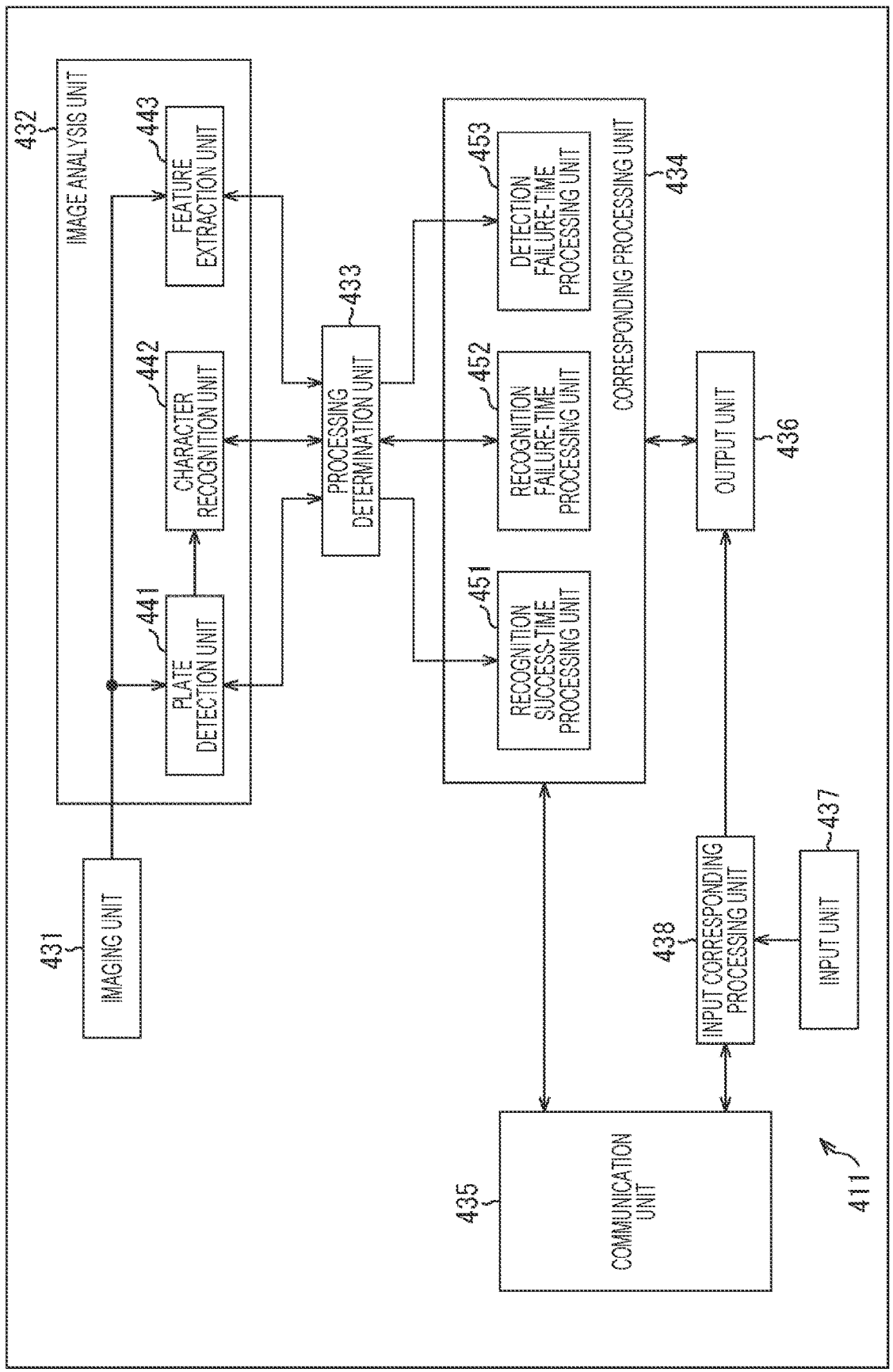
FIG. 25 is a block diagram illustrating a main configuration example of a portable terminal device.

FIG. 25 illustrates a main configuration example of the portable terminal device 411. As illustrated in FIG. 25, the portable terminal device 411 includes an imaging unit 431, an image analysis unit 432, a processing determination unit 433, a corresponding processing unit 434, a communication unit 435, an output unit 436, an input unit 437, and an input corresponding processing unit 438.

The imaging unit 431 performs processing similar to that of the imaging unit 131. The image analysis unit 432 performs processing similar to that of the image analysis unit 143. The image analysis unit 432 includes a plate detection unit 441, a character recognition unit 442, and a feature extraction unit 443.

The plate detection unit 441 performs processing similar to that of the plate detection unit 151. The character recognition unit 442 performs processing similar to that of the character recognition unit 152. The feature extraction unit 443 performs processing similar to that of the feature extraction unit 153.

The processing determination unit 433 performs processing similar to that of the processing determination unit 144. The corresponding processing unit 434 performs processing similar to that of the corresponding processing unit 145. The communication unit 435 performs processing similar to that of the communication unit 141. The output unit 436 performs processing similar to that of the output unit 254. For example, the output unit 436 outputs notification information as an image, a voice, and the like. The input unit 437 performs processing similar to that of the input unit 253. The input corresponding processing unit 438 performs processing similar to that of the input corresponding processing unit 147 with respect to an input operation received by the input unit 437.

Figure 26:
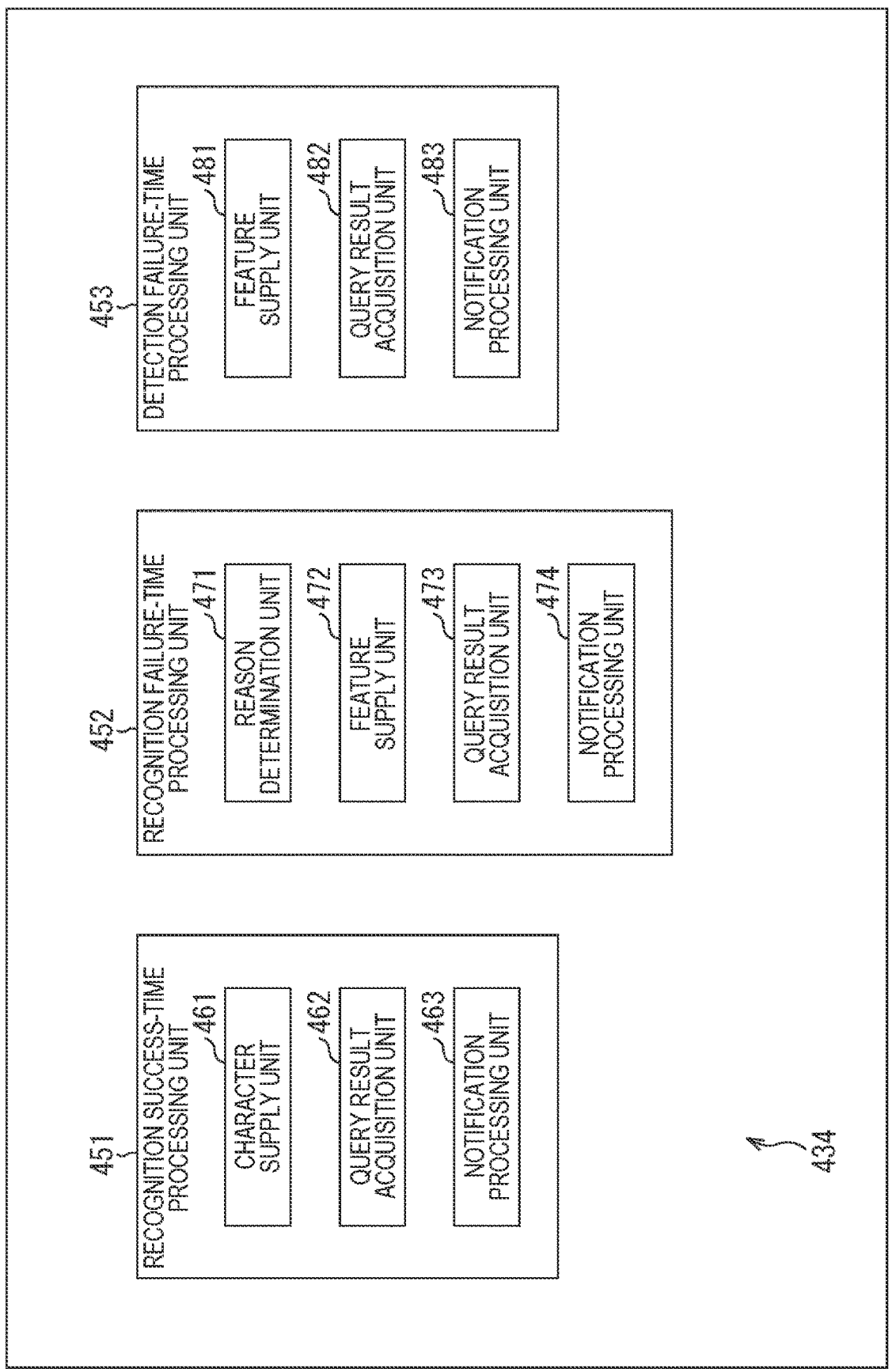
FIG. 26 is a block diagram illustrating a main configuration example of functional blocks of a corresponding processing unit.

FIG. 26 illustrates a main configuration example of the corresponding processing unit 434. As illustrated in FIG. 26, the recognition success-time processing unit 451 includes a character supply unit 461, a query result acquisition unit 462, and a notification processing unit 463 as functional blocks.

The character supply unit 461 performs processing similar to that of the character supply unit 321. The query result acquisition unit 462 performs processing similar to that of the query result acquisition unit 322. The notification processing unit 463 performs processing similar to that of the notification processing unit 172.

Furthermore, as illustrated in FIG. 26, the recognition failure-time processing unit 452 includes a reason determination unit 471, a feature supply unit 472, a query result acquisition unit 473, and a notification processing unit 474 as functional blocks.

The reason determination unit 471 performs processing similar to that of the reason determination unit 181. The feature supply unit 472 performs processing similar to that of the feature supply unit 331. The query result acquisition unit 473 performs processing similar to that of the query result acquisition unit 332. The notification processing unit 474 performs processing similar to that of the notification processing unit 183. However, the notification processing unit 474 supplies generated notification information to the output unit 436 for output.

Furthermore, as illustrated in FIG. 26, the detection failure-time processing unit 453 includes a feature supply unit 481, a query result acquisition unit 482, and a notification processing unit 483 as functional blocks.

The feature supply unit 481 performs processing similar to that of the feature supply unit 341. The query result acquisition unit 482 performs processing similar to that of the query result acquisition unit 342. The notification processing unit 483 performs processing similar to that of the notification processing unit 192. However, the notification processing unit 483 supplies generated notification information to the output unit 436 for output.

With such a configuration, the server 301 can perform the processing using the attention-requiring vehicle database 354 even in a case where the characters have not been recognized, which is similar to the terminal device 112 of the second embodiment.

Therefore, similarly to the case of the second embodiment, the suspicious vehicle detection system 100 can suppress a possibility that a vehicle which is likely to be a suspicious vehicle is not detectable (reduce the incidence of overlooking), and suppress reduction in accuracy of suspicious vehicle detection. That is, it is possible to suppress the reduction in the effectiveness of the suspicious vehicle detection system 100.

<Flow of Suspicious Vehicle Detection Processing>

Figure 27:
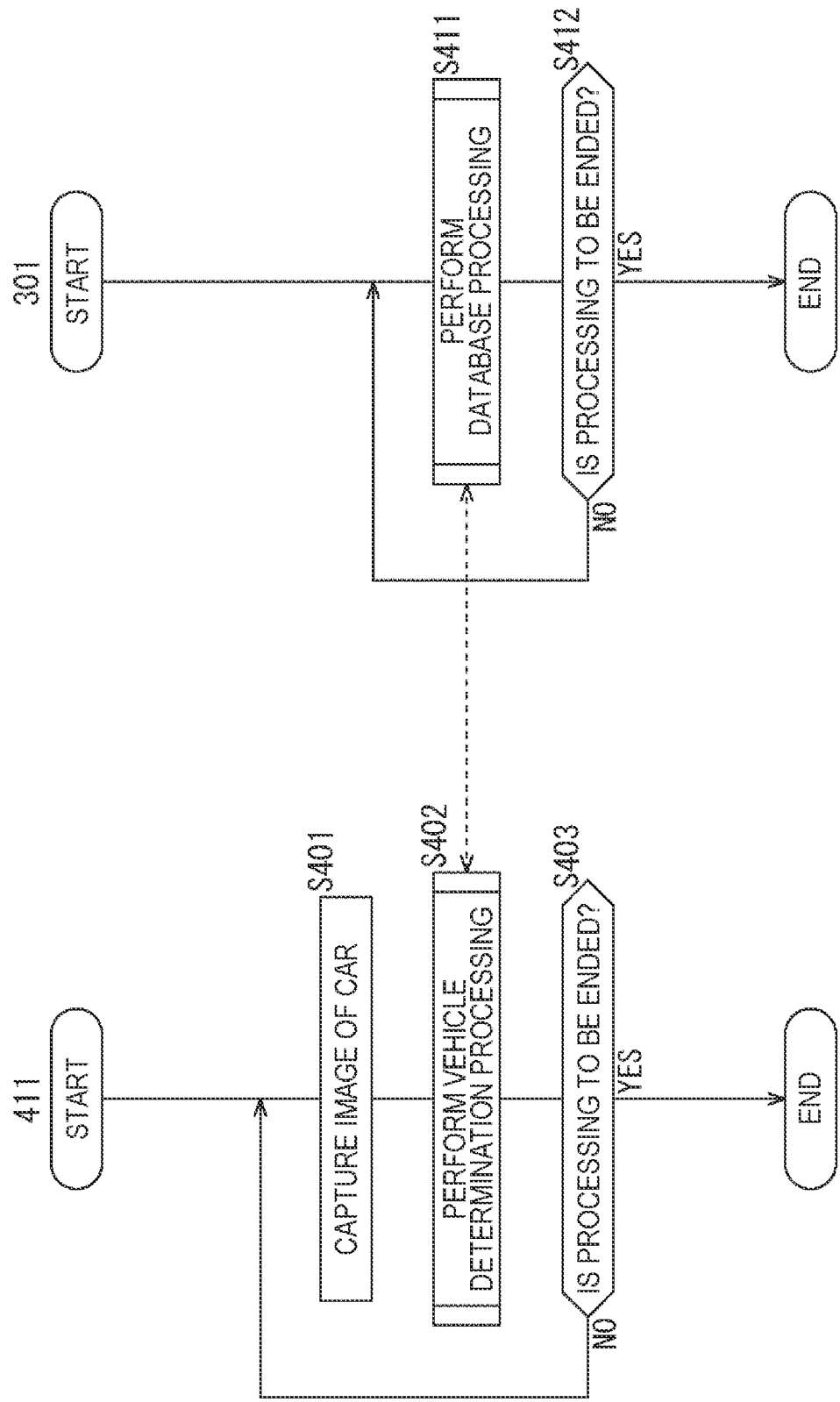
FIG. 27 is a flowchart illustrating an example of a flow of suspicious vehicle detection processing.

FIG. 27 illustrates an example of a flow of suspicious vehicle detection processing in this case. In this case, the portable terminal device 411 performs processing similar to those of the imaging device 111 and the terminal device 112 in the case of FIG. 18.

That is, each process of step S401, step S402, and step S403 of FIG. 27 is executed similarly to each process of step S301, step S322, and step S303 (step S323) of FIG. 18.

On the other hand, the server 301 performs processing similar to that in the case of FIG. 18. That is, each process of step S411 and step S412 of FIG. 27 is executed in a similar manner as in step S311 and step S312 of FIG. 18.

<Flow of Vehicle Determination Processing>

An example of a flow of vehicle determination processing in this case will be described with reference to flowcharts of FIGS. 28 and 29.

Figure 28:
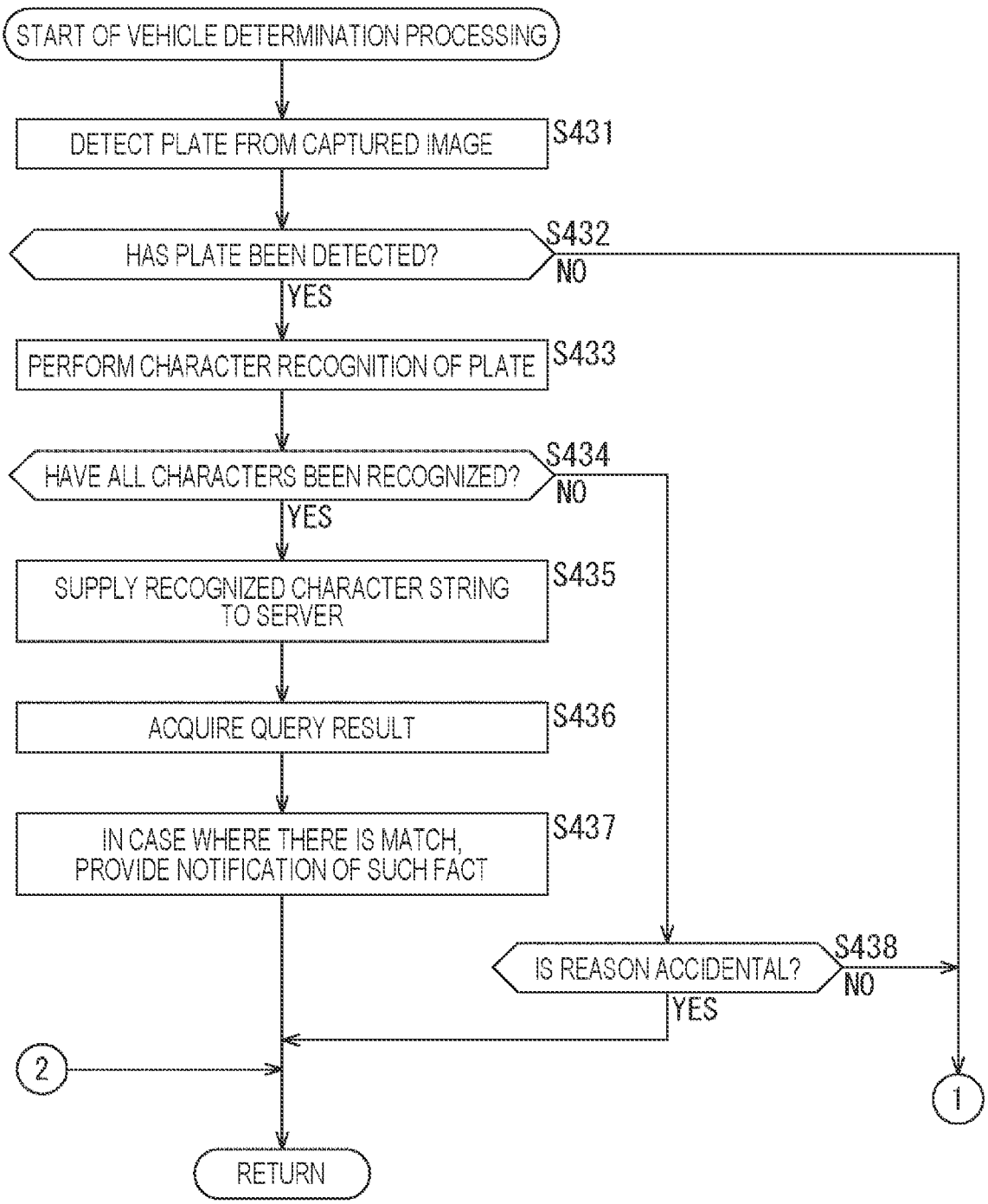
FIG. 28 is a flowchart illustrating an example of a flow of vehicle determination processing.

Each process of step S431 to step S438 of FIG. 28 is executed similarly to each process of step S341 to step S348 of FIG. 19.

Figure 29:
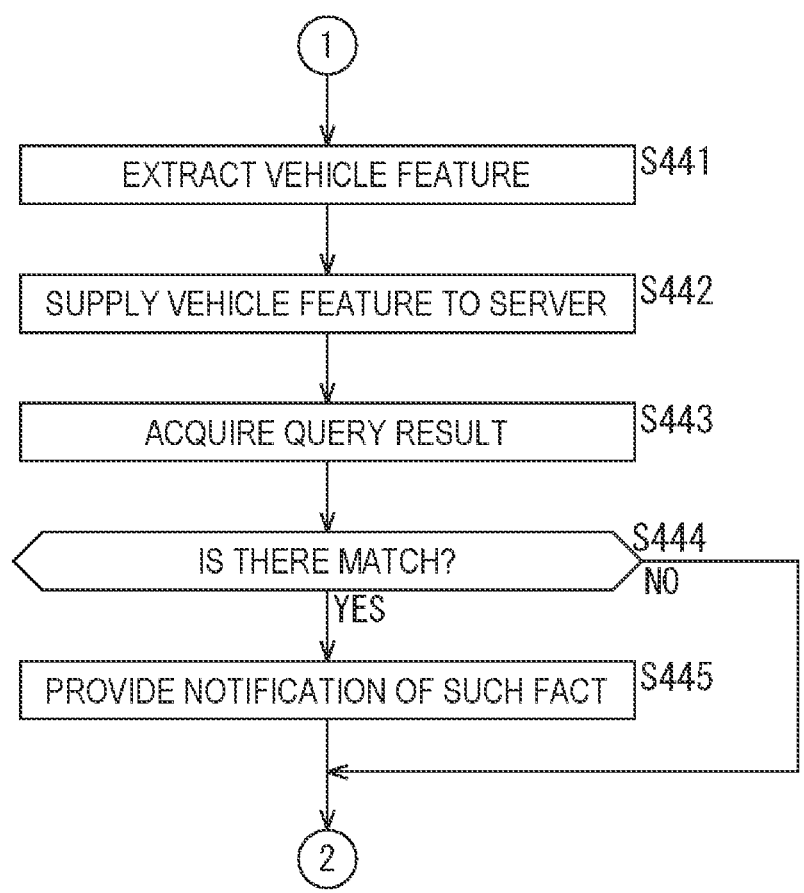
FIG. 29 is a flowchart illustrating the example of the flow of the vehicle determination processing, which is subsequent to FIG. 28.

Furthermore, each process of step S441 to step S445 of FIG. 29 is executed similarly to each process of step S351 to step S355 of FIG. 20. However, in step S445, the notification processing unit 474 and the notification processing unit 483 supply generated notification information to the output unit 436 for output. The output unit 436 outputs (notifies a user of) the notification information.

As the respective processes are executed as described above, the suspicious vehicle detection system 100 can suppress the possibility that the vehicle which is likely to be the suspicious vehicle is not detectable (reduce the incidence of overlooking), and suppress the reduction in the accuracy of the suspicious vehicle detection. That is, it is possible to suppress the reduction in the effectiveness of the suspicious vehicle detection system 100.

Note that the server 301 may perform the processing of the terminal device 112 in the example of FIG. 13 as database reference processing. In such a case, the terminal device 112 is only required to relay the communication between the server 301 and the input/output device 113.

Furthermore, the output of the notification information can be performed by the terminal device 311 instead of the input/output device 113, or can also be performed by both the input/output device 113 and the terminal device 311. In those cases, the terminal device 311 may perform processing similar to that of the input/output device 113.

5. Fourth Embodiment

<Suspicious Vehicle Detection System>
<System Configuration>

Imaging of a vehicle can be performed by any device. For example, the imaging of a vehicle may be performed by an air vehicle having an imaging function such as a so-called drone.

Figure 30:
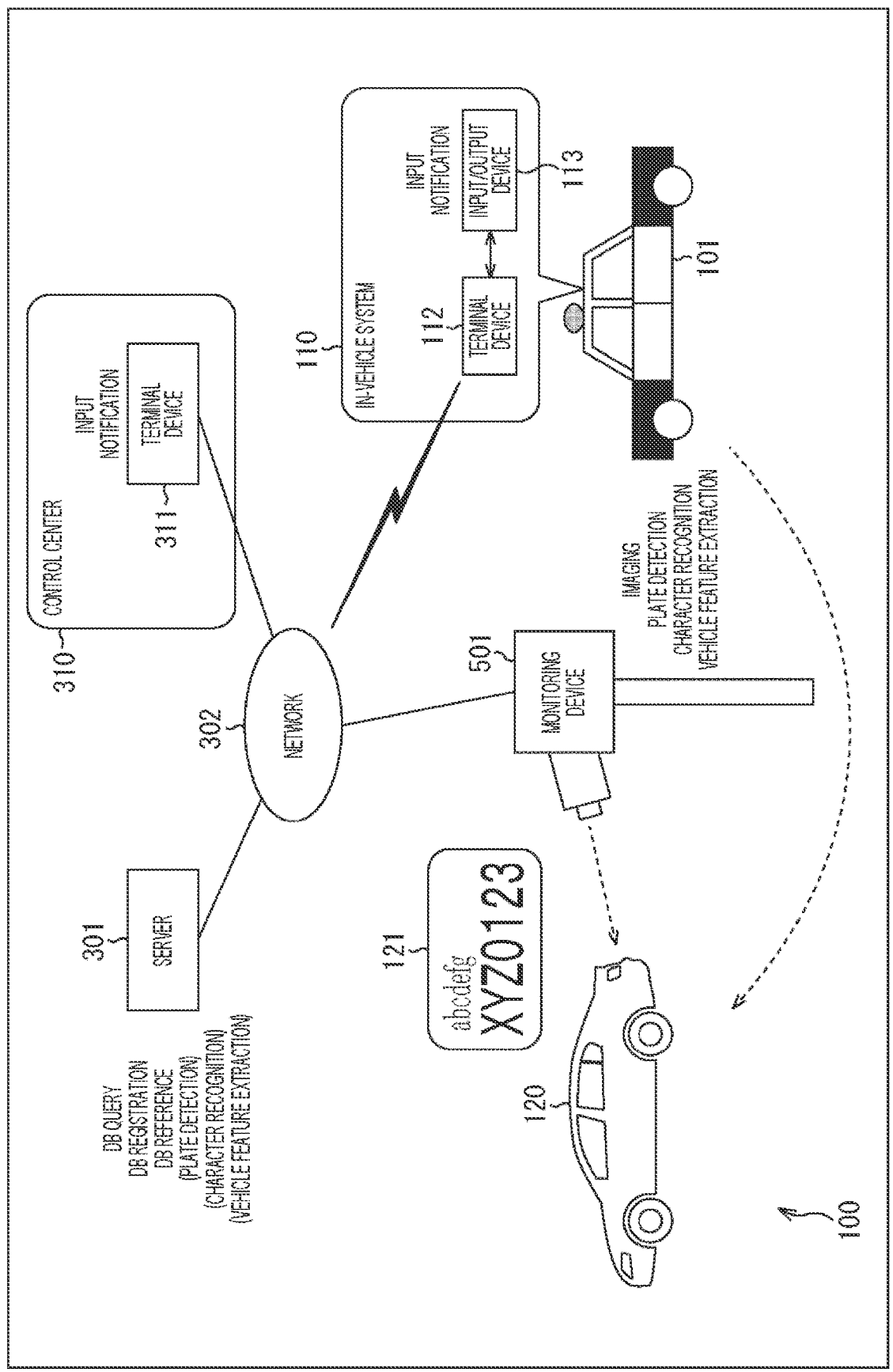
FIG. 30 is a diagram illustrating a main configuration example of a suspicious vehicle detection system.

Furthermore, the imaging of a vehicle may be performed by a monitoring device installed in the city and the like, for example, as in an example illustrated in FIG. 30. In a case of the example of FIG. 30, the suspicious vehicle detection system 100 includes a monitoring device 501. The monitoring device 501 is installed in a region where vehicles pass, such as the vicinity of a road.

The monitoring device 501 can perform the imaging of a vehicle and also perform processing of the image analysis unit 143 such as number plate detection, character recognition, and vehicle feature extraction. Furthermore, the monitoring device 501 has a communication function and is connected to the network 302 to be capable of communicating with each other. That is, the monitoring device 501 can communicate with other devices such as the terminal device 112, the server 301, and the terminal device 311 via the network 302.

The monitoring device 501 captures an image of the vehicle 120, performs image analysis, and transmits a result of the analysis (for example, a number plate detection result, a character recognition result, extracted feature information, or the like) to the server 301. The server 301 detects a suspicious vehicle by querying the attention-requiring vehicle database 354 for such pieces of information or the like similarly to the case of the third embodiment. The server 301 generates notification information for providing notification of a result of the processing, and supplies the notification information to the input/output device 113 via the terminal device 112.

In a case where a suspicious vehicle has been detected by the monitoring device 501, a police officer notified by the input/output device 113 drives the patrol car 101 to move to a location of the vehicle 120, and confirms the suspicious vehicle.

Note that the imaging device 111 can be omitted in the in-vehicle system 110 in this case.

<Monitoring Device>

Figure 31:
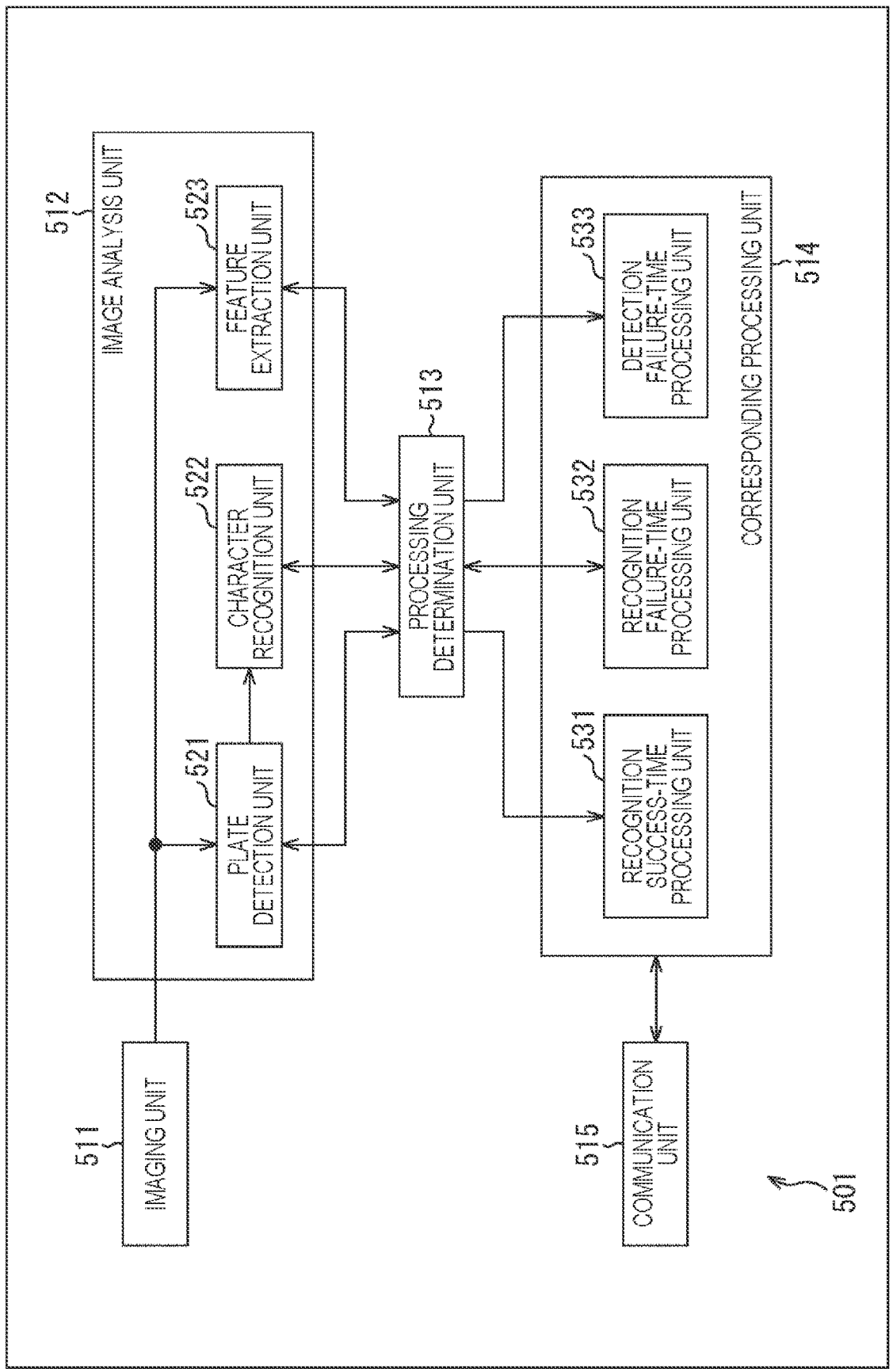
FIG. 31 is a block diagram illustrating a main configuration example of a portable terminal device.

FIG. 31 illustrates a main configuration example of the monitoring device 501. As illustrated in FIG. 31, the monitoring device 501 includes an imaging unit 511, an image analysis unit 512, a processing determination unit 513, a corresponding processing unit 514, and a communication unit 515.

The imaging unit 511 performs processing similar to that of the imaging unit 131. The image analysis unit 512 performs processing similar to that of the image analysis unit 143. The image analysis unit 512 includes a plate detection unit 521, a character recognition unit 522, and a feature extraction unit 523.

The plate detection unit 521 performs processing similar to that of the plate detection unit 151. The character recognition unit 522 performs processing similar to that of the character recognition unit 152. The feature extraction unit 523 performs processing similar to that of the feature extraction unit 153.

The processing determination unit 513 performs processing similar to that of the processing determination unit 144. The corresponding processing unit 514 performs processing similar to that of the corresponding processing unit 145. The corresponding processing unit 514 includes a recognition success-time processing unit 531, a recognition failure-time processing unit 532, and a detection failure-time processing unit 533.

The recognition success-time processing unit 531 performs processing similar to that of the recognition success-time processing unit 161. The recognition failure-time processing unit 532 performs processing similar to that of the recognition failure-time processing unit 162. The detection failure-time processing unit 533 performs processing similar to that of the detection failure-time processing unit 163.

The communication unit 515 performs processing similar to that of the communication unit 141.

<Corresponding Processing Unit>

Figure 32:
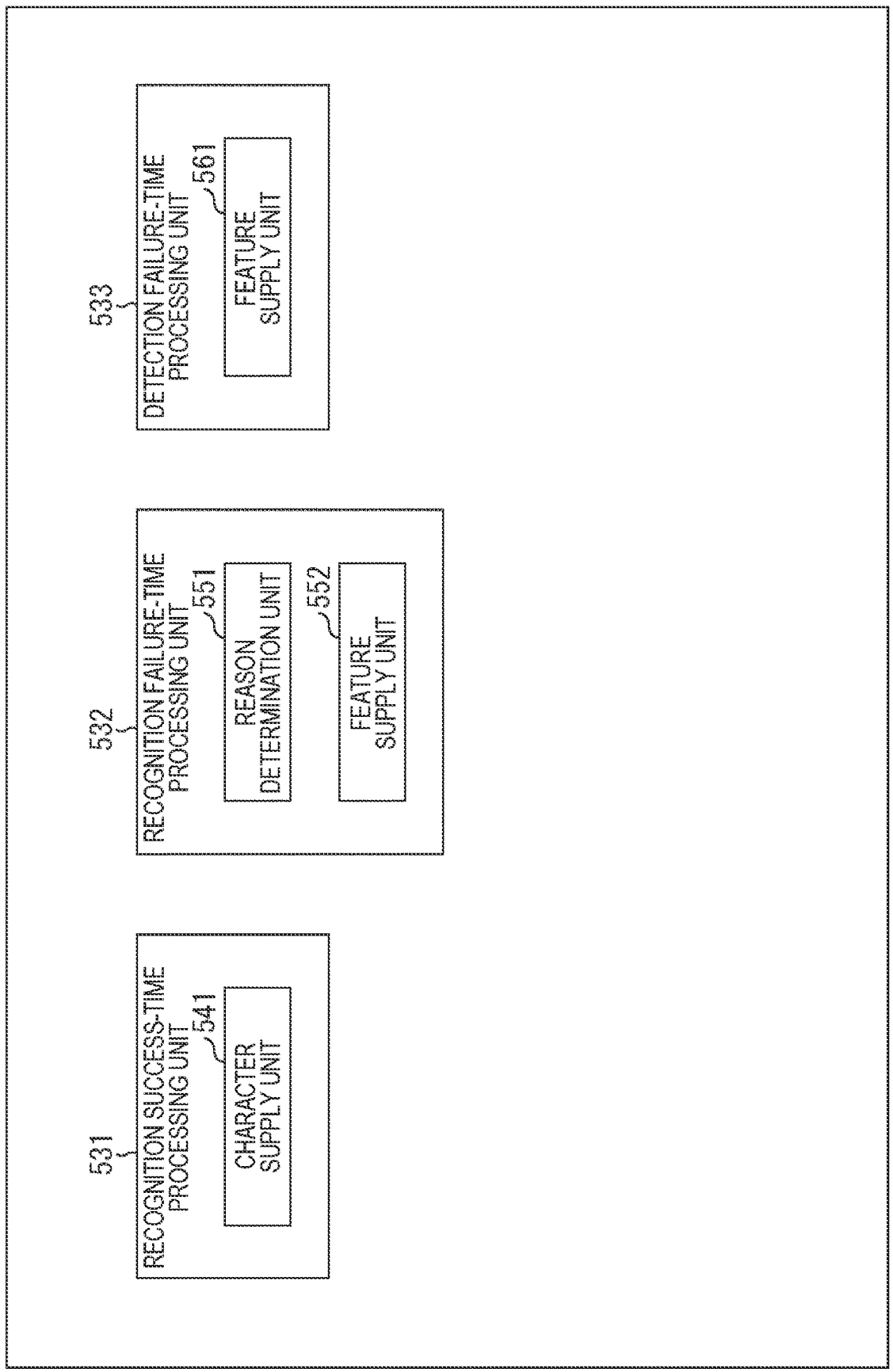
FIG. 32 is a block diagram illustrating a main configuration example of functional blocks of a corresponding processing unit.

FIG. 32 illustrates a main configuration example of the corresponding processing unit 514. As illustrated in FIG. 32, the recognition success-time processing unit 531 includes a character supply unit 541 as a functional block. The character supply unit 541 performs processing similar to that of the character supply unit 321.

Furthermore, as illustrated in FIG. 26, the recognition failure-time processing unit 532 includes a reason determination unit 551 and a feature supply unit 552 as functional blocks. The reason determination unit 551 performs processing similar to that of the reason determination unit 181. The feature supply unit 552 performs processing similar to that of the feature supply unit 331.

Furthermore, as illustrated in FIG. 26, the detection failure-time processing unit 533 includes a feature supply unit 561 as a functional block. The feature supply unit 561 performs processing similar to that of the feature supply unit 341.

<Server>

Figure 33:
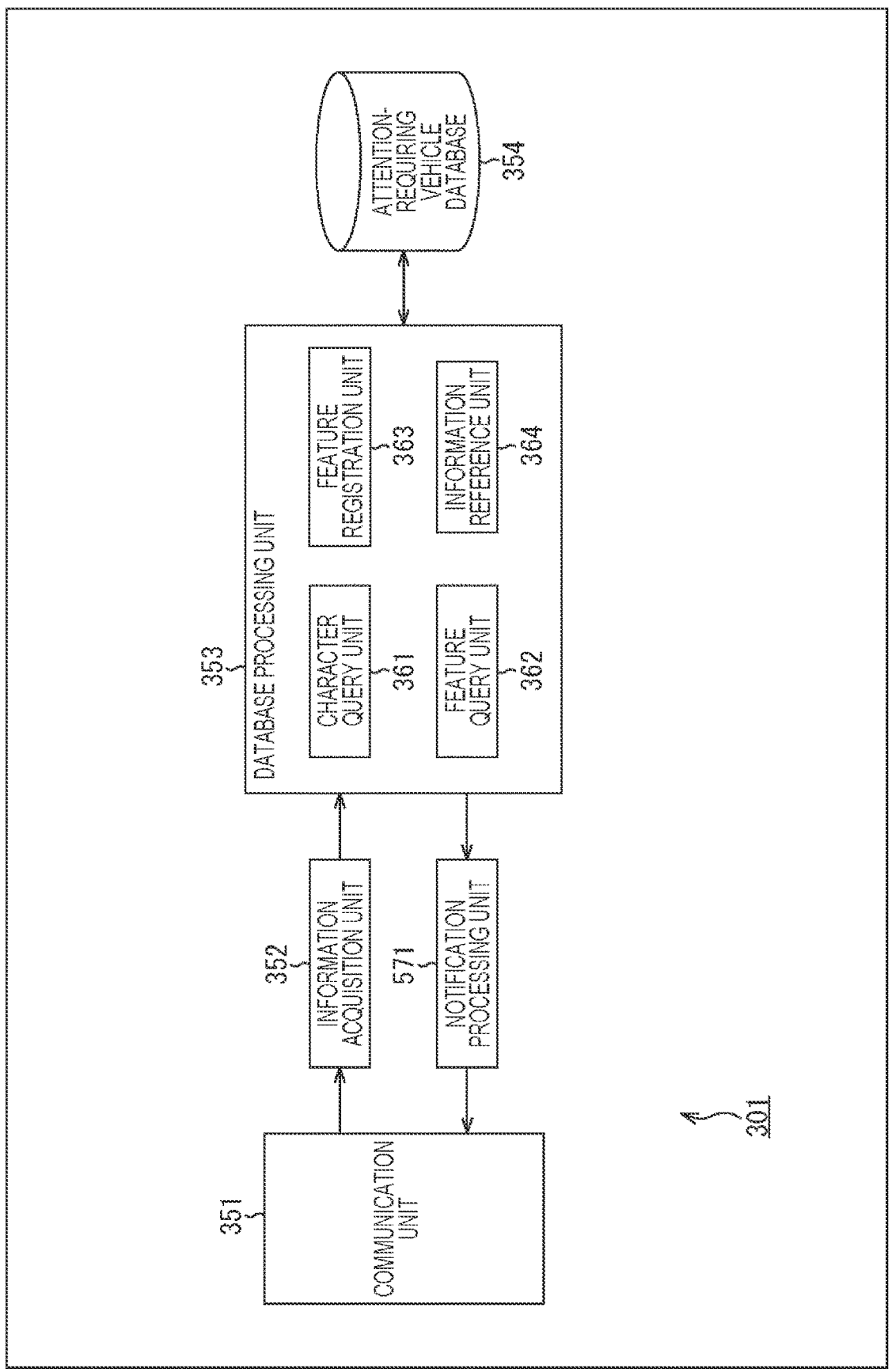
FIG. 33 is a block diagram illustrating a main configuration example of a server.

FIG. 33 is a block diagram illustrating an example of a main configuration of the server 301, which is one mode of the information processing device to which the present technology has been applied. As illustrated in FIG. 33, the server 301 in this case includes a notification processing unit 571 instead of the processing result supply unit 355 in the example of FIG. 17.

The notification processing unit 571 generates notification information for providing notification of a processing result (query result or the like) of the database processing unit 353, and outputs the notification information to the terminal device 112 (to the input/output device 113 via the terminal device 112) via the communication unit 351.

<Flow of Suspicious Vehicle Detection Processing>

Figure 34:
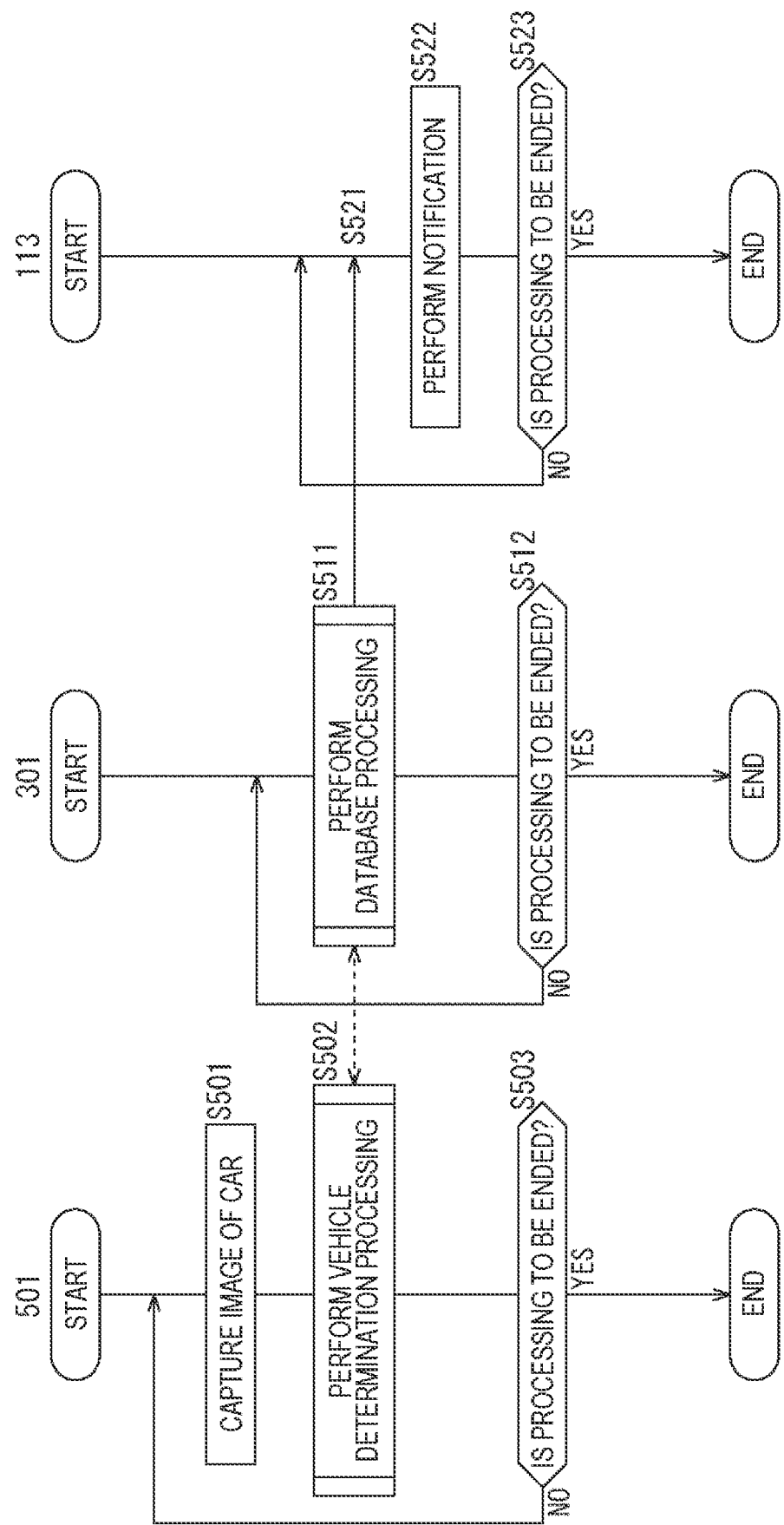
FIG. 34 is a flowchart illustrating an example of a flow of suspicious vehicle detection processing.

FIG. 34 illustrates an example of a flow of suspicious vehicle detection processing in this case. In this case, the monitoring device 501 performs processing similar to those of the imaging device 111 and the terminal device 112 in the case of FIG. 18.

That is, each process of step S501, step S502, and step S503 of FIG. 34 is executed similarly to each process of step S301, step S322, and step S303 (step S323) of FIG. 18.

The server 301 performs processing similar to that in the case of FIG. 18. That is, each process of step S511 and step S512 of FIG. 34 is executed basically in a similar manner as in step S311 and step S312 of FIG. 18. However, in database processing (step S511), the server 301 transmits notification information to the input/output device 113 (the input/output device 113 via the terminal device 112).

The input/output device 113 performs processing similar to that in the case of FIG. 18. That is, each process of step S521, step S522, and step S523 of FIG. 34 is executed similarly to each process of step S331, step S332, and step S333 of FIG. 18.

<Flow of Vehicle Determination Processing>

An example of a flow of vehicle determination processing in this case will be described with reference to a flowchart of FIG. 35.

Figure 35:
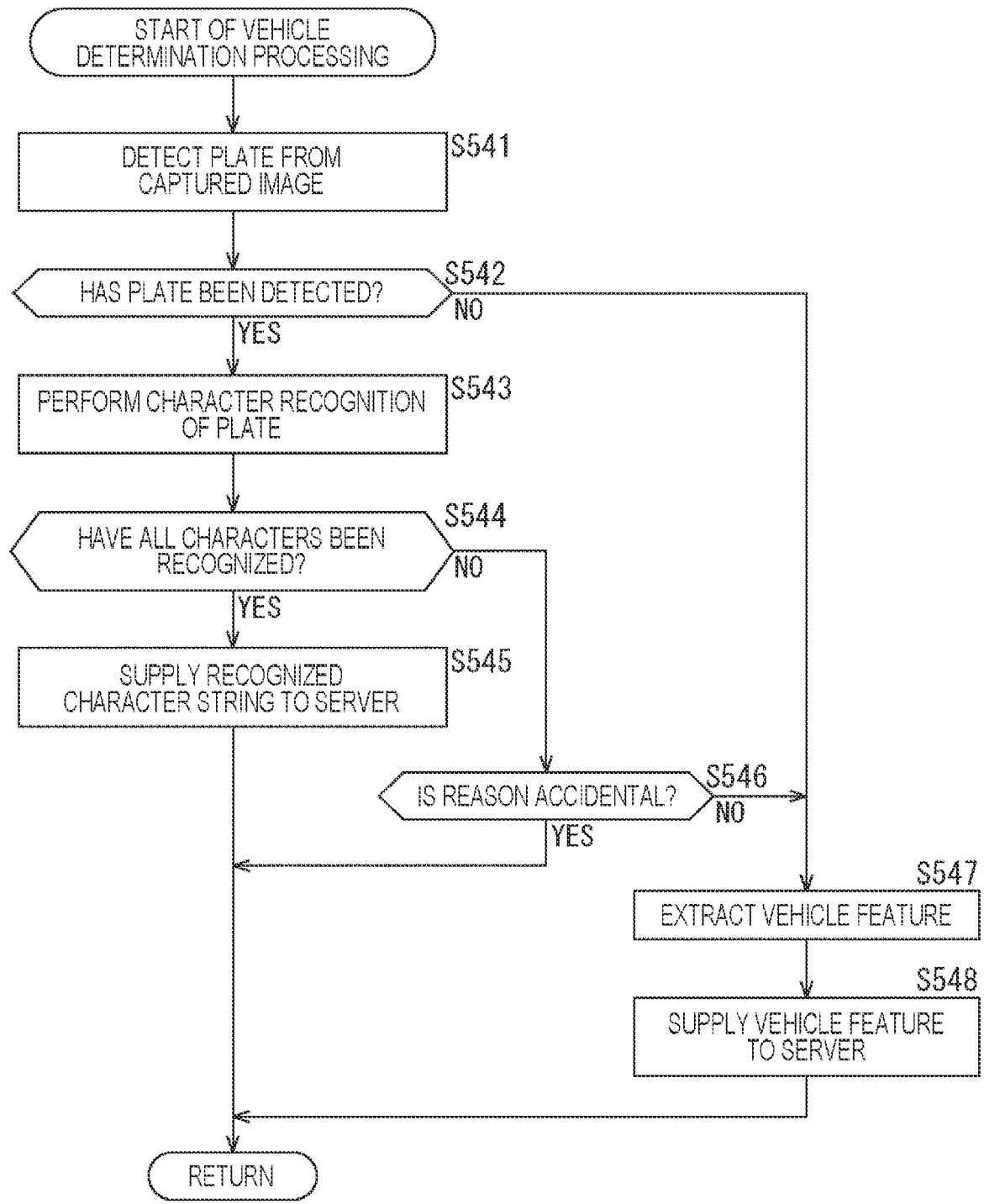
FIG. 35 is a flowchart illustrating an example of a flow of vehicle determination processing.

Each process of step S541 to step S546 of FIG. 35 is executed similarly to each process of step S341 to step S345 and step S348 of FIG. 19. Furthermore, each process of step S547 and step S548 of FIG. 35 is executed similarly to each process of step S351 and step S352 of FIG. 20.

<Flow of Database Processing>

An example of a flow of database processing in this case will be described with reference to a flowchart of FIG. 36.

Figure 21:
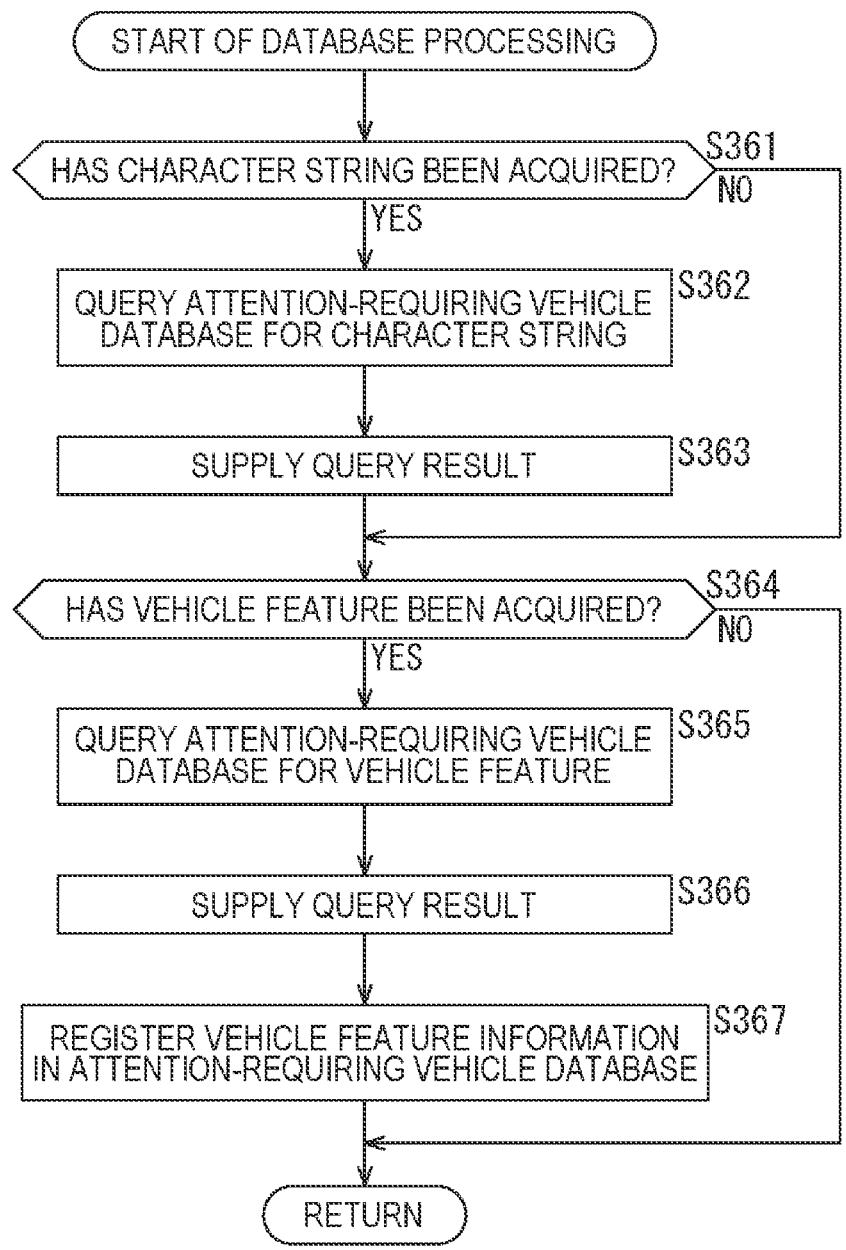
FIG. 21 is a flowchart illustrating an example of a flow of database processing.
Figure 36:
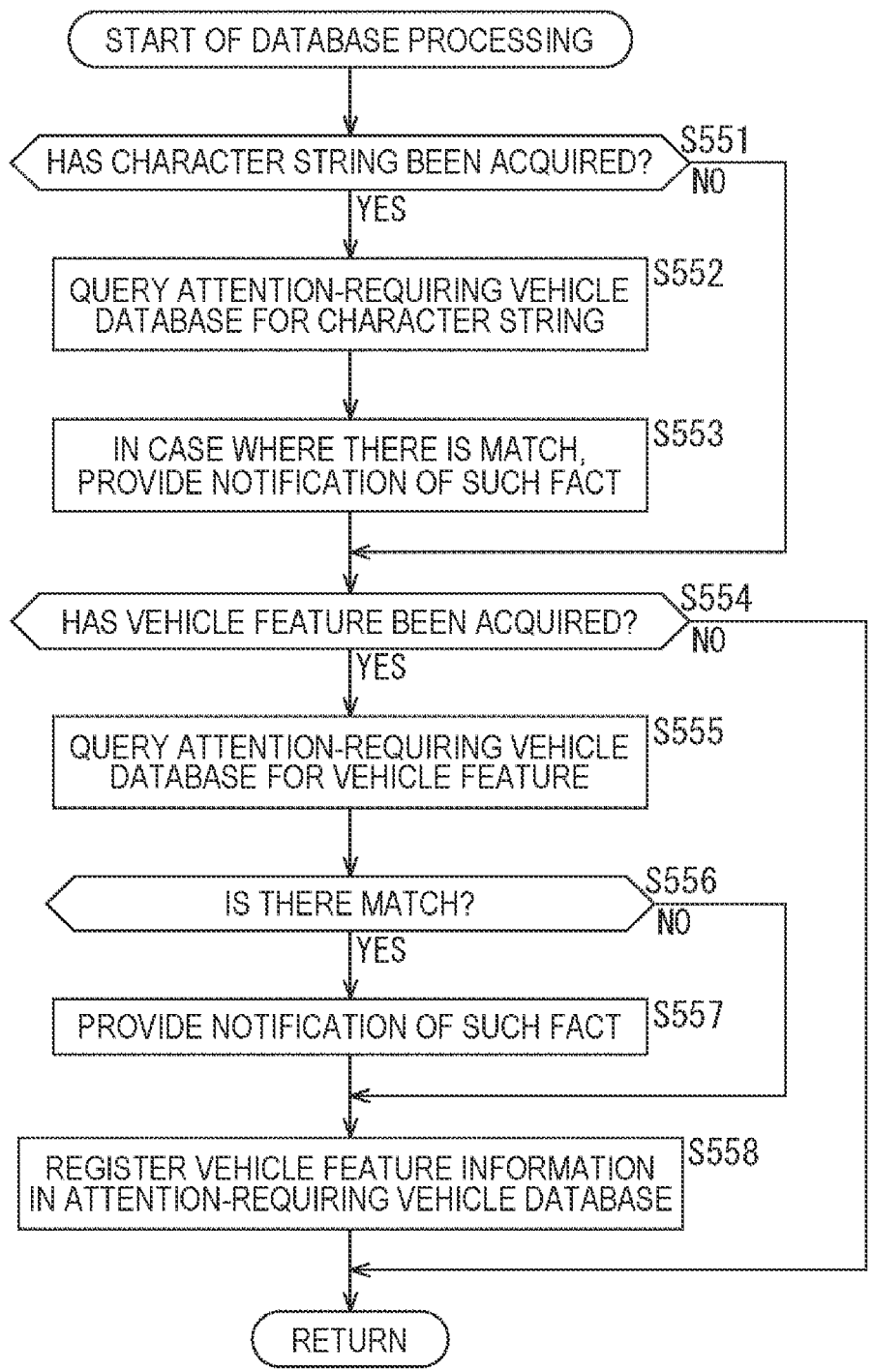
FIG. 36 is a flowchart illustrating an example of a flow of database processing.

Step S551 and step S552 of FIG. 36 are executed in a similar manner as in step S361 and step S362 of FIG. 21.

In step S553, in a case where there is a match of a character string in the process of step S552, the notification processing unit 571 generates notification information indicating such a fact (notification information providing notification that the vehicle 120 is a suspicious vehicle). Then, the notification processing unit 571 supplies the generated notification information to the input/output device 113 (via the terminal device 112) via the communication unit 351.

In a case where the process of step S553 ends, the processing proceeds to step S554. Furthermore, in a case where it is determined in step S551 that the character string has not been acquired, the processing proceeds to step S554.

Each process of step S554, step S555, and step S558 of FIG. 36 is executed similarly to each process of step S364, step S365, and step S367 of FIG. 21.

In step S556, the notification processing unit 571 determines whether or not there is a match of feature information on the basis of a query result. In a case where it is determined that there is a match, the processing proceeds to step S557.

In step S557, the notification processing unit 571 generates notification information indicating such a fact (notification information for providing notification that there is a possibility that the vehicle 120 is a suspicious vehicle). Then, the notification processing unit 571 supplies the generated notification information to the input/output device 113 (via the terminal device 112) via the communication unit 351.

In a case where the process of step S557 ends, the processing proceeds to step S558. Furthermore, in a case where it is determined in step S556 that there is no match, the processing proceeds to step S558.

As the respective processes are executed as described above, the suspicious vehicle detection system 100 can suppress the possibility that the vehicle which is likely to be the suspicious vehicle is not detectable (reduce the incidence of overlooking), and suppress the reduction in the accuracy of the suspicious vehicle detection. That is, it is possible to suppress the reduction in the effectiveness of the suspicious vehicle detection system 100.

Note that the output of the notification information can be performed by the terminal device 311 instead of the input/output device 113, or can also be performed by both the input/output device 113 and the terminal device 311. In those cases, the terminal device 311 may perform processing similar to that of the input/output device 113.

6. Appendix

<Computer>

The above-described series of processes can be executed by hardware and can also be executed by software. In a case where the series of processes is executed by software, a program constituting the software is installed in a computer. Here, the computer includes a computer built in dedicated hardware, a general-purpose personal computer, for example, capable of executing various functions by installing various programs, and the like.

Figure 37:
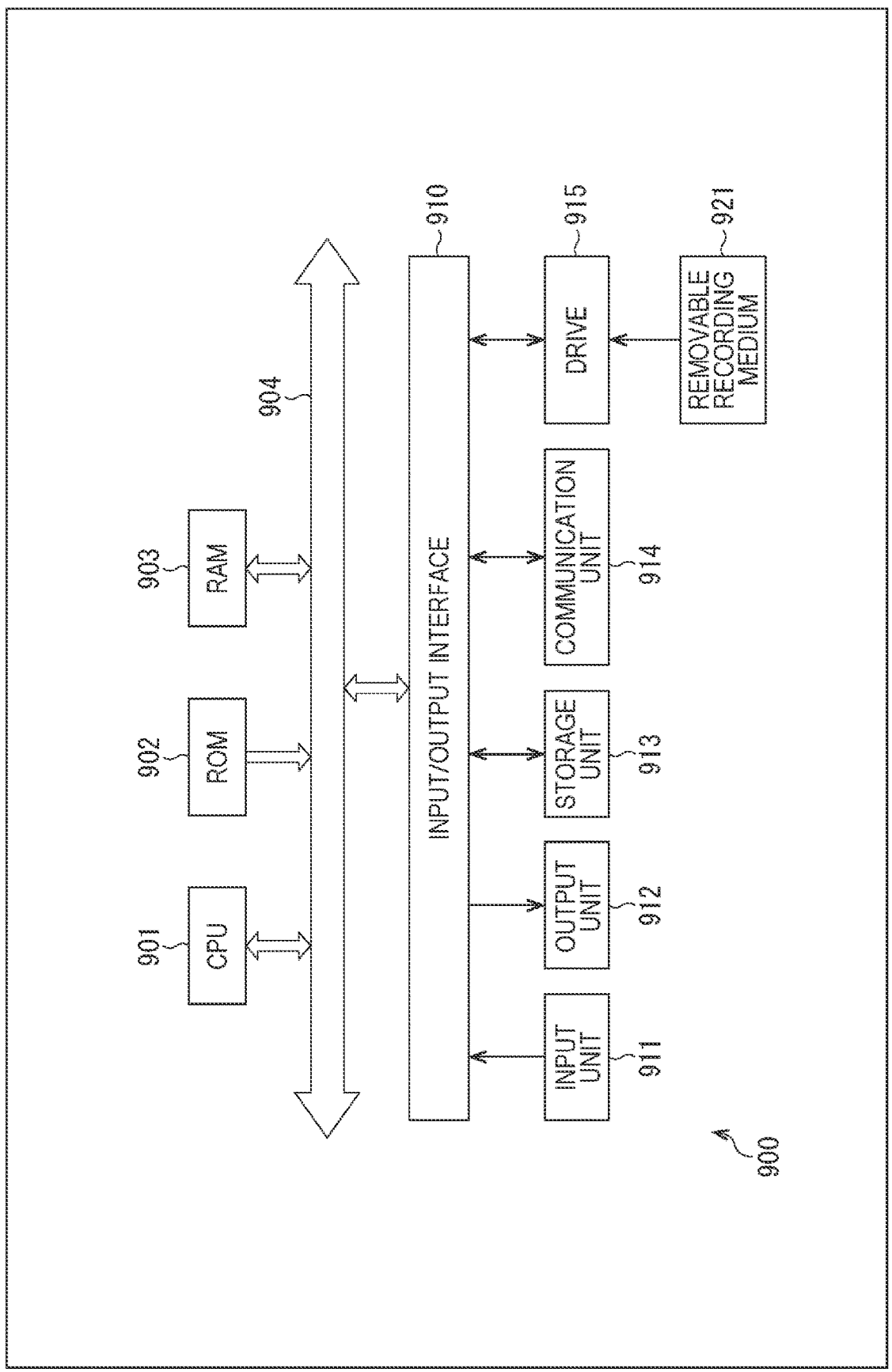
FIG. 37 is a block diagram illustrating a main configuration example of a computer.

FIG. 37 is a block diagram illustrating a configuration example of hardware configuration of a computer that executes the above-described series of processes according to a program.

In a computer 900 illustrated in FIG. 37, a central processing unit (CPU) 901, a read only memory (ROM) 902, and a random access memory (RAM) 903 are mutually connected via a bus 904.

Furthermore, an input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface. The drive 915 drives a removable recording medium 921 such as a magnetic disk, an optical disk, a magneto-optical disk, and a semiconductor memory.

In the computer configured as described above, for example, the CPU 901 executes a program stored in the storage unit 913 in the state of being loaded on the RAM 903 via the input/output interface 910 and the bus 904, thereby performing the above-described series of processes. Furthermore, the RAM 903 also appropriately stores data and the like necessary for the CPU 901 to execute various processes.

The program executed by the computer can be applied, for example, by being recorded in the removable recording medium 921 as a package medium and the like. In such a case, the program can be installed in the storage unit 913 via the input/output interface 910 by mounting the removable recording medium 921 to the drive 915.

Furthermore, the program can also be provided via a wired or wireless transmission medium such as a local area network, the Internet, and digital satellite broadcasting. In such a case, the program can be received by the communication unit 914 and installed in the storage unit 913.

In addition, the program can be installed in advance in the ROM 902 or the storage unit 913.

<Object to which Present Technology is Applied>

Furthermore, the present technology can be applied to any configuration. For example, the present technology can also be implemented as a partial configuration of a device such as a processor (for example, a video processor) as system large scale integration (LSI), a module (for example, a video module) using a plurality of the processors, a unit (for example, a video unit) using a plurality of the modules, and a set (for example, a video set) in which other functions are added to the unit.

Furthermore, for example, the present technology can also be applied to a network system configured using a plurality of devices. For example, the present technology may be implemented as cloud computing that is shared and processed in cooperation by a plurality of devices via a network. For example, the present technology may be implemented in a cloud service that provides service related to an image (moving image) with respect to any terminal such as a computer, an audio visual (AV) device, a portable information processing terminal, and an Internet of Things (IoT) device.

Note that the system in the present specification means a set of a plurality of constituent elements (devices, modules (components), and the like), and whether or not all the constituent elements are provided in the same housing does not matter. Therefore, both a plurality of devices housed in separate housings and connected via a network, and a device in which a plurality of modules is housed in one housing are systems.

Others

Embodiments of the present technology are not limited to the above-described embodiments, and various modifications can be made within a scope not departing from a gist of the present technology.

For example, a configuration described as one device (or processing unit) may be divided and configured as a plurality of devices (or processing units). Conversely, configurations described above as a plurality of devices (or processing units) may be collectively configured as one device (or processing unit). Furthermore, of course, a configuration other than the above may be added to the configuration of each device (or each processing unit). Moreover, in a case where the configuration and operation as the entire system are substantially the same, a part of a configuration of one device (or processing unit) may be included in a configuration of another device (or another processing unit).

Furthermore, for example, the above-described program may be executed in any device. In such a case, it is sufficient if the device has necessary functions (functional blocks and the like) and can obtain necessary information.

Furthermore, for example, each step of one flowchart may be executed by one device, or may be shared and executed by a plurality of devices. Moreover, in a case where one step includes a plurality of processes, the plurality of processes may be executed by one device or may be shared and executed by a plurality of devices. In other words, the plurality of processes included in one step can also be executed as processes of a plurality of steps. Conversely, processes described as a plurality of steps can also be collectively executed as one step.

Furthermore, for example, in a program executed by a computer, processes of steps describing the program may be executed in time series in the order be described in the present specification, or may executed in parallel or individually at a necessary timing such as when a call is made. That is, the processes of the respective steps may be executed in an order different from the above-described order as long as there is no contradiction. Moreover, the processes of the steps describing this program may be executed in parallel with processes of another program, or may be executed in combination with processes of another program.

Furthermore, for example, a plurality of technologies related to the present technology can be independently and individually implemented as long as there is no contradiction. Of course, a plurality of any of the present technologies can also be used in combination. For example, some or all of the present technologies described in any of the embodiments may be combined with some or all of the present technologies described in the other embodiments. Furthermore, some or all of any of the above-described present technologies can also be implemented in combination with other technologies not described above.

Note that the present technology can also have the following configurations.

(1) An information processing device including:
a feature extraction unit that extracts feature information of a vehicle from a captured image on the basis of a detection result of a number plate of the vehicle in the captured image;
and a feature registration unit that registers the feature information of the vehicle extracted by the feature extraction unit in a predetermined database.

(2) The information processing device according to (1), in which
the feature extraction unit extracts the feature information from the captured image in a case where the number plate has not been detected.

(3) The information processing device according to (1) or (2), in which
the feature extraction unit extracts the feature information from the captured image in a case where the number plate has been detected but at least a part of a vehicle registration number of the detected number plate has not been recognized.

(4) The information processing device according to (3), in which
the feature extraction unit extracts the feature information from the captured image in a case where at least a part of a vehicle registration number of the number plate has not been recognized for a predetermined reason.

(5) The information processing device according to any one of (1) to (4), in which
the feature extraction unit extracts vehicle exterior feature information indicating a feature related to an appearance of the vehicle from the captured image as the feature information.

(6) The information processing device according to (5), in which
the vehicle exterior feature information includes at least any one of a vehicle name, a vehicle type, a model, or a vehicle color of the vehicle, or a feature unique to the vehicle.

(7) The information processing device according to any one of (1) to (6), in which
the feature extraction unit extracts passenger feature information indicating a feature related to a passenger of the vehicle from the captured image as the feature information.

(8) The information processing device according to any one of (1) to (7), in which
the feature extraction unit causes the feature information to include at least any one of a date and time or a place at which imaging of the vehicle has been performed.

(9) The information processing device according to any one of (1) to (8), further including
a feature query unit that queries whether or not information corresponding to the feature information extracted by the feature extraction unit exists in the predetermined database,
in which the feature registration unit registers the feature information in the predetermined database in a case where the information corresponding to the feature information does not exist in the predetermined database.

(10) The information processing device according to (9), further including
a notification processing unit that generates notification information for notifying a user in a case where the information corresponding to the feature information exists in the predetermined database.

(11) The information processing device according to (10), in which
the notification processing unit generates pieces of the notification information different between a case where a vehicle registration number recognized from the captured image exists in the predetermined database and a case where the information corresponding to the feature information exists in the predetermined database.

(12) The information processing device according to (10) or (11), further including
an output unit that outputs the notification information to another device.

(13) The information processing device according to (12), in which
the output unit outputs the notification information as an image or a voice.

(14) The information processing device according to any one of (1) to (13), further including a feature query unit that queries whether or not feature information corresponding to the feature information extracted by the feature extraction unit exists in the predetermined database, in which the feature registration unit registers a place where imaging of the vehicle has been performed in association with the corresponding information as an appearance result of the vehicle in a case where the information corresponding to the feature information exists in the predetermined database.

(15) The information processing device according to (14), in which a date and time when imaging of the vehicle has been performed is registered in association with the corresponding information as the appearance result.

(16) The information processing device according to (14) or (15), further including a map generation unit that generates an appearance map of the vehicle on the basis of the appearance result of the vehicle.

(17) The information processing device according to any one of (1) to (16), further including a plate detection unit that detects the number plate from the captured image.

(18) The information processing device according to any one of (1) to (17), further including a character recognition unit that performs character recognition of a character described in the number plate in a case where the number plate has been detected.

(19) An information processing method including:

extracting feature information of a vehicle from a captured image on the basis of a detection result of a number plate of the vehicle in the captured image; and registering the extracted feature information of the vehicle in a predetermined database.

(20) A program that causes a computer to function as:

a feature extraction unit that extracts feature information of a vehicle from a captured image on the basis of a detection result of a number plate of the vehicle in the captured image; and a feature registration unit that registers the feature information of the vehicle extracted by the feature extraction unit in a predetermined database.

REFERENCE SIGNS LIST

100 Suspicious vehicle detection system
101 Patrol car
110 In-vehicle system
111 Imaging device
112 Terminal device
113 Input/output device
120 Vehicle
121 Number plate
131 Imaging unit
132 Control unit
133 Communication unit
141 Communication unit
142 Image acquisition unit
143 Image analysis unit
144 Processing determination unit
145 Corresponding processing unit
146 Attention-requiring vehicle database
147 Input corresponding processing unit
151 Plate detection unit
152 Character recognition unit
153 Feature extraction unit
161 Recognition success-time processing unit
162 Recognition failure-time processing unit
163 Detection failure-time processing unit
171 Character query unit
172 Notification processing unit
181 Reason determination unit
182 Feature query unit
183 Notification processing unit
184 Feature registration unit
191 Feature query unit
192 Notification processing unit
193 Feature registration unit
201 Partial area
202 Image of number plate
203 Vehicle registration number
205 Translucent plate
206 Object
210 Registration information
211 Vehicle registration information
212 Owner information
213 Reason for attention
214 Vehicle feature information
221 Registration information
222 Registration information
251 Communication unit
252 Control unit
253 Input unit
254 Output unit
301 Server
302 Network
310 Control center
311 Terminal device
321 Character supply unit
322 Query result acquisition unit
331 Feature supply unit
332 Query result acquisition unit
341 Feature supply unit
342 Query result acquisition unit
351 Communication unit
352 Information acquisition unit
353 Database processing unit
354 Attention-requiring vehicle database
355 Processing result supply unit
361 Character query unit
362 Feature query unit
363 Feature registration unit
364 Information reference unit
401 Police officer
411 Portable terminal device
431 Imaging unit
432 Image analysis unit
433 Processing determination unit
434 Corresponding processing unit
435 Communication unit
436 Output unit
437 Input unit
438 Input corresponding processing unit
441 Plate detection unit
442 Character recognition unit
443 Feature extraction unit
451 Recognition success-time processing unit
452 Recognition failure-time processing unit
453 Detection failure-time processing unit
461 Character supply unit
462 Query result acquisition unit
463 Notification processing unit
471 Reason determination unit 472 Feature supply unit
473 Query result acquisition unit
474 Notification processing unit
481 Feature supply unit
482 Query result acquisition unit
483 Notification processing unit
501 Monitoring device
511 Image acquisition unit
512 Image analysis unit
513 Processing determination unit
514 Corresponding processing unit
515 Communication unit
521 Plate detection unit
522 Character recognition unit
523 Feature extraction unit
531 Recognition success-time processing unit
532 Recognition failure-time processing unit
533 Detection failure-time processing unit
541 Character supply unit
551 Reason determination unit
552 Feature supply unit
561 Feature supply unit
571 Notification processing unit

The invention claimed is:

1. An information processing device, comprising:
a central processing unit (CPU) configured to:
extract feature information of a vehicle from a captured image based on a detection result of a number plate of the vehicle in the captured image;
register the extracted feature information of the vehicle in a specific database;
query existence of feature information corresponding to the extracted feature information in the specific database;
register, as an appearance result of the vehicle, a place where imaging of the vehicle has been performed in association with the corresponding information, wherein the place is registered as the appearance result of the vehicle based on the information corresponding to the feature information exists in the specific database; and
generate an appearance map of the vehicle based on the appearance result of the vehicle.

2. The information processing device according to claim 1, wherein the CPU is further configured to extract the feature information from the captured image based on the number plate that has not been detected.

3. The information processing device according to claim 1, wherein the CPU is further configured to extract the feature information from the captured image based on the number plate that has been detected but at least a part of a vehicle registration number of the detected number plate has not been recognized.

4. The information processing device according to claim 3, wherein the CPU is further configured to extract the feature information from the captured image based on at least a part of a vehicle registration number of the number plate that has not been recognized for a specific reason.

5. The information processing device according to claim 1, wherein the CPU is further configured to extract vehicle exterior feature information that indicates a feature related to an appearance of the vehicle from the captured image as the feature information.

6. The information processing device according to claim 5, wherein the vehicle exterior feature information includes at least one of a vehicle name, a vehicle type, a model, a vehicle color of the vehicle, a feature unique to the vehicle.

7. The information processing device according to claim 1, wherein the CPU is further configured to extract passenger feature information that indicates a feature related to a passenger of the vehicle from the captured image as the feature information.

8. The information processing device according to claim 1, wherein the CPU is further configured to cause the feature information to include at least one of a date and time or a place at which imaging of the vehicle has been performed.

9. The information processing device according to claim 1, wherein the CPU is further configured to:
query whether or not information corresponding to the extracted feature information exists in the specific database; and
register the feature information in the specific database based on the information corresponding to the feature information does not exist in the specific database.

10. The information processing device according to claim 9, wherein the CPU is further configured to generate, based on the information corresponding to the feature information exists in the specific database, notification information to notify a user.

11. The information processing device according to claim 10, wherein the notification processing unit is further configured to generate pieces of the notification information different between a case where a vehicle registration number recognized from the captured image exists in the specific database and a case where the information corresponding to the feature information exists in the specific database.

12. The information processing device according to claim 10, further comprising an output device configured to output the notification information to a different device.

13. The information processing device according to claim 12, wherein the output device is further configured to output the notification information as one of an image or a voice.

14. The information processing device according to claim 1, wherein the CPU is further configured to register a date and time in association with the corresponding information as the appearance result when imaging of the vehicle has been performed.

15. The information processing device according to claim 1, wherein the CPU is further configured to detect the number plate from the captured image.

16. The information processing device according to claim 1, wherein the CPU is further configured to perform character recognition of a character in the number plate based on the number plate that has been detected.

17. An information processing method, comprising:
extracting feature information of a vehicle from a captured image based on a detection result of a number plate of the vehicle in the captured image;
registering the extracted feature information of the vehicle in a specific database;
querying existence of feature information corresponding to the extracted feature information in the specific database;
registering, as an appearance result of the vehicle, a place where imaging of the vehicle has been performed in association with the corresponding information, wherein the place is registered as the appearance result of the vehicle based on the information corresponding to the feature information exists in the specific database; and
generating an appearance map of the vehicle based on the appearance result of the vehicle.

18. A non-transitory computer-readable medium having stored thereon computer-executable instructions, which when executed by a processor, cause the processor to execute operations, the operations comprising:
- extracting feature information of a vehicle from a captured image based on a detection result of a number plate of the vehicle in the captured image; and
- registering the extracted feature information of the vehicle in a specific database;
- querying existence of feature information corresponding to the extracted feature information in the specific database;
- registering, as an appearance result of the vehicle, a place where imaging of the vehicle has been performed in association with the corresponding information, wherein the place is registered as the appearance result of the vehicle based on the information corresponding to the feature information exists in the specific database; and
- generate an appearance map of the vehicle based on the appearance result of the vehicle.

* * * * *